United States Patent
Kida et al.

[11] Patent Number: 5,825,162
[45] Date of Patent: Oct. 20, 1998

[54] ELECTRIC POWER FLOW CONTROLLER

[75] Inventors: Junzo Kida, Hitachi; Hiroshi Arita, Mito; Shinichi Kondo, Hitachi, all of Japan

[73] Assignee: Hitachi, Ltd., Tokyo, Japan

[21] Appl. No.: 505,533

[22] Filed: Jul. 21, 1995

[30] Foreign Application Priority Data

| | | | |
|---|---|---|---|
| Jul. 25, 1994 | [JP] | Japan | 6-172277 |
| Mar. 30, 1995 | [JP] | Japan | 7-072755 |
| Jun. 29, 1995 | [JP] | Japan | 7-163375 |

[51] Int. Cl.$^6$ .............. G05F 1/12; G05F 5/00; G05F 1/00; H02J 3/18
[52] U.S. Cl. .......... 323/210; 307/102; 323/207; 323/102
[58] Field of Search .................. 323/210, 211, 323/207; 307/102

[56] References Cited

U.S. PATENT DOCUMENTS

| | | | |
|---|---|---|---|
| 3,936,727 | 2/1976 | Kelley, Jr. et al. | 323/102 |
| 3,963,978 | 6/1976 | Kelley, Jr. et al. | 323/102 |
| 4,356,440 | 10/1982 | Curtiss et al. | 323/210 |
| 4,434,376 | 2/1984 | Hingorani | 307/102 |
| 4,567,424 | 1/1986 | Dobsa | 323/210 |
| 4,680,531 | 7/1987 | Rey et al. | 323/206 |
| 4,829,229 | 5/1989 | Johansson et al. | |
| 4,999,565 | 3/1991 | Nilsson | 323/210 |
| 5,032,738 | 7/1991 | Vithayathil | |
| 5,343,139 | 8/1994 | Gyugyi et al. | 323/207 |
| 5,420,495 | 5/1995 | Hingorani | 323/218 |

FOREIGN PATENT DOCUMENTS

| | | |
|---|---|---|
| 54-22871 | 2/1979 | Japan |
| 54-154057 | 12/1979 | Japan |
| 55-92517 | 7/1980 | Japan |
| 63-15630 | 1/1988 | Japan |
| 6-261456 | 9/1994 | Japan |

OTHER PUBLICATIONS

IEEE Transactions on Power Delivery, vol. 8, No. 3, Jul. 1993, "Thyristor Controlled Series Compensation Prototype Installation at the Slatt 500 KV Substation", Urbanek et al, pp. 1460–1469.

Transmission and Distribution, Mar. 1993, vol. 45, No. 3, pp. 16–19.

*Primary Examiner*—Peter S. Wong
*Assistant Examiner*—Rajnikant B. Patel
*Attorney, Agent, or Firm*—Fay, Sharpe, Beall, Fagan, Minnich & McKee

[57] ABSTRACT

An electric power flow controller for controlling an electric power flow of a power system includes a semiconductor switch for controlling a series reactance of the power system. The electric power flow controller includes a first winding having at least one Y-connection, a second winding mating with the first winding, an electric power flow compensator connected in series to the Y-connection of the first winding and for compensating a transmission state of the electric power system. The electric power flow compensator provides a compensating capacitor inserted onto an electric power line. The compensation of the capacitor is controlled by the semiconductor switch. The semiconductor switch keeps an application of a voltage that is equal to or lower than a voltage to ground of the electric power line.

69 Claims, 34 Drawing Sheets

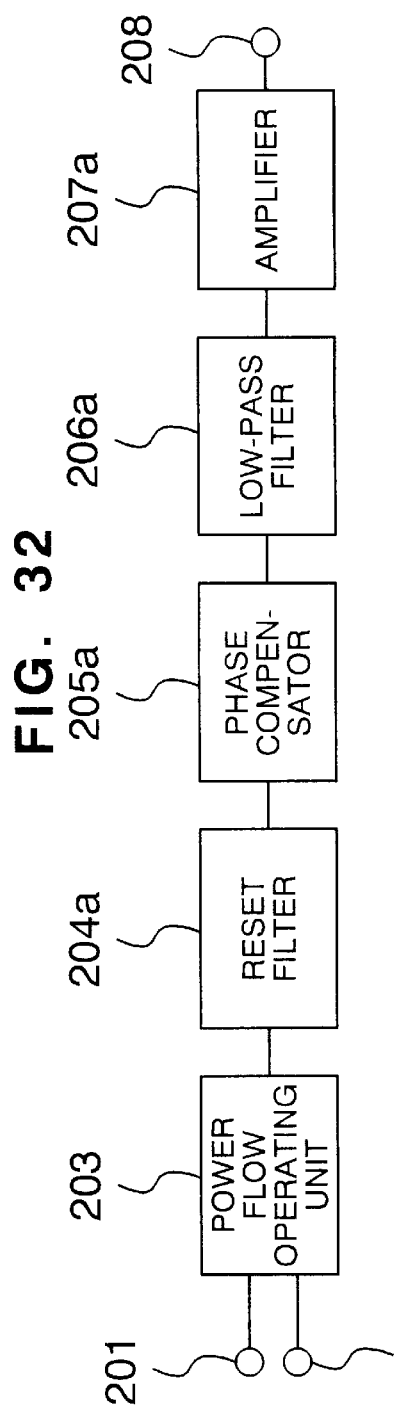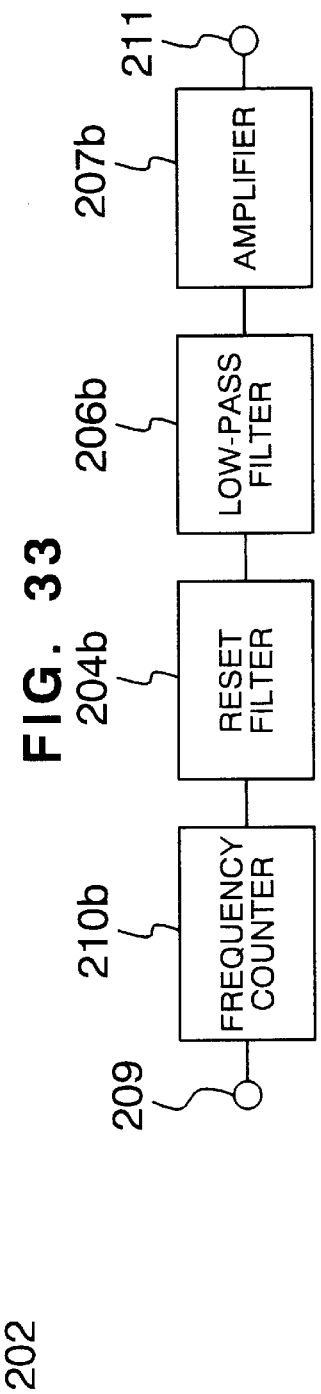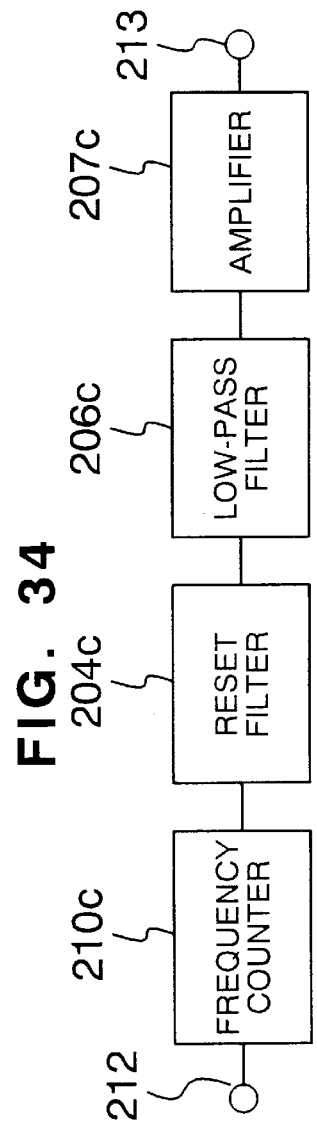

ELECTRIC POWER FLOW CONTROLLER

BACKGROUND OF THE INVENTION

The present invention relates to an electric power flow controller that is connected to an electric power system and electric power flow in the electric power system and more particularly to the electric power flow controller that is arranged to control a serial reactance.

As a method for controlling an electric power flow in an electric power system (or simply called power system), there has been published a method for regulating a series reactance in a power transmission line of the power system or a method arranged to use a phase adjustor. The former method has been disclosed in U.S. Pat. Nos. 4,999,565 and 4,829,299, the former one of which is shown in FIG. 1. The latter method has been disclosed in JP-A63-15630 specification, for example.

In the former method for regulating a series reactance in the power transmission line of the power system, as shown in FIG. 1, a series compensating device is provided to switchably insert a series capacitor onto the power transmission line. The series compensating device is activated so that the switching devices 314a, 314b and 314c are operated to add a series capacitor 311 to the power system or separate it therefrom. The series compensating device is arranged so that a semiconductor switch 313 is connected in series to a reactor 313a and both connected in series are connected in parallel to the series capacitor 311. The semiconductor switch 313 is composed of a semiconductor element for controlling the current flow in the series capacitor 311. To protect the series capacitor from application of an overvoltage, an overvoltage protecting device 312 is connected in parallel to the series capacitor. The protecting device 312 operates to bypass the series capacitor when a higher voltage than a certain level is applied to the capacitor.

As disclosed in U.S. Pat. No. 5,032,738 shown in FIG. 2, there has been proposed a method for inserting a series compensating device in the power system through a series transformer. Like the arrangement shown in FIG. 1, the series compensating device 310 is arranged so that the semiconductor switch 313 is connected in series to the reactor 313a. The device 310 operates to regulate a reactance capacity inserted onto the power transmission line by turning the semiconductor switch on and off as occasion demands.

The phase adjustor operates to adjust a phase of a phase voltage by matching an actual phase voltage applied onto the power system to the corresponding voltage whose phase is shifted by 90° with respect to the actual phase voltage. By adjusting the phase, the electric power flow is controlled. As a method for adjusting the phase, a phase adjusting transformer may be a transformer having taps. Or, a transformer may be used to generate a voltage of any phase. As a tap switch for the transformer having taps, mechanical contacts or a semiconductor element such as a thyristor may be used.

In order to compensate for a series reactance component of the electric power system, a prior art has been arranged to insert a series capacitor in series to the electric power system for increasing transmission capacity of the power system, thereby enhancing transient stability. In this prior art, only the series insertion of the series capacitor to the power system may bring about series resonance between the reactance of the system itself and the series capacitor. To overcome this shortcoming, as disclosed in Japanese Patent Unexamined JP-A 54-22871, JP-A 54154057 and JP-A 55-92517 specifications, there has been proposed a method for closing a mechanical switch connected between both sides of the capacitor and thereby bypassing the capacitor for preventing occurrence of a possible resonant phenomenon on the power system.

However, the mechanical switch used for forming a charging and discharging circuit for the series capacitor does not promptly process the resonance phenomenon occurring on the power system. In the worst case, an abnormal phenomenon may take place. It concretely indicates a sub-synchronous resonance in which the capacitor is resonated with the shaft system of a generator. To solve such a disadvantage, for example, as disclosed in Japanese Patent Unexamined JPA 6-261456 specification and IEEE Transaction on Power Delivery, Vol. 8, No. 3, pages 1460 to 1469 (July, 1993), a semiconductor switch arranged to use a thyristor is connected in parallel to the serial capacitor for controlling a firing angle of the thyristor, thereby suppressing the resonance phenomenon.

The conventional electric power flow controller needs to keep the overall device insulated against the ground, because in the driving state the voltage to ground of the overall device is equivalent to the potential of the power system against the ground. Hence, some heavy components such as the series capacitor 311 and the semiconductor switch 313 are required to be supported by something like an insulator. For example, the electric power system having a rated voltage of 500 kV needs an insulating distance of 5 meter or longer. As such, the conventional electric power flow controller is required to be located in a high place though it is heavy. It is therefore weak in terms of earthquake resistance.

Further, the check and maintenance of the series compensating device needs an operator to work in a high place. It means that the device always gives an operator the danger of dropping himself from a high place. Further, the semiconductor switch 313 located from the ground potential point to a high voltage point needs the distribution and the pipe arrangement of control and signal lines, power lines and coolant pipes for semiconductor elements. All those lines and pipes are required to be insulated.

For the electric power flow controller for controlling the power flow through the effect of the phase adjustor, the series reactance on the power system is increased, because the series transformer is connected to the power system. This brings about sub effects such as reduction of power transmission capacity and lower stability of the power system. In particular, the electric power system whose length is relatively long or whose transient stability is low may restrict the transmission capacity if the system uses the phase adjustor. Moreover, disadvantageously, only the phase adjusting function is not so effective in increasing the transmission capacity of the power system and thereby improving the transient stability.

SUMMARY OF THE INVENTION

It is a main object of the present invention to provide an electric power flow controller that is arranged so that at least the switch portion of the semiconductor switch 313 required to be more frequently checked and maintained than a passive element such as the series capacitor 311 is made lower than a voltage to ground of the power system, for making the semiconductor switch more serviceable.

It is a further object of the present invention is provide an electric power flow controller having a series capacitor, the overall arrangement of which is superior in terms of service and earthquake resistance.

It is a yet further object of the present invention to provide an electric power flow controller that is arranged to overcome a shortcoming of increasing reactance on the power system and control the electric power flow even if the electric power flow is controlled by the phase adjustor.

Further, if the semiconductor switch is fired on an erroneous timing basis, the conventional electric power flow controller fails to suppress a resonance phenomenon if such a phenomenon takes place in the power system. If suppressing of the resonance phenomenon is disallowed, the current and voltage waveforms of the electric power system is disturbed and an overvoltage appears in the series capacitor or the electric power system. These may result in bringing about an accident in the electric power system.

It is another object of the present invention to provide an electric power flow controller that is arranged to have a series compensating device for controlling a semiconductor switch on a precise timing if the fluctuation of the electric power system serves to disturb the waveform of an electric signal passing through the electric power system.

Further, by controlling the amount of reactance of a compensating capacitor connected to the electric power system, the conventional electric power flow controller operates to compensate for an amount of reactance of an object to be controlled, which reactance is required by the electric power system. This compensating capacitor, however, provides a limited amount of reactance to be controlled. Hence, the capacitor has difficulty in compensating for reactance of the electric power system in a wide range.

In carrying out the objects, according to an aspect of the invention, an electric power flow controller for controlling power transmission executed by the electric power system includes a first winding having at least Y-connection, a second winding mating with the first winding, and electric power flow compensating means for compensating for power transmission of the electric power system.

In carrying out the objects, according to an aspect of the invention, an electric power flow controller having a compensating capacitor inserted to a power line includes a semiconductor switch for controlling a compensation of a compensating capacitor so that the potential applied on the semiconductor switch is made equal to or lower than the voltage to ground of the power line.

In carrying out the objects, according to an aspect of the invention, an electric power flow controller having a compensating capacitor inserted to a transmission line and a protecting unit for bypassing the capacitor includes two transformers, each of which has a first winding whose one end is grounded and whose other end is connected to the corresponding end of the compensating capacitor. The winding of the autotransformer is connected to that of the other transformer at the middle point of the winding through the semiconductor switch.

In carrying out the objects, according to an aspect of the invention, the electric power flow controller for an electric power system having a compensating capacitor inserted to a transmission line having a protecting unit for bypassing the capacitor includes two transformers, each transformer having primary and second windings grounded at each one end, each other end of the primary windings being connected to the transmission line, and the other end of the second winding being connected to the other end of the other second winding through a compensating capacitor having semiconductor switches connected in parallel.

In carrying out the objects, according to an aspect of the invention, an electric power flow controller having a compensating capacitor inserted into a power line includes a transformer located between the power line and the ground, a semiconductor switch for controlling a compensating amount of the compensating capacitor and being connected to a winding of the transformer and in parallel to the compensating capacitor, and a protector located between the semiconductor switch and the transformer for keeping the potential applied to the semiconductor switch equal to or lower than the voltage to ground of the power line.

In carrying out the objects, according to an aspect of the invention, an electric power flow controller having a compensating capacitor inserted to a power line includes a semiconductor switch for controlling a compensating amount of the compensating capacitor, the compensating capacitor located at the ground potential of the power line, and a transformer located between the compensating capacitor and the semiconductor switch for keeping the potential applied to the semiconductor switch equal to or lower than the voltage to ground of the power line.

In carrying out the objects, according to an aspect of the invention, an electric power flow controller having a compensating capacitor inserted to the power line includes an insulated switching device located on the power line, a semiconductor switch for controlling a compensating amount of the compensating capacitor, and the power line vertically extended to the semiconductor switch and directed along the insulated switching device.

In carrying out the objects, according to an aspect of the invention, an electric power flow controller having a compensating capacitor connected to a power line includes a semiconductor switch for controlling a charging or discharging state of the compensating capacitor, current sensing means for sensing current flowing through the compensating capacitor, voltage sensing means for sensing a voltage applied to the compensating capacitor, current filtering means for extracting only a specific frequency component from the current sensed by the current sensing means, voltage filtering means for extracting only a specific frequency component from the voltage sensed by the voltage sensing means, current direction determining means for determining the direction of current to be flown to the semiconductor switch based on the output of the current filtering means, voltage phase determining means for determining a phase of the voltage applied to the semiconductor switch based on the output of the voltage filtering means, and switching signal generating means for feeding a switching signal for controlling the semiconductor switch on the basis of the determination made by the current direction means and the voltage phase determining means.

Further, in carrying out the objects, according to an aspect of the invention, an electric power flow controller having a phase adjustor and a compensating capacitor connected to an electric power system is arranged to control a reactance amount given by the compensating capacitor and a reactance amount given by the phase adjustor and synthesize both of the reactance amounts into a reactance amount to be compensated by the electric power system.

The electric power flow controller of the invention does not need to limit the transmission capacity though the conventional controller has to limit it because of the reactance on the transmission line. Further, the electric power flow controller of the invention is arranged to have a reactance compensating circuit located on the low-voltage side of the main transformer, that is, the circuit may be located on the earth potential side with reference to the phase voltages of the electric power system. This arrangement suppresses the shortcoming about insulation to the earth. Moreover, the electric power flow controller of the present invention provides the functions of adjusting phases and compensating reactance. Hence, the controller operates to control the electric power flow in a wider range than the conventional controller.

The electric power flow controller of the present invention is arranged so that the semiconductor switch required to be quite frequently checked and maintained may be made to have a lower voltage than the voltage to ground of the electric power system. This makes it easier to do the check and maintenance operation and possible to locate the semiconductor switch in a place with earthquake resistance.

Moreover, the electric power flow controller of the present invention enables to keep the voltage of the semiconductor switch equal to or lower than the voltage to ground of the electric power system. This makes it easier to do the check and maintenance of the semiconductor switch that needs to quite frequently do the check and maintenance and to secure the insulation of the control and signal lines of the semiconductor switch, the power line, and the pipes for a coolant medium for semiconductor elements, which lines and pipes are essentially required to be distributed.

Further, the electric power flow controller of the present invention enables to keep the overall compensating device at the earth potential. This makes it possible to easily secure the earthquake resistance in an area where an earthquake quite often takes place and eliminate the necessity of working in a high place when building the compensating devices and doing the check and maintenance of these devices. The compensating device is allowed to be partially or overall held in a grounded structure or a closed vessel. Hence, this serves to reduce an occurrence probability of failure caused by a lightning strike or a fall of something and enhance the reliability and the workability of the device.

The electric power flow controller of the present invention provides an easier check and maintenance operation for its semiconductor switch and includes a protector located between the semiconductor switch and the transformer. The protector inhibits to propagate the adverse effect done by the transient voltage or current to the semiconductor switch, which voltage or current takes place because of a lightning strike to the power line or a power system size. This makes it possible to safely secure the semiconductor switch.

The electric power flow controller of the present invention is arranged so that the compensating capacitor is located at the voltage to ground of the power line and the transformer is located between the compensating capacitor and the semiconductor switch, the transformer serving to keep the voltage applied to the semiconductor switch equal to or lower than the voltage to group of the power line. Hence, the overall compensator is allowed to be more serviceable and arranged compactly.

The electric power flow controller of the present invention provides the insulated switching device line and the power line extended to the semiconductor switch vertically with respect to the locating direction of the insulated switching device. Hence, the overall controller is allowed to be arranged compactly and more safely.

The electric power flow controller of the present invention is arranged to sense a current of the compensating capacitor and a voltage at each end of the compensating capacitor, extract only a specific frequency component of the sensed current and voltage, determine the direction of the current to be flown through the semiconductor switch based on the extracted current, determine a phase of a voltage applied to the semiconductor switch based on the extracted voltage, generate a switching signal based on each determination, and switchably make the semiconductor switch conductive or non-conductive based on the generated switching signal. Hence, if the waveform of the voltage or current of the electric power system is disturbed by the fluctuation of the power system such as failure of the power system or the voltage or current of the power system is transiently varied when the power feeding is started by turning on an disconnector for restarting to drive the power system after recovering the failure of the system, the conduction or non-conduction of the semiconductor switch is allowed to be controlled on a precise timing basis. As such, if the electric power system is fluctuated by turning on the series capacitor, the resonance phenomenon brought about in the electric power system is swiftly suppressed, thereby making the power system stable.

In particular, in a case that the semiconductor switch is made up of a pair of semiconductor elements, at least one of which is connected in series to the power line, while forward current is to be flown to one of these semiconductor elements, the semiconductor element is made conductive on the condition that the phase of a reverse voltage applied to the semiconductor element is made close to zero. While the reverse current is to be flown to the other semiconductor element, the other semiconductor element is made conductive on the condition that the phase of the forward voltage applied to the other semiconductor is made close to zero. As such, the disturbance of the waveform of the voltage or current of the electric power system makes it possible to conduct the semiconductor elements on a precise timing.

The electric power flow controller of the present invention enables to control a reactance amount of the phase adjustor without having to use the compensating capacitor. Hence, the reactance of the electric power system is allowed in a wider range.

BRIEF DESCRIPTION OF THE DRAWINGS

A preferred embodiment of the present invention will be described with reference to the appended drawings, in which

FIG. 32 is a block diagram showing an operating circuit for a controlled variable of a power flow on a line, the circuit used for controlling the electric power flow controller of the present invention;

FIG. 33 is a block diagram showing an operating circuit for a controlled variable of a system frequency, the circuit used for controlling the electric power flow controller of the present invention;

FIG. 34 is a block diagram showing an operating circuit for a controlled variable of a generator speed, the circuit used for controlling the electric power flow controller of the present invention;

DESCRIPTION OF THE PREFERRED EMBODIMENTS

Later, the description will be oriented to an electric power flow controller according to an embodiment of the present invention with reference to the drawings, in which the same functional components of the controller as the conventional controller have the same reference numbers.

Figure 3:
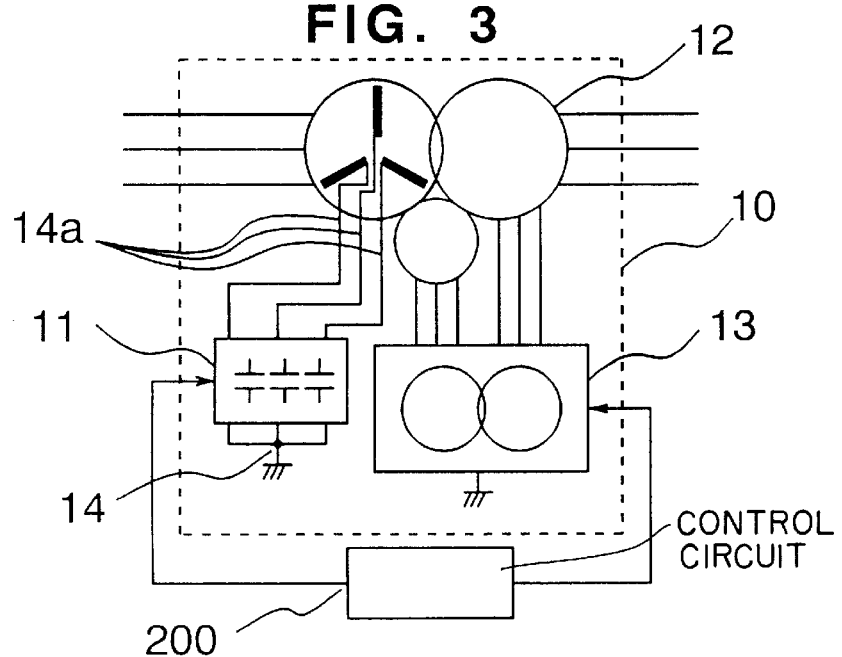
FIG. 3 is a circuit diagram showing an electric power flow controller according to an embodiment of the present invention.
Figure 4:
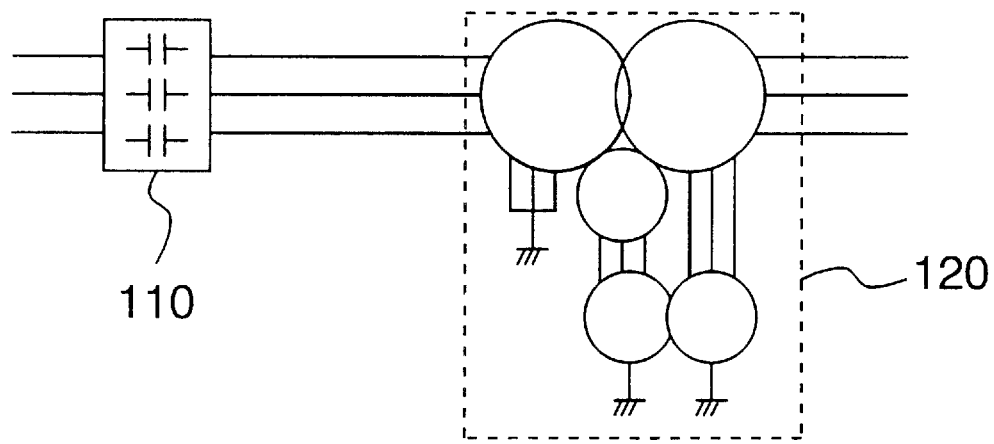
FIG. 4 is a circuit diagram showing a method for controlling an electric power flow in the conventional electric power system.

FIG. 3 shows an arrangement of an electric power flow controller according to the present invention. A numeral 10 denotes an electric power flow controller, which is made up of a series compensator 11, a main transformer 12 provided in a phase adjustor, an adjusting transformer 13 and a control circuit 200. The series compensator 11 operates to generate a leading-phase voltage against the line current for compensating for the electric power system. The main transformer 12 operates to adjust the phase of the electric power system. The adjusting transformer 13 operates to generate a voltage for adjusting a voltage phase generated by the main transformer 12. The control circuit 200 operates to control these units. The series compensator 11 is connected between a neutral point 14 and terminals 14a connected to the neutral point 14, those points being on the Y-connection windings provided in the main transformer 12. This connection achieves the series connection between series compensating capacitors of the series compensator 11 and series reactance provided in the transmission line and the transformer. This series connection serves to compensate for the series reactance amount of the electric power system. Further, the series compensator 11 is connected between the low-voltage terminal of the winding of the main transformer 12 and the grounded point. This connection allows the compensator 11 to be located on the ground potential side. As shown in FIG. 4, on the other hand, the conventional series compensating technique is arranged so that the series compensator 110 is inserted on the way of the transmission line. This arrangement needs to support a heavy series compensator 11 in a high place with something like an insulator for keeping the series compensator 110 insulated from the ground and between the phases. However, the electric power flow controller of the present invention is arranged to locate the series compensator on the ground potential side. This arrangement solves the shortcoming of the prior art. Moreover, the series compensator 11 is provided for reducing the series reactance of the electric power system and the main transformer 12, thereby increasing the transmission capacitance and enhancing the stability of the power system. The variation of the compensation of the series reactance makes it possible to control the power flow of the system. The main transformer 12 operates to adjust the phase on its primary and second sides with the voltage generated by the adjusting transformer 13 and thus enables to control the electric power flow passing therethrough according to the adjustment of the phase. Further, by changing a winding ratio of the primary side to the second side of the main transformer 12, the power systems having respective rated voltages (for example, 550-kV system and 275-kV system) are allowed to be associated with each other. The adjusting transformer 13 operates to generate any voltage vector based on a voltage vector generated by the main transformer 12 with the combination of the transformer and the tap switch. The voltage vector is synthesized with the voltage vector of the main transformer 12. The synthesis allow the primary side and the second side of the main transformer to generate their corresponding voltages, the phase angles of which are different from each other by any magnitude. In order to adjust the voltage vector generated by the adjusting transformer 13, a winding ratio of the adjusting transformer is changed by switching mechanical contacts or a tap switch composed of a semiconductor element such as a thyristor. Or, in place of the adjusting transformer 13, it is also possible to use a converter that enables to generate a three-phase voltage vector having any phase angle.

Figure 5:
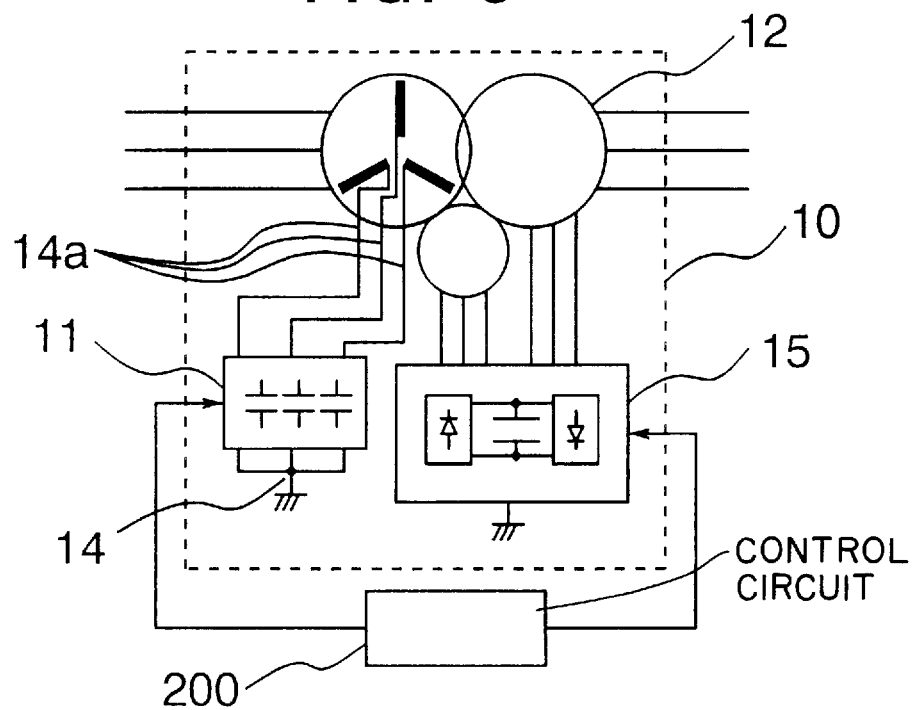
FIG. 5 is a circuit diagram showing an electric power flow controller according to another embodiment of the present invention.

FIG. 5 shows another arrangement of the electric power flow controller shown in FIG. 3 in which a converter 15 is used for the portion for generating the phase control voltage. The converter 15 operates to generate a three-phase voltage vector having any phase angle. In a case that the converter 15 serves as the adjusting transformer 13 shown in FIG. 3, the electric power flow controller operates to continuously and rapidly control an amplitude and a phase of the voltage generated by the adjusting transformer, thereby more easily suppressing the fluctuation of the power system.

Figure 6:
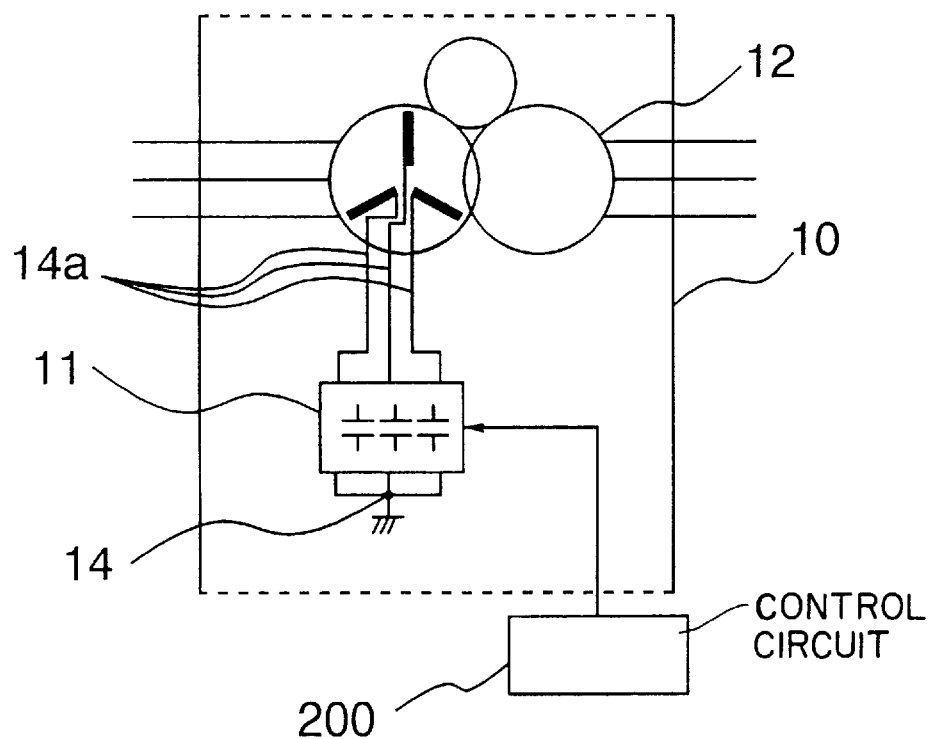
FIG. 6 is a circuit diagram showing an electric power flow controller according to another embodiment of the present invention.

FIG. 6 shows an electric power flow controller according to another embodiment of the preset invention, which are made up of the main transformer 12, the series compensator 11 and the control circuit 200 for them. In this arrangement, unlike the arrangement shown in FIG. 3 or FIG. 5, no phase adjusting function is provided. However, the series compensator 11 enables to compensate for series reactance of the power system and thereby increase the transmission capacity. Further, by controlling the series compensation, it is possible to adjust the reactance of the power system and control the electric power flow. Herein, provision of a delta-connection tertiary winding in the main transformer 12 makes it possible to remove a third harmonics component from a commercial frequency of current or voltage of the power system.

Figure 7:
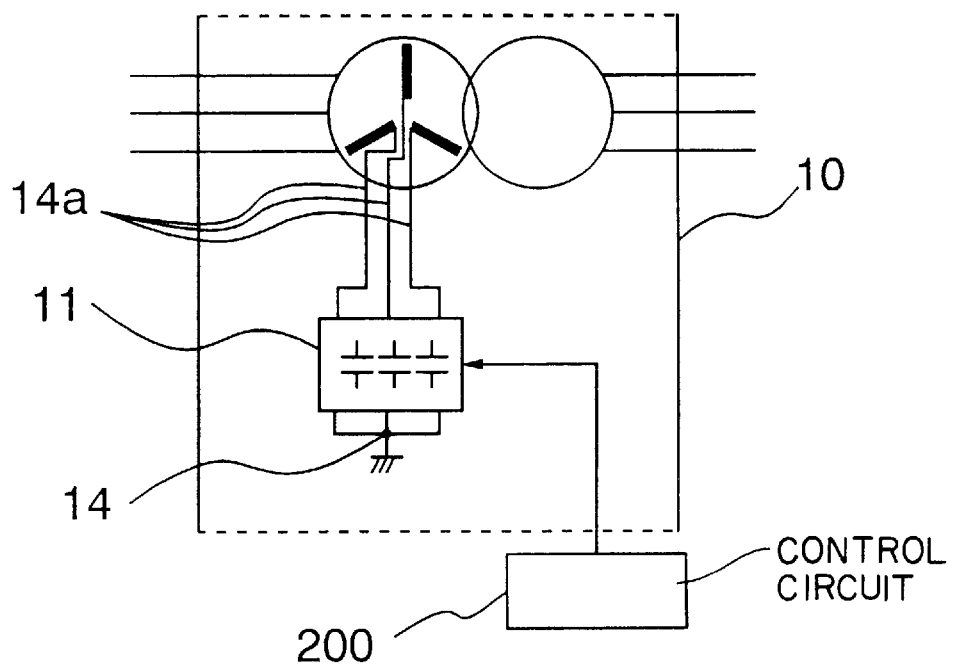
FIG. 7 is a circuit diagram showing an electric power flow controller according to another embodiment of the present invention.

FIG. 7 shows an electric power flow controller arranged to have a main transformer 12, a series compensator 11 and a control circuit 200 for them, like the arrangement shown in FIG. 6. In operation, the controller shown in FIG. 7 enables to compensate for series reactance of the power system and thereby increase the transmission capacitance. Further, by controlling the series compensation, it is possible to adjust the reactance of the power system and control the electric power flow. Herein, the main transformer 12 is made up of a primary winding and a second winding, the primary winding connected to the series compensator. By using a delta-connection as the second winding, it is possible to remote a third harmonic component from the commercial frequency of current or voltage of the power system.

Figure 8:
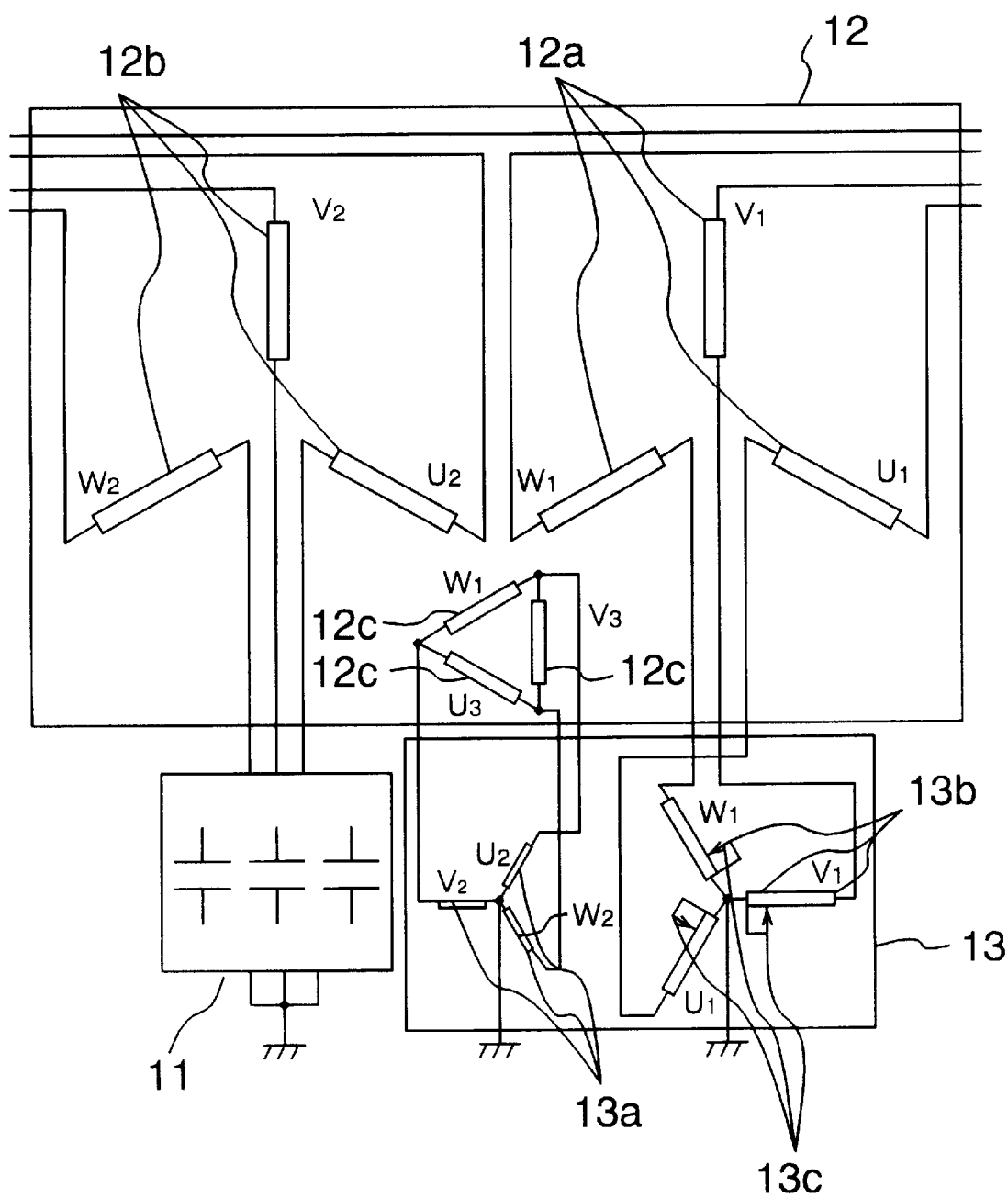
FIG. 8 is a circuit diagram showing a phase adjustor included in the embodiment of the present invention.

FIG. 8 shows the winding structures of the main transformer 12 and the adjusting transformer 13 provided in the phase adjustor of the electric power flow controller according to an embodiment of the invention. The main transformer 12 is made up of a primary winding 12a, a secondary winding 12b, both of which mainly pass an electric power flow, and a tertiary winding 12c for generating a voltage for phase adjustment. The adjusting transformer 13 is made up of a primary winding 13a connected with the tertiary winding of the main transformer and a secondary winding 13b for synthesize a voltage for phase adjustment to the main transformer. The direction of each winding shown in FIG. 8 coincides with the direction of the voltage vector generated by each winding. The voltage vector generated by the winding 12a is shifted by 90° with respect to the voltage vector generated by the winding 13b. Hence, by matching these voltage vectors to each other, it is possible to change the voltage phase generated by the winding 12a. There are provided taps 13c for adjusting the voltage the second winding 13b of the adjusting transformer 13. By changing the taps 13c, it is possible to adjust the voltage to be generated and control a phase angle of the voltage. The use of a semiconductor element such as a thyristor for the taps 13c makes it possible to rapidly and very frequently switch the taps 13c, thereby fine and flexibly controlling the phase. The series compensator 11 is connected to the ground potential side of the second winding 12b of the main transformer 12. This connecting arrangement allows the series compensator 11 composed of heavy components such as a series compensating capacitor bank to be directly connected to the ground or installed to a low place insulated to the ground. Hence, it serves to overcome some weak points like earthquake resistance.

Figure 9:
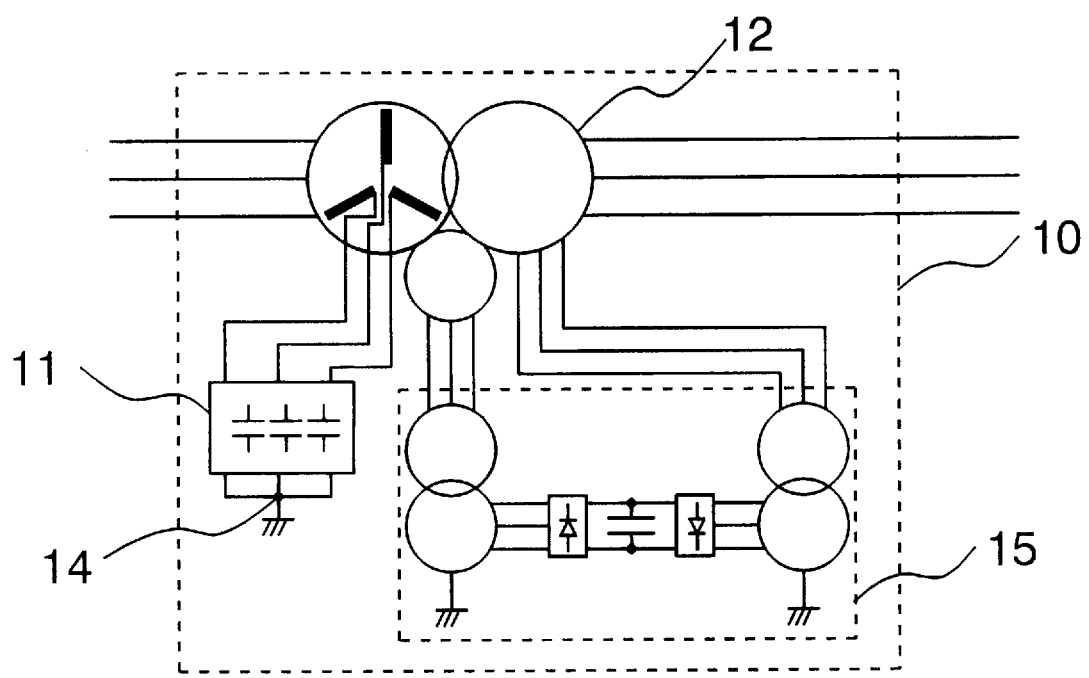
FIG. 9 is a circuit diagram showing another phase adjustor included in the embodiment of the present invention.

FIG. 9 shows another arrangement of the electric power flow controller in which the converter 15 is used for the portion for generating a phase-control electric power. The converter 15 is made up of a transformer for receiving an ac voltage from the tertiary winding of the main transformer, a converter for converting the ac voltage obtained through the transformer into a dc voltage, a inverter for converting the rectified voltage into any ac voltage waveform, and a transformer for applying a voltage generated by the inverter into the main transformer. The transformer located between the main transformer and the converter allows the converter to be electrically insulated from the electric power system. This serves to reduce an adverse effect on the converter, the adverse effect given by a failure occurring on the side of the electric power system.

Figure 10:
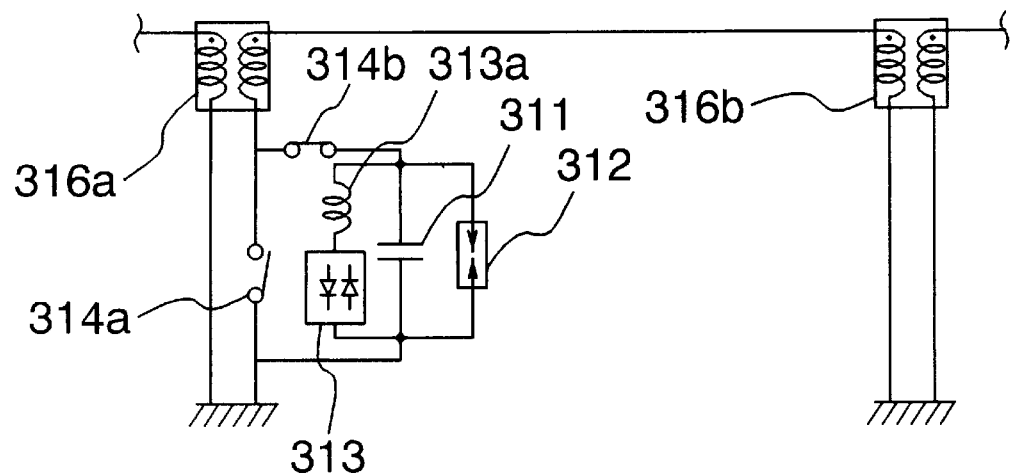
FIG. 10 is a circuit diagram showing a series compensating device included in the embodiment of the present invention.

FIG. 10 shows a circuit arrangement of the series compensator used in the electric power flow controller of the present invention. FIG. 10 shows the arrangement in which the overall series compensator is installed on the ground side of the transformer 316a. This arrangement allows the heaviest one of the components of the series compensator, that is, the series capacitor 313 and a semiconductor switch 313 having the highest check-and-maintenance frequency to be installed on the ground. Hence, it is not necessary to locate the series compensator in a high place with something like an insulator. This greatly reduces the disadvantage about earthquake resistance and improves the safety and maintainability. The series compensation is executed for the transformers 316a and 316b wherever they may be, concretely, where they are located in the same electric power substation or where they are located in their corresponding substations far away from each other.

Figure 11:
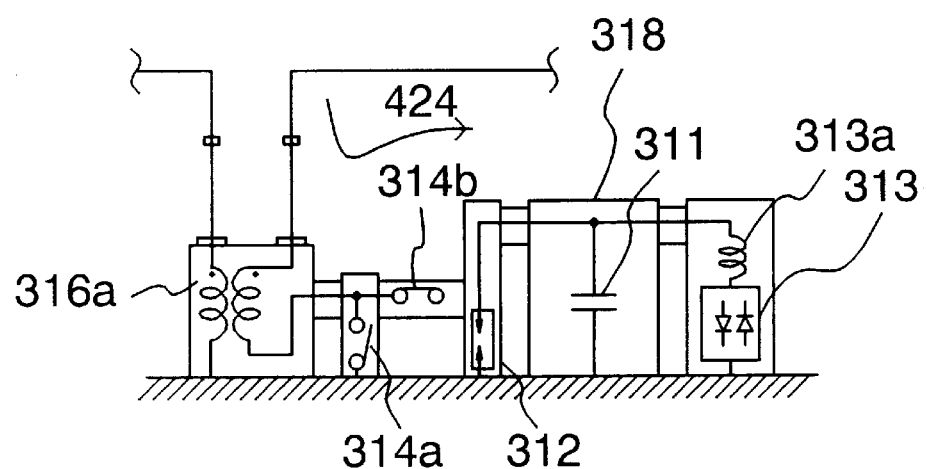
FIG. 11 is a circuit diagram showing another series compensating device included in the embodiment of the present invention.

FIG. 11 shows another embodiment of the present invention arranged on the arrangement shown in FIG. 10. In this embodiment, the first winding of a transformer 316a is connected to a power transmission system at a first terminal and is grounded at a second terminal. The second winding of the transformer 316a is connected to the power transmission system at a first terminal and is grounded at a second terminal. Between the second terminal and the ground, there are provided a series capacitor 311 and a semiconductor switch 313. (The other transformer 316b to be paired with the transformer 316a is not shown in FIG. 11.) And, between the capacitor 311 and the winding of the transformer, there are provided an overvoltage protecting device 312 served as a protector for the power system and switching device 314b and 314a (which is normally open). In this embodiment, all the components including the series capacitor 311 and the semiconductor switch 313 are allowed to be located on the ground with respect to the system potential. Hence, they may be easily accommodated in a closed vessel 318 such as a house or a grounded tank. All or part of the compensator may be a gas insulated switching device or easily connected to another gas insulated switching device. Further, the semiconductor switch 313 may be grounded in a place spaced from the transformer 316a. If, hence, an abnormality such as a lightning strike takes place on the power transmission system, the transient voltage or current 424 is propagated to the capacitor 311 and the semiconductor switch 313. However, the overvoltage protecting 312 and the switching devices 314a and 316b located on the propagating way serve to cut off the abnormality. This makes great contribution to enhancing the safety of the semiconductor switch, which needs the greatest concern for maintenance. If an abnormality takes place in the series capacitor 311, the adverse effect brought about thereby is allowed to be cut off by the protector 312 and the switching devices 314a and 314b.

Figure 12:
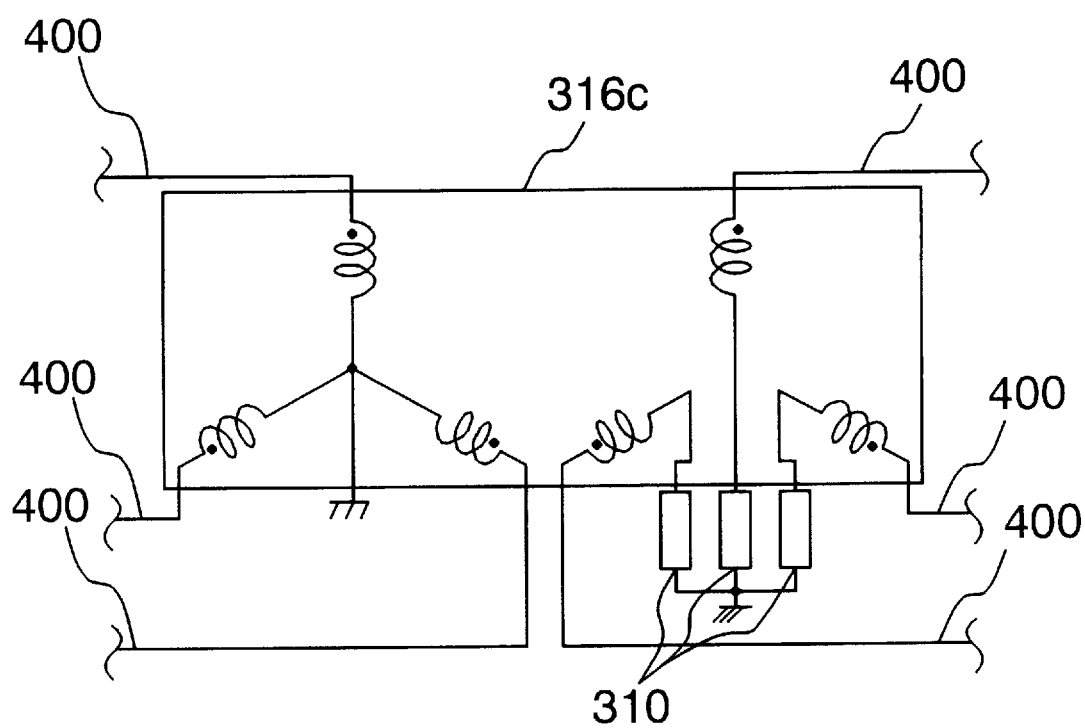
FIG. 12 is a circuit diagram showing an electric power flow controller according to another embodiment of the present invention.

FIG. 12 shows the series compensator of the present invention applied to a three-phase circuit. In this circuit arrangement, the three series compensator 310 for three phases are inserted between a low-voltage terminal of a star connected winding of a three-phase transformer 316c and the ground. This arrangement allows the series reactance of each phase of a transmission line 400 to be compensated if the series compensator is applied to a three-phase ac transmission system.

Figure 13:
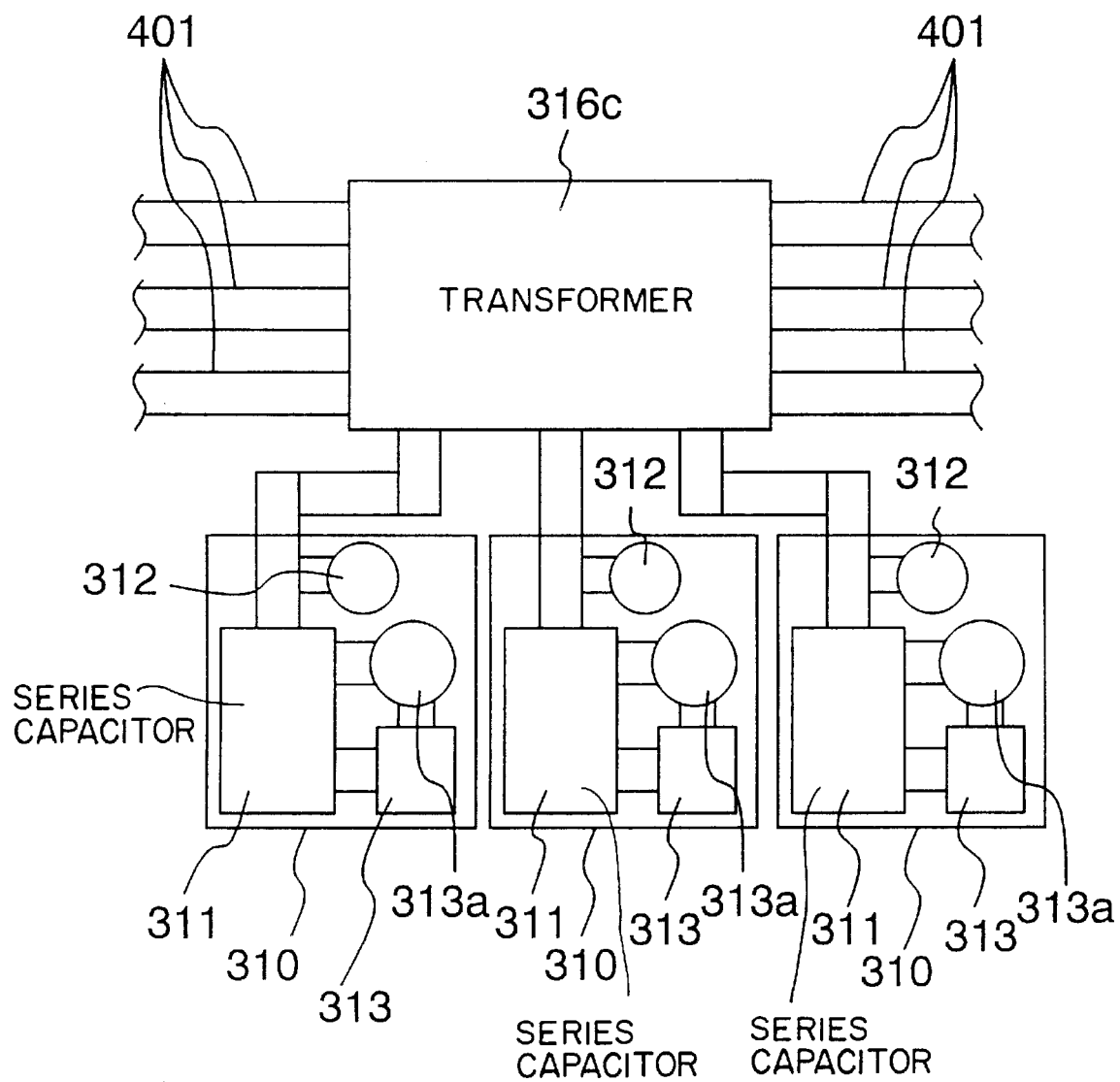
FIG. 13 is a block diagram showing an electric power flow controller according to another embodiment of the present invention.

FIG. 13 shows a locating arrangement of the series compensator based on the circuit arrangement shown in FIG. 12. Herein, the transformer 316c is connected to a gas insulated switching device 401. The series compensator 310 is connected to the transformer 316c on the side of the compensator having no connection with the gas insulated switching device 401. The overvoltage protecting device 312 is connected between the series capacitor 311 and the transformer 316c. This connection makes it possible to inhibit the overvoltage intruded into the series capacitor 311 from the power system to the transformer 316c or the overvoltage intruded from the series capacitor 311 to the inside of the transformer 316c. The series capacitor 311 and the semiconductor switch 313, as shown in FIG. 13, are located to contact so wide an area as allowing them to be more easily checked and maintained. This location makes it easy to install the heavy component, that is, the series capacitor 311 and to maintain the semiconductor switch 313. Further, in this embodiment, the power line is led to the semiconductor switch 313 vertically with respect to the locating direction of the gas insulated switching device provided on the each-phase transmission line. This makes it possible to compact the three compensators for three phases in a minimum space.

Figure 14:
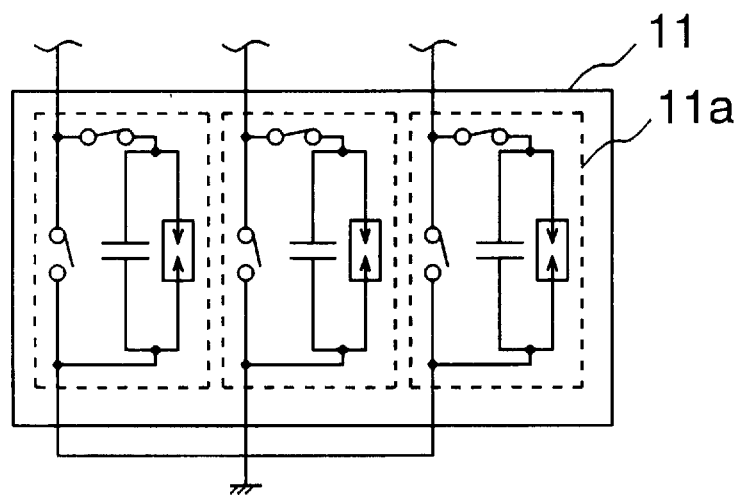
FIG. 14 is a circuit diagram showing a series compensating device included in the embodiment of the present invention.

FIG. 14 shows an arrangement of the series reactance compensator used in the electric power flow controller of the present invention. As shown, the series reactance compensator 11 is made up of three series compensating units 11a, each unit of which includes a series compensating capacitor, an excessive voltage protector connected in parallel to the capacitor and a switching device for inserting or separating the series capacitor. Though not shown, the capacitor may be made up of plural capacitor units so that the capacitance of the capacitor may be varied by the semiconductor switch. By changing the switching state of the semiconductor switch, it is possible to determine how much of the capacitance is added to the system and thereby adjust a series compensation to be executed.

Figure 15:
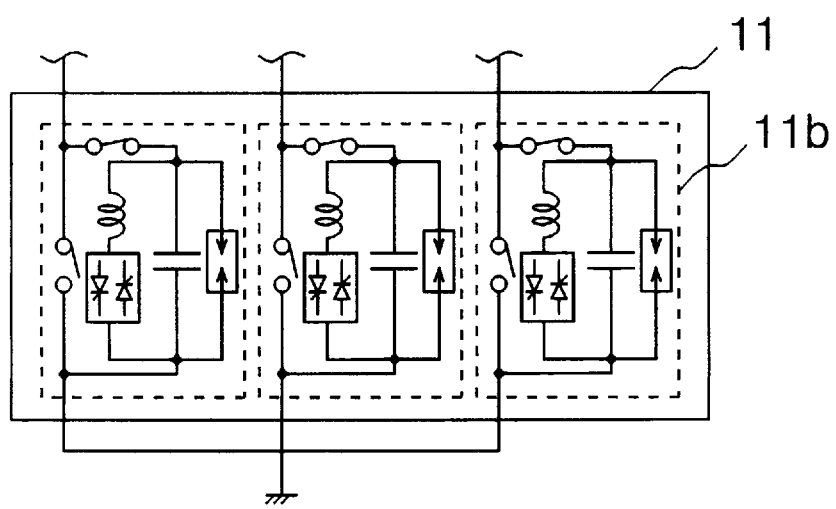
FIG. 15 is a circuit diagram showing a series compensating device included in the embodiment of the present invention.

FIG. 15 shows another arrangement of the series compensator 11. The series compensator 11 is made up of three series compensating units 11b, each of which includes the components of the series compensating unit 11a and a semiconductor switch composed of a semiconductor element such as a thyristor, the switch being connected in parallel to the capacitor. This arrangement allows a series compensation to be adjusted by adjusting how much of capacitance to be added to the transmission line and the series compensation to be rapidly changed by controlling the semiconductor switch.

Figure 16:
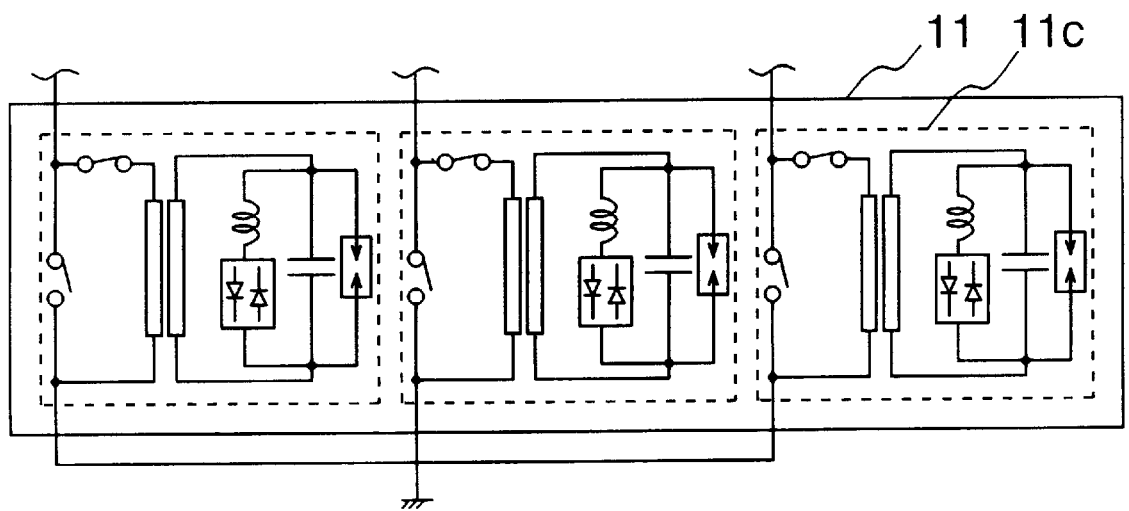
FIG. 16 is a circuit diagram showing another series compensating device included in the embodiment of the present invention.

FIG. 16 shows another arrangement of the series compensator 11. The series compensator 11 is made up of three series compensating units 11c, each of which includes the components of the series compensating unit 11b shown in FIG. 15 and a transformer. The series capacitor and the semiconductor switch are connected to the electric power flow controller through the transformer. Hence, the series capacitor and/or the semiconductor switch may be electrically insulated from the electric power flow system.

Figure 17:
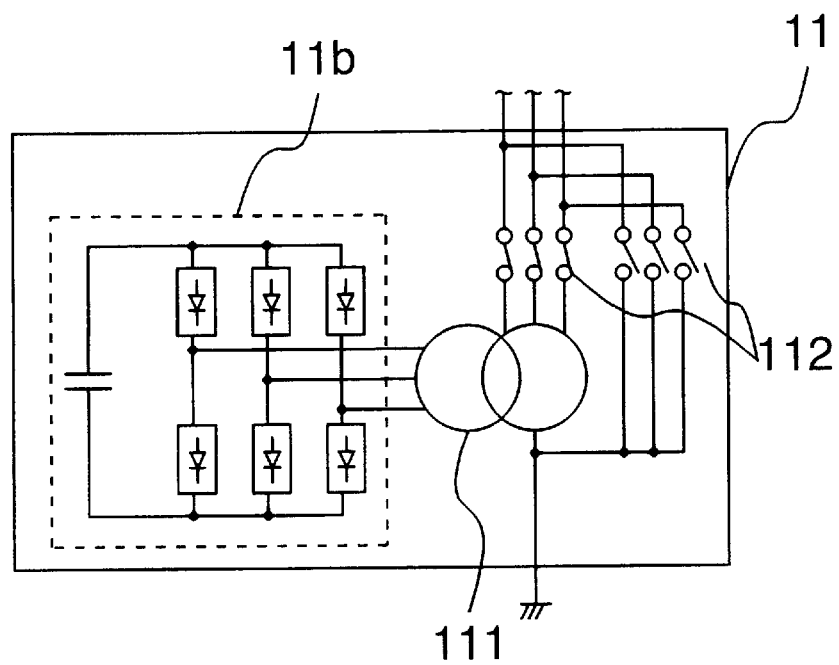
FIG. 17 is a circuit diagram showing another series compensating device included in the embodiment of the present invention.

FIG. 17 mainly shows a series compensating unit 11d having a converter for generating the same voltage as the voltage generated by the series compensating unit having the series capacitor inserted therein. The series compensating unit 11d is connected to the system through a transformer 111 and is connected to or separated from the power system through the effect of the switching device 112. The series compensating unit 11d composed of the converter allows the generated voltage waveform to be rapidly and easily adjusted. Hence, the unit 11d is allowed to follow the fluctuation of the power system (for example, the fluctuation of 2 to 3 Hz).

Figure 1:
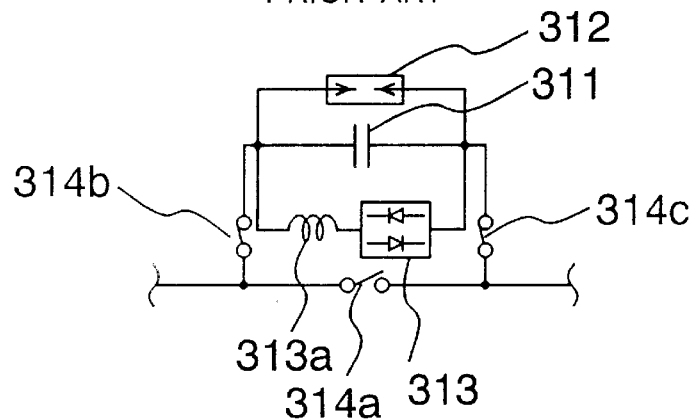
FIG. 1 is a circuit diagram showing a conventional series compensating device.
Figure 2:
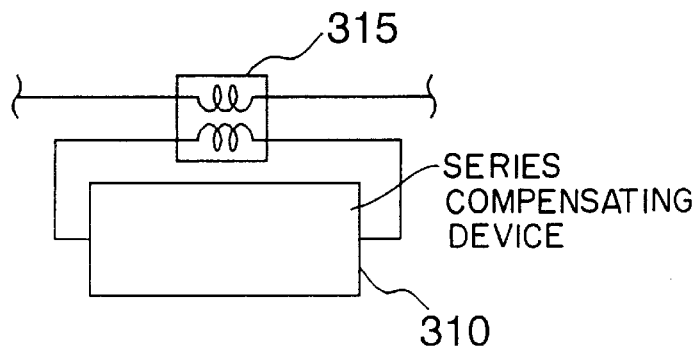
FIG. 2 is a circuit diagram showing another conventional series compensating device.
Figure 18:
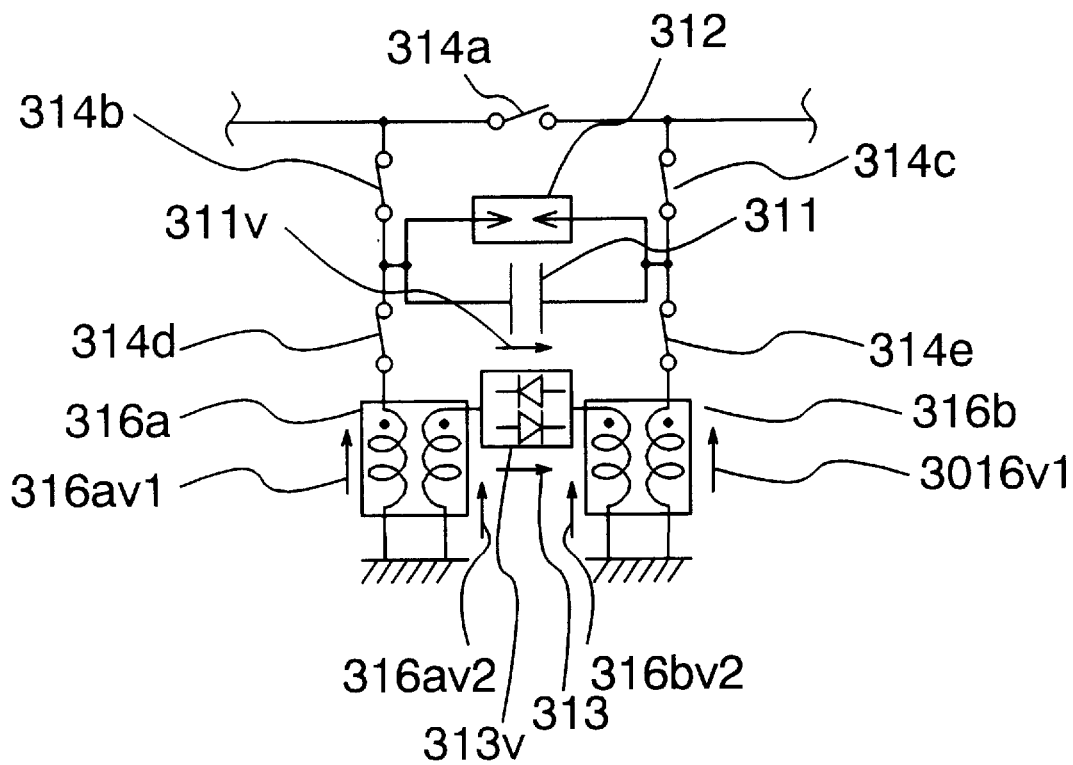
FIG. 18 is a circuit diagram showing the series compensating device of the embodiment in which a semiconductor switch is located on the low voltage side.

FIG. 18 shows an embodiment of the series reactance compensator used in the electric power flow controller according to the present invention. Compared with the conventional series compensator as shown in FIG. 1 or 4, this series reactance is arranged so that the potential of the semiconductor switch 313 is located on the low-voltage side though the series capacitor 311 keeps the system voltage like the conventional compensator. In this embodiment, the series capacitor 311 is connected in parallel to an overvoltage protecting device 312 served as a protector composed of a discharge gap or nonlinear resistance element. The series capacitor 311 is added to or separated from switching devices 314a, 314b and 314b served as protectors as well. The semiconductor switch 313 is composed of a semiconductor element such as a thyristor or a gate turn-off thyristor so that the semiconductor switch 313 may control the forward or reverse current. The semiconductor switch 313 is connected to the second sides of the two transformers 316a and 316b, the primary sides of which are connected between the system and the ground. The transformers 316a and 316b take divisional responsibility of leakage reactance of a reactor 313a, respectively. Those transformers have the same ratios of transformation and winding directions as each other. The switching devices 314d and 314e are used for connecting the transformers 316a and 316b to both ends of the series capacitor 311. These switching devices serve to connect the semiconductor switch 313 to the series capacitor 311 at a time. Through the effect of the transformers 316a and 316b, the voltage to ground of the semiconductor switch 313 is made lower than the system voltage. This results in reducing the insulating distance between the semiconductor switch 313 and the ground, thereby eliminating the necessity of locating the switch in a high place. Hence, the series compensator of the present invention more easily secures the earthquake resistance and lessens the worker's danger of doing a check and maintenance operation in a high place. Further, the series compensator more easily install the control and signal lines of the semiconductor switch, the power line, and the insulated pipes for passing a coolant medium for cooling the semiconductor element. These control and signal lines, the power line and the insulated pipes are required to be distributed from the voltage-to-ground point to the semiconductor switch. Further, the semiconductor 313 may be held in a house or a tank located on the ground. It means that the maintainability and driving characteristic of the semiconductor switch 313 are improved. When maintaining and checking the semiconductor switch 313, only if the switching devices 314d and 314e are made open, the semiconductor switch 313 is allowed to be checked and maintained without having to stop the series compensation done by the series capacitor 311. If the driving of the power system is stopped, the charges left in the series capacitor 311 are discharged by itself and thus the power system is safe, because both ends of the series capacitor 311 are grounded through the transformers 316a and 316b.

Figure 19:
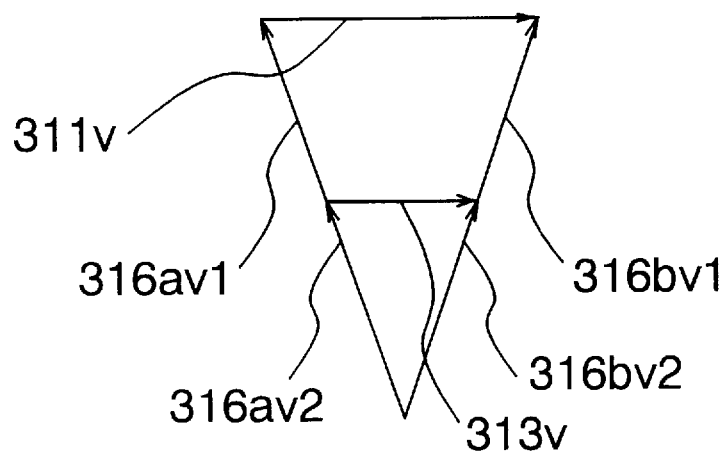
FIG. 19 is a view showing a voltage vector appearing when the semiconductor switch of the series compensating device is located on the low voltage side.

In turn, the description will be oriented to how to control an electric power through the effect of the series reactance compensator with reference to FIG. 19, as taking the series reactance compensator shown in FIG. 15 as an example.

At first, the description will be oriented to the relation among a voltage vector 311v between both ends of the series capacitor 311, a voltage vector 313v between both ends of the semiconductor switch, and voltage vectors 316av1 and 316bv1 on the primary side of each of the transformers 316a and 316b.

The voltage $V_{311v}$ between both ends of the series capacitor 311 is represented by $$\vec{V}_{311v} = jX_c \vec{I} \quad (1)$$

where V denotes a voltage to ground of the power system, I denotes a line current, and jXc denotes a reactance of the series capacitor 311. Assuming that the transformers 316a and 316b have a ratio of transformation of n:1, the primary side voltages $V_{316av1}$ and $V_{316bv1}$ and the secondary side voltages $V_{316av2}$ and $V_{316bv2}$ of the transformers are represented as follows:

$$\vec{V}_{316av1} = n\vec{V}_{316av2} \quad (2)$$

$$\vec{V}_{316bv1} = n\vec{V}_{316bv2} \quad (3)$$

where ideal transformers are considered as the transformers 316a and 316b, for simplifying the description.

The following relation is established between the voltage V311v between both ends of the series capacitor 311 and the primary side voltages $V_{316av1}$ and $V_{316bv1}$ of the transformers 316a and 316b:

$$\vec{V}_{311v} = \vec{V}_{316bv1} - \vec{V}_{316av1} \quad (4)$$

Further, the following relation is established between the voltage 313v between both ends of the semiconductor switch and the secondary side voltages $V_{316av2}$ and $V_{316bv2}$ of the transformers 316a and 316b:

$$\vec{V}_{313v} = \vec{V}_{316bv2} - \vec{V}_{316av2} \quad (5)$$

The substitution of the expressions (2), (3) and (5) into the expression (4) yields the following relation between the voltage $V_{311v}$ between both ends of the series capacitor and the voltage 313v between both ends of the semiconductor switch:

$$\vec{V}_{311v} = n(\vec{V}_{316bv2} - \vec{V}_{316av2}) = n\vec{V}_{313v} \quad (6)$$

If the winding direction of the primary winding is reverse to that of the secondary winding in the transformers 316a and 316b, the foregoing expressions (2) and (3) are transformed as follows:

$$\vec{V}_{316av1} = -n\vec{V}_{316av2} \quad (7)$$

$$\vec{V}_{316bv1} = -n\vec{V}_{316bv2} \quad (8)$$

Hence, the following relation is established between the voltage V311v between both ends of the series capacitor 311 and the voltage $V_{313v}$ between both ends of the semiconductor switch:

$$\vec{V}_{311v} = -n\vec{V}_{313v} \quad (9)$$

Since the transformers 316a and 316b have the same ratio of transformation, the vector 311v keeps the same phase or the antiphase as the vector 313v. The ratio of vector magnitude between these vectors is the same as the ratio of transformation of the transformers 316a and 316b. The series capacitor, the semiconductor and the transformers that have the foregoing phase relations compose the electric power flow controller of the present invention. As such, if the semiconductor switch is located on the lower voltage side than the power voltage, the electric power flow controller of the present invention enables to keep the same phase relation of current and voltage as the conventional controller arranged to keep the semiconductor switch at the power system. The phase relation is important to switching on and off the semiconductor switch.

Moreover, the current I313 passed through the semiconductor used in the controller of the present invention is specific times as large as the line current I, because the transformers 316a and 316b have a ratio of transformation of n:1. That is, the current I313 is $$\vec{I}_{313} = -n\vec{I} \quad (10)$$

By adjusting the transformation ratio of the transformers 316a and 316b by the expressions (9) and (10), it is possible to pre-measure the voltage applied between both ends of the semiconductor switch 313 and the current passing through the switch 313 and control the measured values to be in the allowable rated range of the switch 313.

Figure 20:
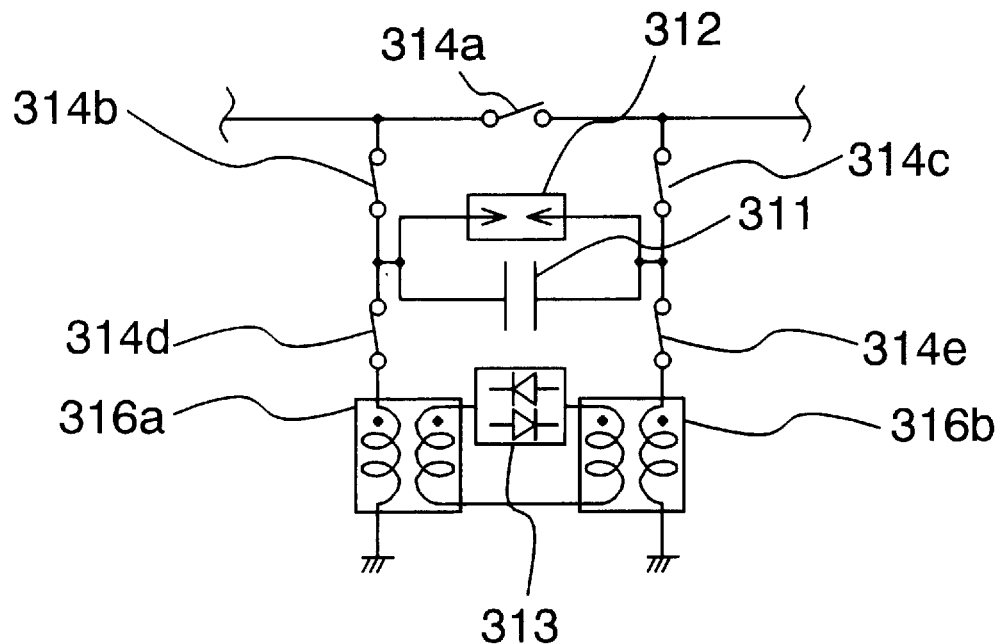
FIG. 20 is a circuit diagram showing the series compensating device of the embodiment in which a connection of a transformer is changed in a case that the semiconductor switch is located on a low voltage side.

FIG. 20 shows a series compensator according to another embodiment of the present invention, which is the same as the device arrangement shown in FIG. 18 except the specific point. In this embodiment, the secondary sides of the transformers 316a and 316b are not grounded. This circuit arrangement keeps the phase relation shown in FIG. 19. Hence, like the circuit shown in FIG. 18, the semiconductor switch may be controlled. The feature of this circuit is laid on the respect that the semiconductor switch 313 is electrically insulated from the electric power system. The insulation is effective in preventing the malfunction of the semiconductor switch caused by the noises intruded from the ground.

Figure 21:
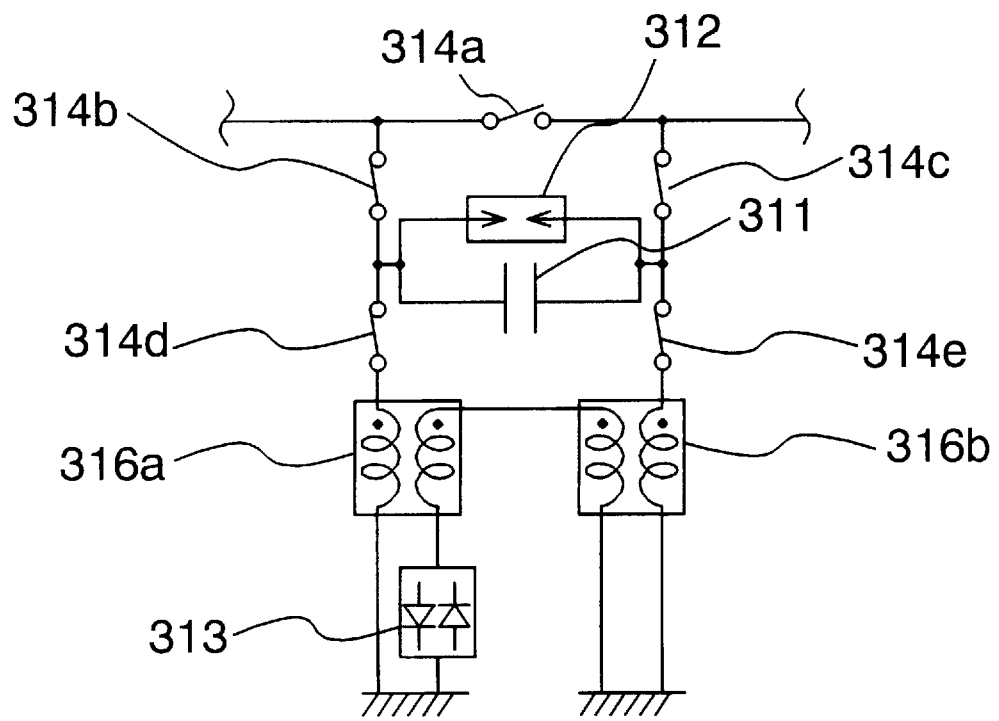
FIG. 21 is a circuit diagram showing the series compensating device of the embodiment whose installed location is changed when the semiconductor switch is located on the low voltage side.

FIG. 21 shows a series compensator according to another embodiment of the present invention, which is the same as the circuit arrangement shown in FIG. 18 except the specific point. In this embodiment, the semiconductor switch 313 is located on the ground side of the secondary side of the transformer 316a. As such, one terminal of the semiconductor switch 313 keeps the ground potential and the voltage applied between both ends of the switch 313 may be adjusted by varying the transformation ratios of the transformers 316a and 316b. In particular, the voltage to ground is allowed to be reduced into a fraction as compared with the arrangement where the switch 313 is directly inserted into the electric power system. It means that the semiconductor switch 313 may be easily held in a house or a tank located on the ground.

Figure 22:
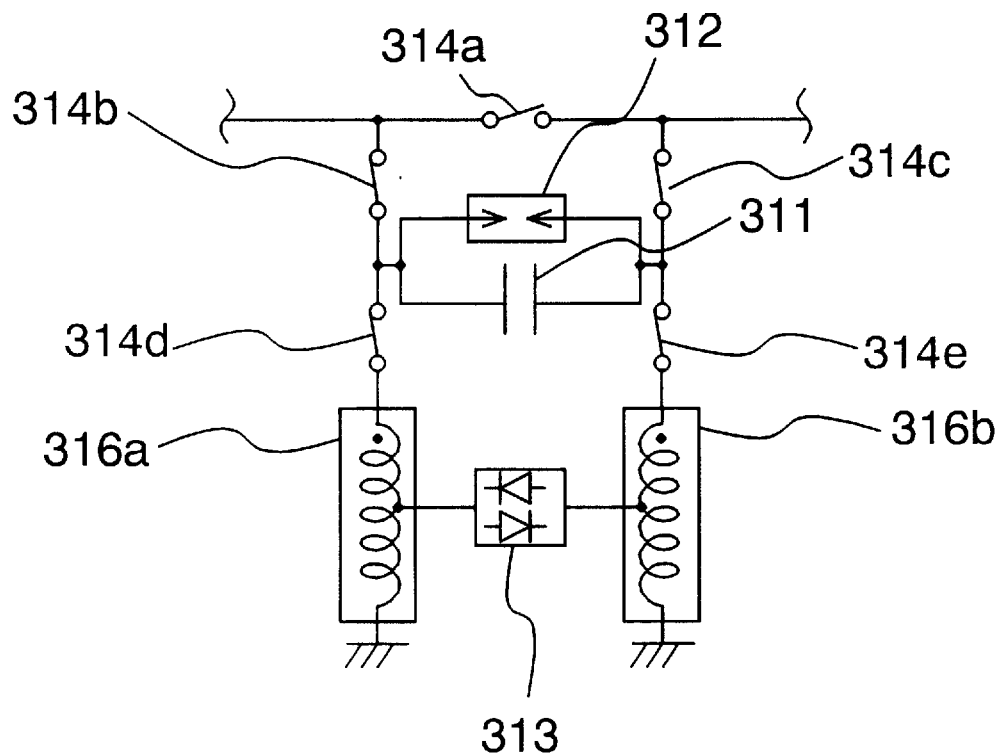
FIG. 22 is a circuit diagram showing the series compensating device of the embodiment in which an autotransformer is provided in a case that the semiconductor switch is located on the low voltage side.

FIG. 22 shows a series compensator according to another embodiment of the present invention, which is the same as the circuit arrangement shown in FIG. 18 except a specific point. This compensator is arranged so that the autotransformers are used for the transformers 316a and 316b provided in the circuit shown in FIG. 18. The compensator keeps the phase relation among the components as the circuit of FIG. 18. Hence, the use of the autotransformers simplifies the winding structure of the transformers, so that the insulation to ground may be easily secured if the system passes a high voltage. In addition, the compensator of this embodiment provides the same effect as the circuit of FIG. 18.

Figure 23:
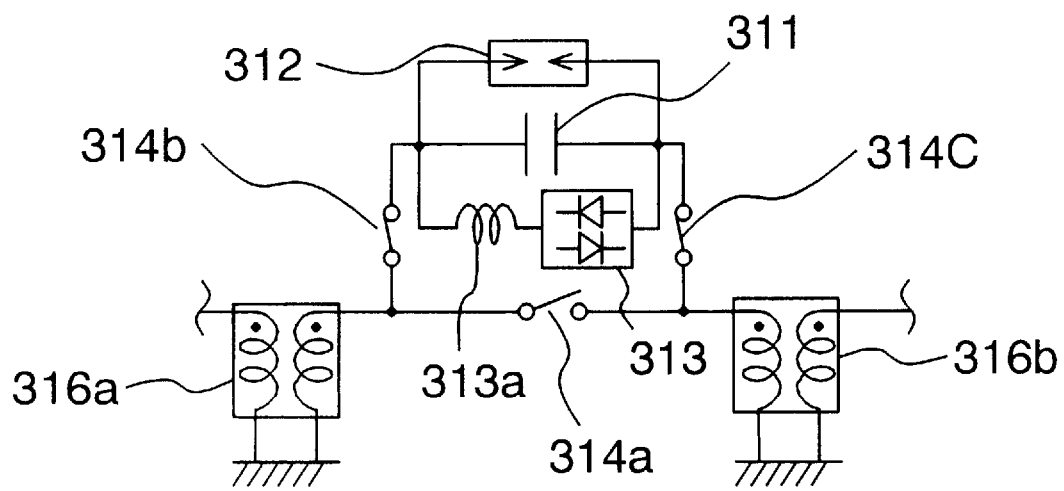
FIG. 23 is a circuit diagram showing the series compensating device of the embodiment in which the potential of the overall device is changed in a case that the semiconductor switch is located on the low voltage side.

FIG. 23 shows a series compensator according to another embodiment of the present invention. The compensator is arranged so that the transformers 316a and 316b are inserted onto the power system. Hence, the compensator may optionally select the potential to ground of the overall compensator or be used by setting transformation ratios if the transformers 316a and 316b process the corresponding system voltages. However, the transformers 316a and 316b are required to pass the transmission power, so that the transformers need to have the same capacity as the normal boosting or depressing transformer. However, the winding structures of the transformers do not have an adverse effect on the voltage vectors of the series capacitor 311 and the semiconductor 313. The compensator, therefore, provides an effect that the transformers 316a and 316b are allowed to be more freely designed.

Figure 24:
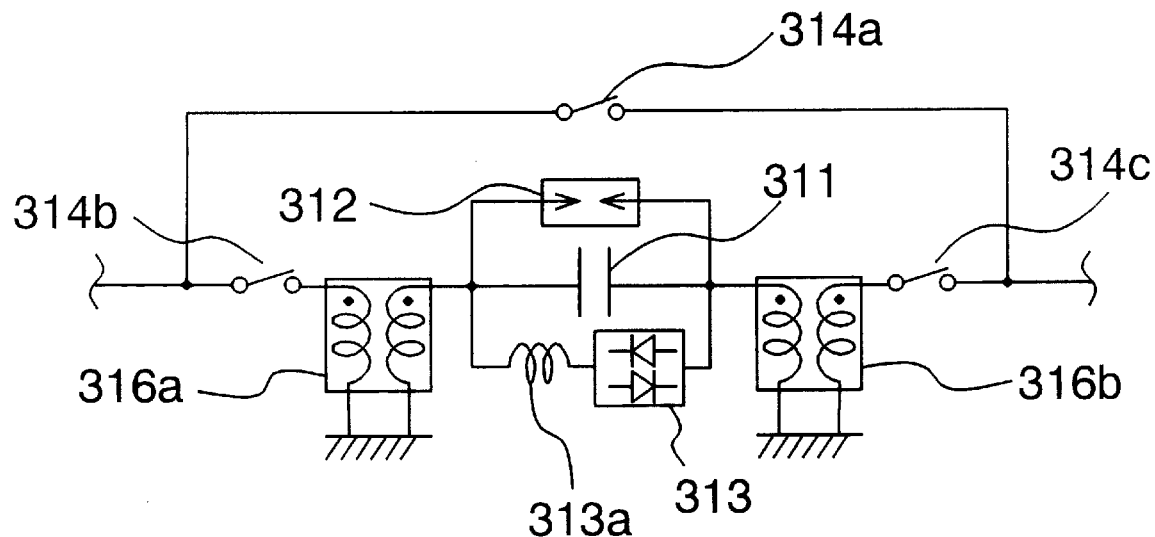
FIG. 24 is a circuit diagram showing the series compensating device of the embodiment in which a bypass circuit is provided in a case that the semiconductor switch is located on the low voltage side.

FIG. 24 shows a series compensator according to another embodiment of the present invention, in which switching devices 314a, 314b and 314c serve to bypass the overall compensator having the transformers 316a and 316b shown in FIG. 23. The transformers 316a and 316b are coupled to the same voltage class and have the same ratio of transformation. This arrangement is advantageous in keeping the power system driven if the series compensator having the transformers 316a and 316b are required to be stopped for check and maintenance.

Figure 25:
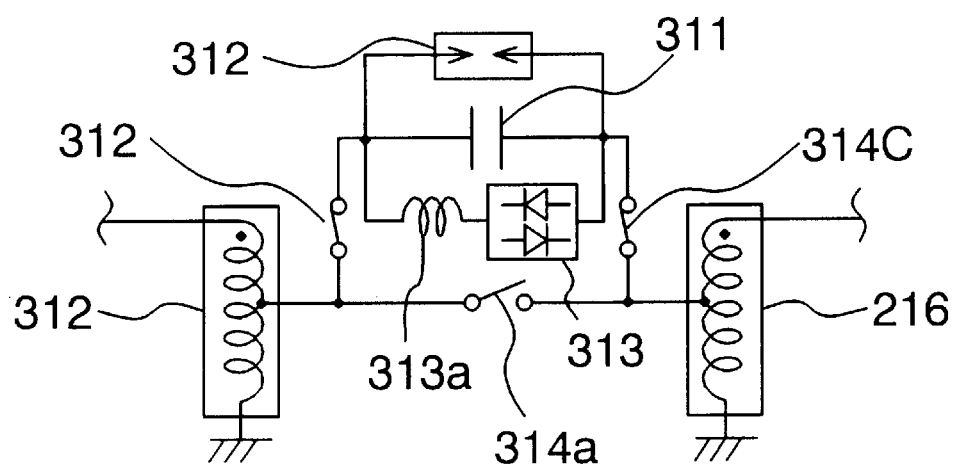
FIG. 25 is a circuit diagram showing a transformation of the arrangement shown in FIG. 23, in which an autotransformer is provided in a case that the semiconductor switch is located on a low voltage side of the series compensating device of the embodiment.
Figure 26:
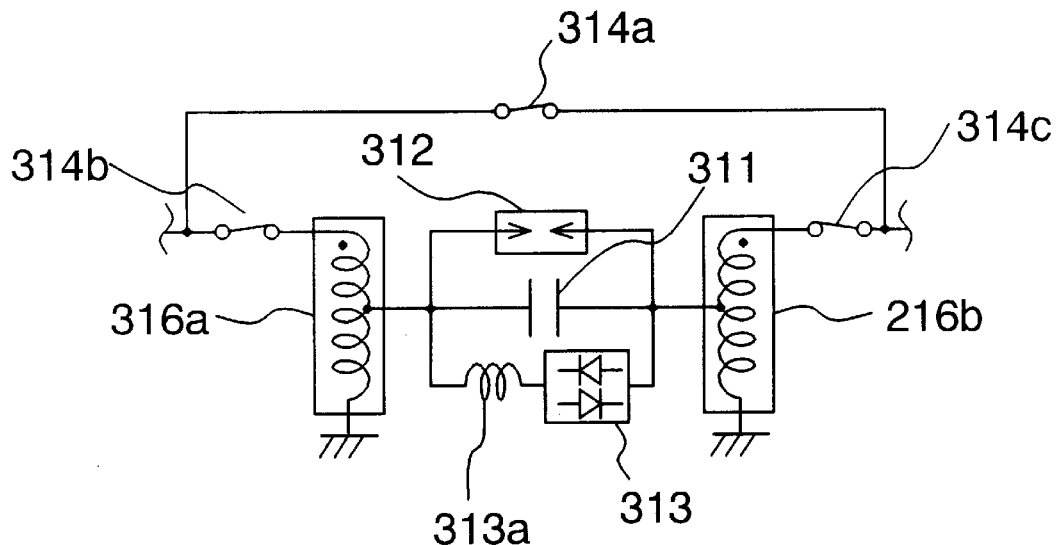
FIG. 26 is a circuit diagram showing a transformation of the arrangement shown in FIG. 24, in which an autotransformer is provided in a case that the semiconductor switch is located on a low voltage side of the series compensating device of the embodiment.

FIGS. 25 and 26 show a series reactance compensator according to an embodiment of the present invention, in which autotransformers are used for the transformers 316a and 316b shown in FIGS. 23 and 24, respectively. In particular, if the insulation to the ground needs to be secured against a high system voltage, the compensator is more easily designed and produced, because the use of the autotransformer makes it easy to produce a high-voltage transformer.

Figure 27:
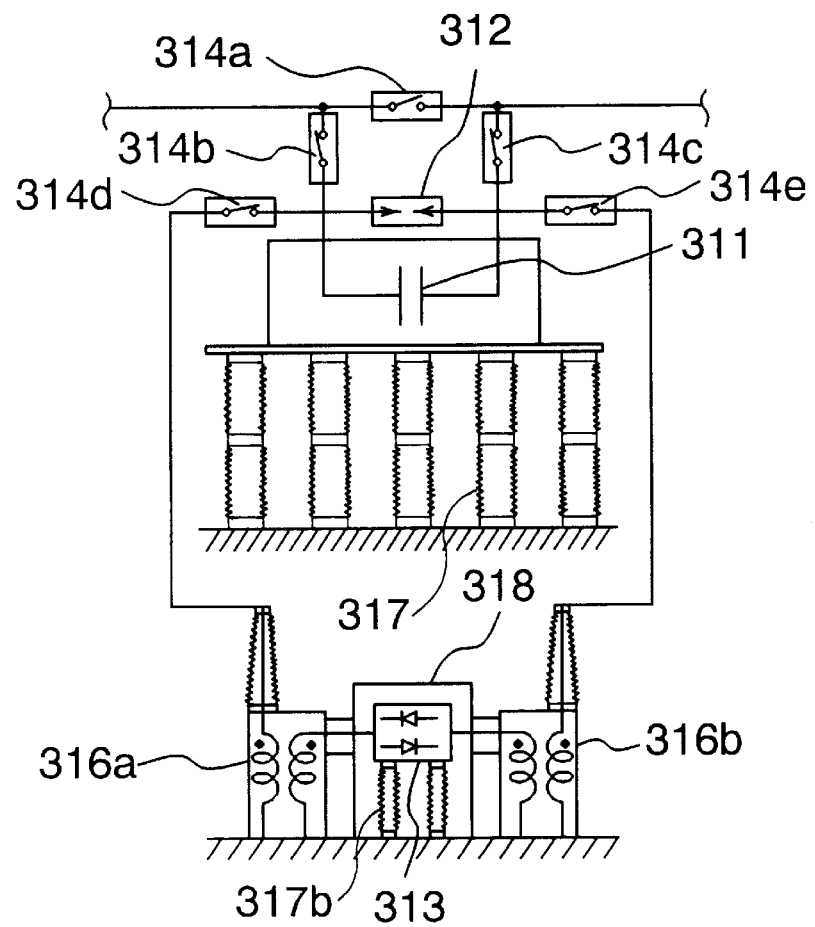
FIG. 27 is a circuit diagram showing an installation of the device shown in FIG. 18 in which the semiconductor switch is located on the low voltage side of the series compensating device of the embodiment.

FIG. 27 shows the locating arrangement of the device shown in FIG. 18. Since the voltage to ground of the series capacitor 311 is the same as the power system, the compensator is located on the insulated pedestal supported by the insulator 317a. On the other hand, the semiconductor switch 313 is located on the lower voltage side than the power voltage through the transformers 316a and 316b. Hence, it is possible to install in a lower place the insulator 317b required for the insulation to ground. Further, the semiconductor switch 313 may be more easily held in a house or a closed vessel 318 such as a gas insulated switching device or a grounded tank. This makes great contribution to enhancing the serviceability, reliability and safety of the compensator. In addition, it may be easily connected to another gas insulated switching device.

Figure 28:
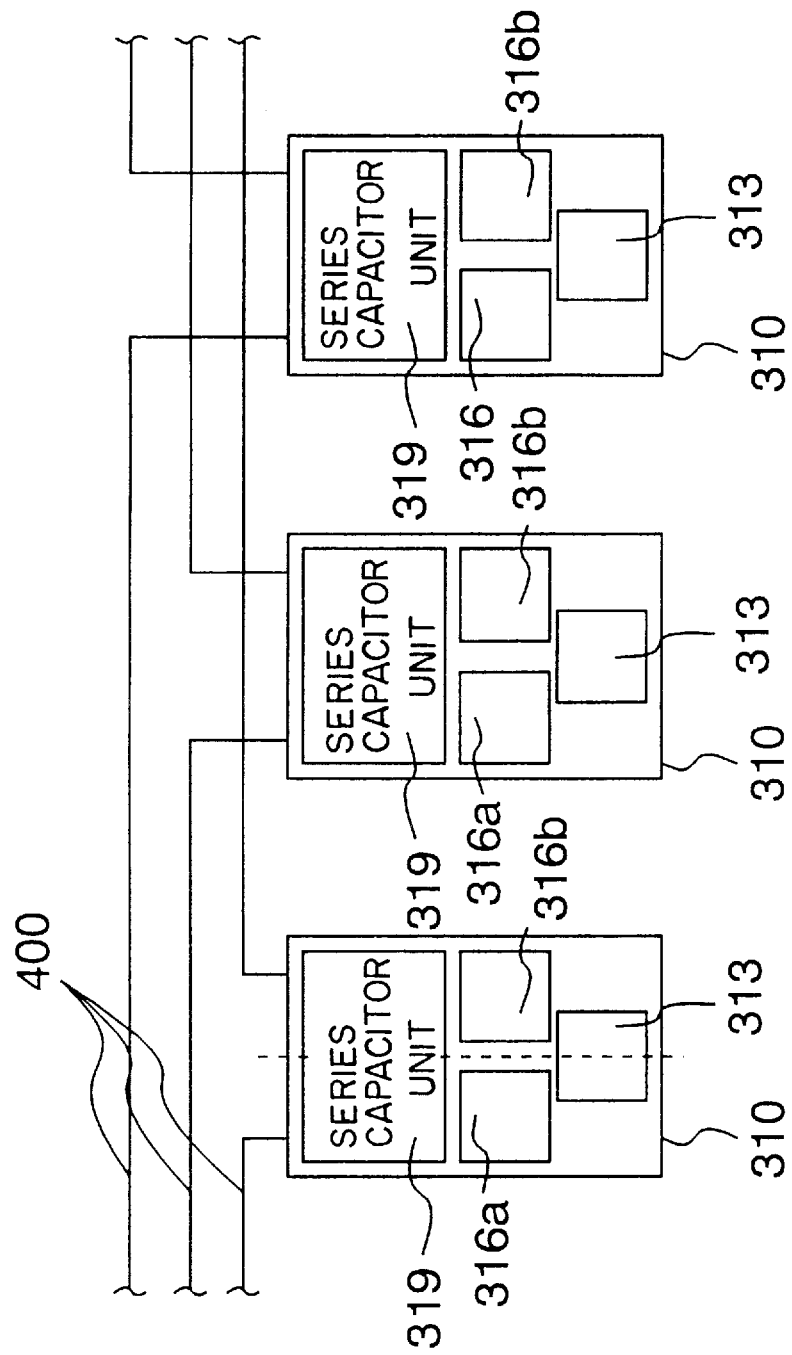
FIG. 28 is a block diagram showing an embodiment of the present invention in which the device of FIG. 18 is applied to a three-phase power transmission line.

FIG. 28 shows an arrangement of the electric power flow controller of the present invention that is located in a three-phase electric power system. Along the placement of the three-phase transmission line 400, there are laterally laid the three electric power flow controllers for three phases. The controller for one phase is arranged to have a series capacitor unit (including a series capacitor 311, an overvoltage protecting device 312, and switching devices 314a, 314b, 314c, 314d, 314e) 319, transformers 316a, 316b, and a semiconductor switch 313 as viewed from a closer portion to the high-voltage transmission power.

Figure 29:
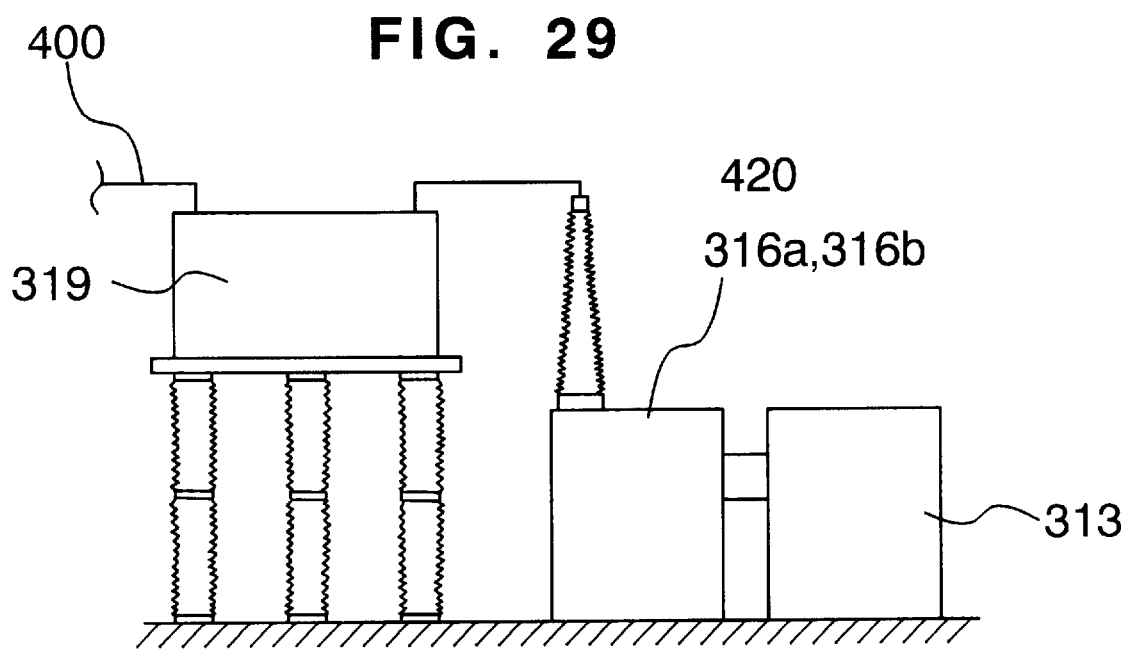
FIG. 29 is a side view of FIG. 28.

FIG. 29 is a section cut on the line A—A' of FIG. 28, which shows the controllers located as above. The output terminal of the series capacitor is connected to the semiconductor switch through the grounded transformer. As such, these devices may be more easily held in a house or tank located on the ground, that is, an insulated vessel. Further, the semiconductor switch 313 that is made a low-voltage portion is allowed to be located in a remote place from the transmission line 100, that is, a high-voltage portion. This makes it easier to install the control device for the switch and possible to check and maintain the high-voltage portion with no operator's contact, thereby allowing the operator to work safely.

In FIG. 28, a compensating capacitor is serially inserted onto each one of three-phase transmission lines. The transformer is symmetrically located on the center axis A—A' of the capacitor in a manner to correspond to the connecting terminal of each capacitor. Further, the semiconductor switch is laid on the axis so that the power line is connected to each device terminal by a minimum distance.

Figure 30:
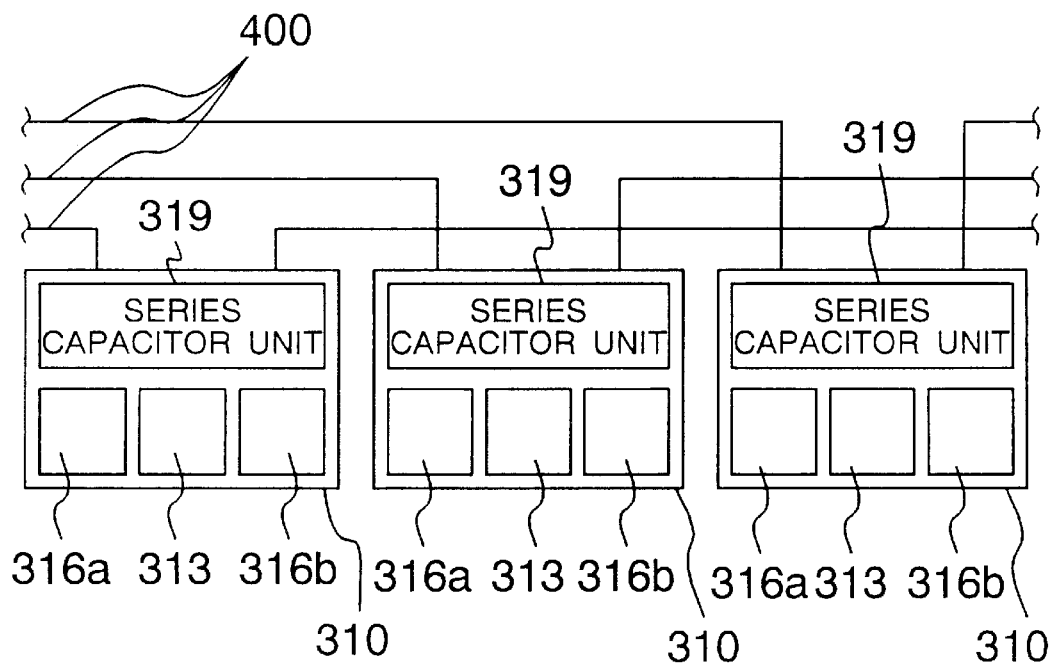
FIG. 30 is a block diagram showing a transformation of the arrangement shown in FIG. 28.

As in FIG. 28, FIG. 30 shows the three series compensators 310 for three phases that are laterally laid along the placement of the power transmission line 400. The compensator for each phase is arranged so that a transformer 316a, a semiconductor switch 313 and a transformer 316b are linear laid in parallel to the series capacitor unit 319. This type of placement reduces the width of the area required for installing the transmission line 400 and the series compensator 310.

Figure 31:
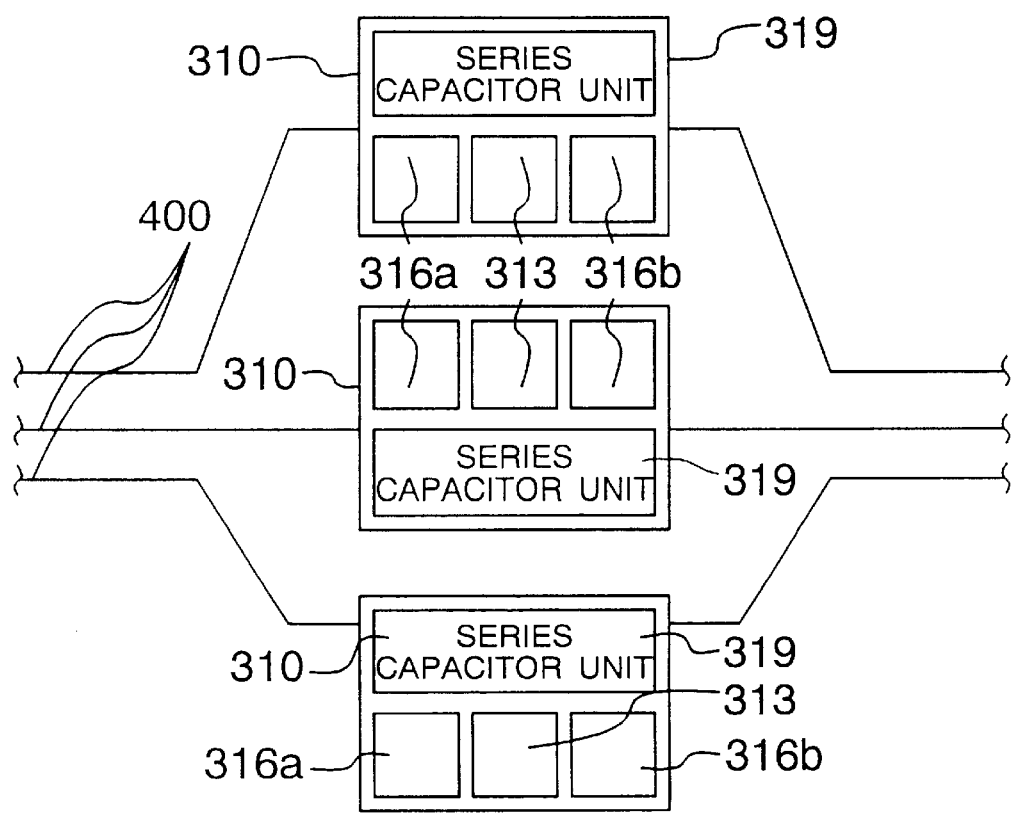
FIG. 31 is a block diagram showing a transformation of the arrangement shown in FIG. 28.

FIG. 31 shows an arrangement of three series compensators 310 for three phases located vertically with respect to the placing direction of the transmission line 400. The series compensator 310 has a series capacitor unit 319 as a high-voltage portion and a semiconductor switch 313 and transformers 316a and 316b as a low-voltage portion. The series capacitor unit 319 of one series compensator 310 is located in opposition to that of the adjacent compensator 310. Likewise, the semiconductor switch 313 and the transformers 316a and 316b of the compensator 310 are located in opposition to those of the adjacent compensator 310. Such a location allows the potential difference between the adjacent phases of the compensators to be reduced. This enables to lessen an intra-phase distance, thereby reducing the placing area.

FIG. 32 shows an arrangement of an operating circuit for a controlled variable of an electric power flow on a line. The circuit is used for controlling the electric power flow controller according to the present invention. This operating circuit receives a system voltage signal 201 and a system current signal 202 as input signals and feeds a controlled variable of an electric power flow on a line. As shown, the operating circuit includes a power flow operating unit, a reset filter 204a, a phase compensator 205a, a lowpass filter 206a and an amplifier 207a. The power flow operating unit 203 operates to derive a system power flow from the system voltage signal 201 and the system current signal 202. The system power flow is sent to the reset filter 204a in which the variation of the power flow is derived. Then, the phase compensator 205a operates to compensate a phase lag caused by the operation. The compensated variation is sent to the low-pass filter 206a in which noise components are removed from the compensated variation. Then, the amplifier 207a operates to amplify the filtered variation into the signal magnitude required for controlling the electric power flow controller. This process provides a control signal for controlling an on-line electric power flow in the electric power flow controller according to the present invention.

FIG. 33 shows an arrangement of an operating circuit for a controlled variable of a system frequency if the electric power flow controller of the present invention is controlled according to the power frequency condition. The operating circuit receives a system voltage signal or system current signal 209 as an input and feeds a system frequency controlled variable 211. As shown, the operating circuit includes a frequency counter 210b, a reset filter 204b, a lowpass filter 206b and an amplifier 207b. The frequency counter 210 operates to derive a system frequency from the system voltage signal or system current signal 209. Then, the reset filter 204b operates to derive the variation of the system frequency. The variation is sent to the low-pass filter 206b in which noise components are removed from the variation. Next, the amplifier 207b operates to amplify the filtered variation signal into a certain signal magnitude required for control. This process provides a control signal for controlling a system frequency used in the electric power flow controller according to the present invention.

FIG. 34 shows an arrangement of an operating circuit for controlling a generator speed if the electric power flow controller of the present invention is controlled according to the output state of the generator. The operating circuit receives a generator speed signal 212 as an input and feeds a controlled variable of a generator speed. The signal 212 indicates a rotation speed of the generator. As shown, the operating circuit includes a frequency counter 210c, a reset filter 204c, a low-pass filter 206c and an amplifier 207c. The frequency counter 210c operates to derive a system frequency based on the generator speed signal 212 obtained from a sensor (not shown) for sensing a rotation speed of the generator. The system frequency is sent to the reset filter 204c in which the frequency variation is derived. Then, the low-pass filter 206c operates to remove the noise components from the frequency variation. Next, the amplifier 207c operates to amplify the filtered frequency variation signal into a certain signal magnitude required for control. This process provides a control signal for controlling a system frequency used in the electric power flow controller according to the present invention.

Figure 35:
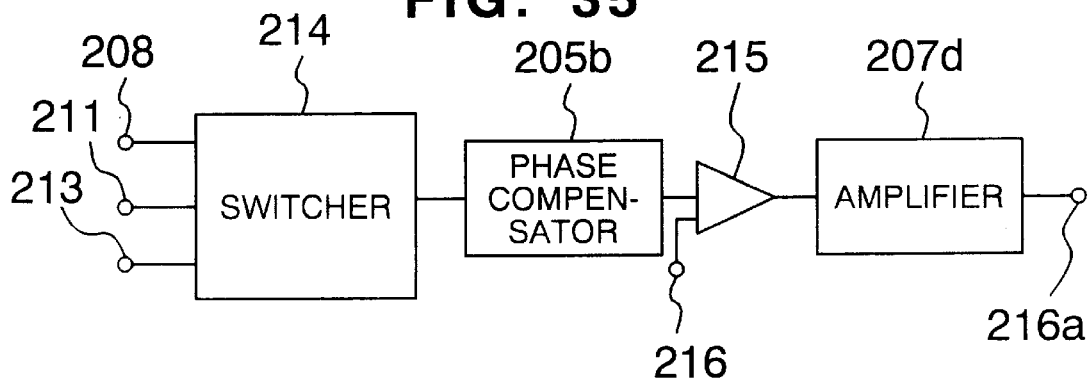
FIG. 35 is a block diagram showing an operating circuit for a controlled variable of the series compensator, the circuit used for controlling the electric power flow controller of the present invention.

FIG. 35 shows an arrangement of an operating circuit for a controlled variable of series compensation used for controlling the series reactance compensator provided in the electric power flow controller of the present invention as shown in FIG. 3. This operating circuit operates to switch a control input for an object to be controlled. The circuit has as inputs the on-line power flow controlled variable 208, the system frequency controlled variable 211 and a generator speed controlled variable 213 as shown in FIGS. 32 to 34. One of these input signals is optionally selected according to an object to be controlled. As shown, the operating circuit includes a switcher 214, a phase compensator 205b, a differential operator 215 and an amplifier 207d. The input signal is selected by the switcher 214. Then, the input signal is sent to the phase compensator 205b in which the phase lag of the signal is corrected. Next, the corrected signal is sent to the differential operator 215 in which the signal is synthesized with a series compensating command value 216. Then, the amplifier 207d operates to amplify the resulting signal into a signal magnitude required for controlling the controller. That is, the amplifier 207d feeds a series compensating controlled variable 216a.

Figure 36:
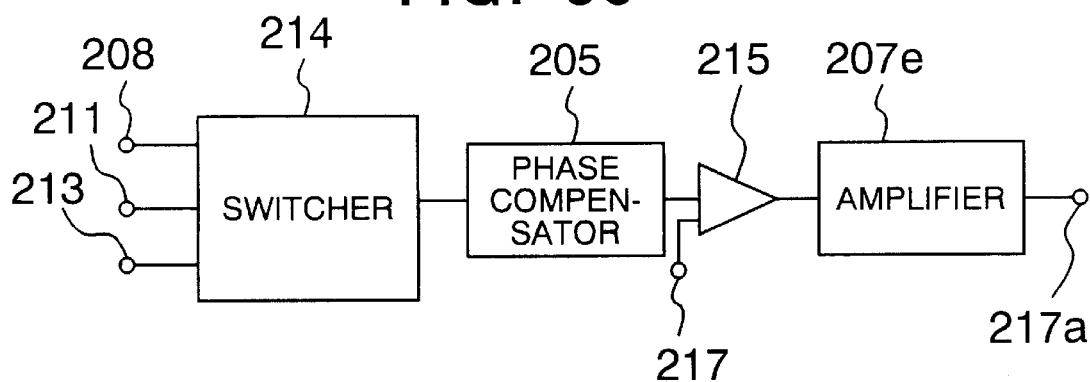
FIG. 36 is a block diagram showing an operating circuit for a controlled variable of a phase adjustor, the circuit used for controlling the electric power flow controller of the present invention.

FIG. 36 shows an arrangement of an operating circuit for a phase adjustor controlled variable used for controlling the phase adjustor provided in the electric power flow controller according to the present invention. Like the embodiment shown in FIG. 35, this operating circuit switchably selects a control input according to the object to be controlled. The control inputs includes the on-line power flow controllable variable 208, the system frequency controllable variable 211 and the generator speed controllable variable 213. One of these signals is selected according to the object to be controlled. As shown, this operating circuit includes a switcher 214, a phase compensator 205c, a differential operator 215 and an amplifier 207e. The proper control input is selected by the switcher 214. The selected control input is sent to the phase compensator 205 in which the phase lag of the input is corrected. Then, it is sent to the differential operator 215 in which it is synthesized with the phase adjusting command value 217. The synthesized signal is amplified into a certain signal magnitude required for controlling the controller in the amplifier 207e. Then, the amplifier 207e feeds a phase adjusting controllable variable 217a.

Figure 37:
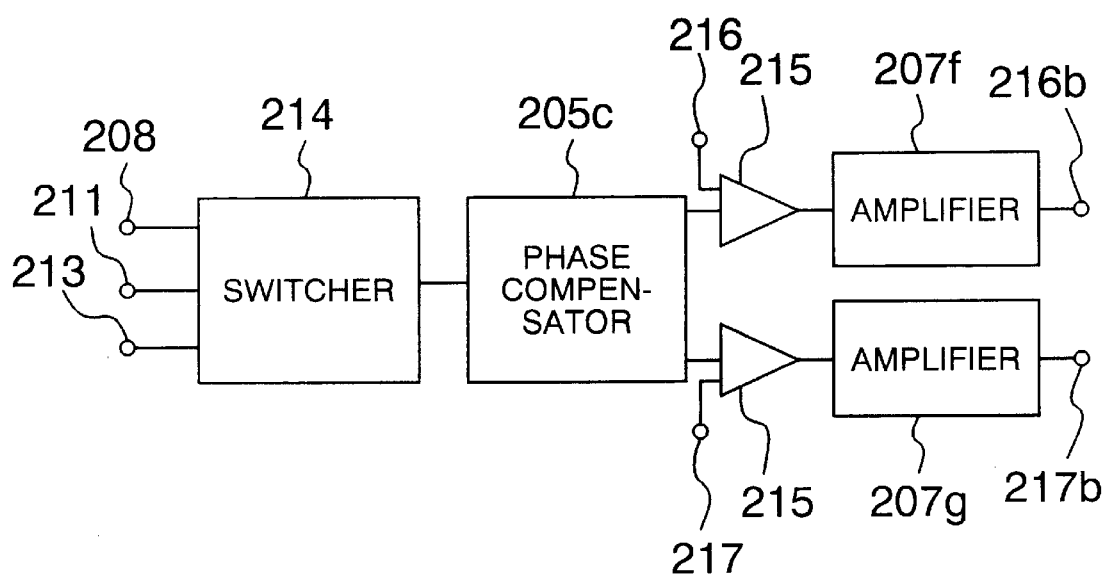
FIG. 37 is a block diagram showing an operating circuit for a complex controlled variable, the circuit used for controlling the electric power flow controller of the present invention.

FIG. 37 shows an arrangement of a control circuit for doing a series compensating control and a phase adjusting control in a complex manner. These controls are executed in the electric power flow controller according to the present invention. This complex control circuit switchably receives a control input according to an object to be controlled. The control inputs includes the on-line power flow controlled variable 208, the system frequency controlled variable 211 and the generator speed controlled variable 213. One of these control signals are optionally selected according to an object to be controlled. As shown, the complex control circuit includes a switcher 214, a phase compensator 205d, differential operators 215 and amplifiers 207f and 207g. A proper control input is selected by the switcher 214. Then, the selected control input is sent to the phase compensator 205d in which the phase lag of the control input is corrected and is divided into a series compensating control signal and a phase compensating control signal. The series compensating control signal is sent to the differential operator 215 in which it is synthesized with a series compensating command value 216. The synthesized signal is magnified into a proper signal magnitude to the control by the amplifier 207f. The amplifier 207f feeds a series compensation controlled variable 216b. The phase adjusting control signal is sent to the other differential operator 215 in which it is synthesized with a phase adjusting command value 217. The synthesized signal is sent to the amplifier 207g in which the signal is magnified into a proper signal magnitude to the control. Then, the amplifier 207g feeds a phase adjusting controllable variable 217b.

Figure 38:
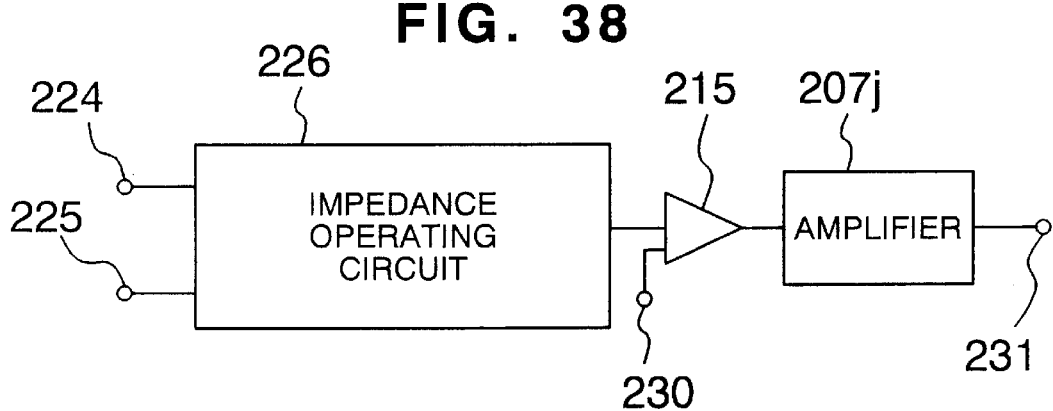
FIG. 38 is a block diagram showing an impedance control circuit used for controlling the electric power flow controller of the present invention.

FIG. 38 shows an operating circuit for deriving an impedance controllable variable if the controllable variable of the electric power flow controller according to the invention is derived on the basis of the impedance of the power system. As shown, the operating circuit includes an impedance operating circuit 226, a differential operator 215, and an amplifier 207j. The impedance operating circuit 226 receives a voltage signal 224 and a current signal 225 passing through the electric power flow controller and derives an impedance to be controlled by the electric power flow controller. Then, the derived impedance is sent to the differential operator 215 in which a deviation of the impedance from an impedance command value 230 is derived. the deviation is amplified into a proper signal magnitude to controlling the electric power flow controller. Then, the amplifier 207j feeds the amplified signal, that is, an impedance command 231. This impedance command 231 is inputted into the operating circuit for a series compensating controllable variable shown in FIG. 35 or the operating circuit for a phase adjusting controllable variable shown in FIG. 36.

Figure 39:
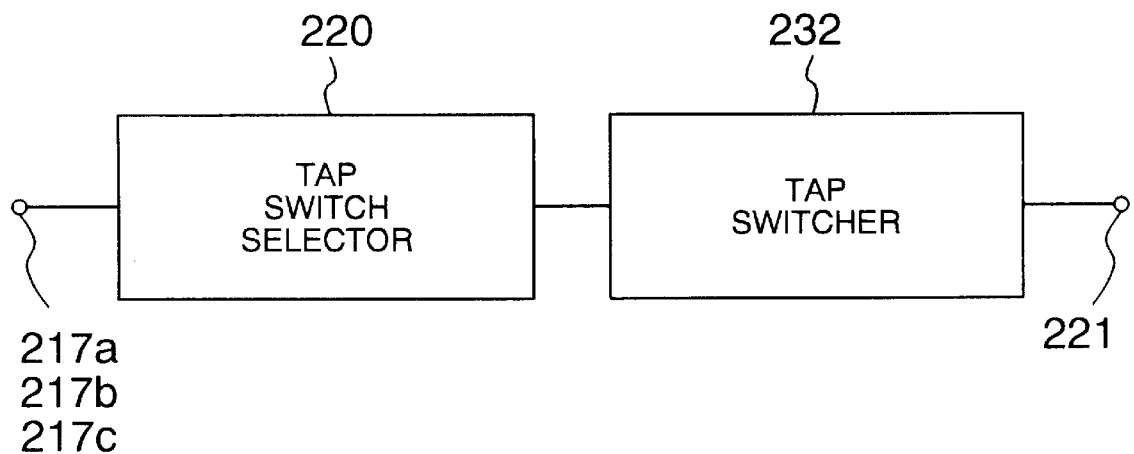
FIG. 39 is a block diagram showing a transformer voltage control circuit for the phase adjustor, the circuit used for controlling the electric power flow controller of the present invention.

FIG. 39 shows a tap control circuit used for controlling taps of an adjusting winding as shown in FIG. 8 if the phase is adjusted by the phase adjustor of the electric power flow controller of the invention. As shown, this tap control circuit includes a tap selector 220 and a tap switcher 232. The tap control circuit receives phase adjusting commands 217a, 217b and 217c as inputs. The tap selector 220 selects an object tap. Then, the tap switcher 232 feeds a control signal to the selected tap.

Figure 40:
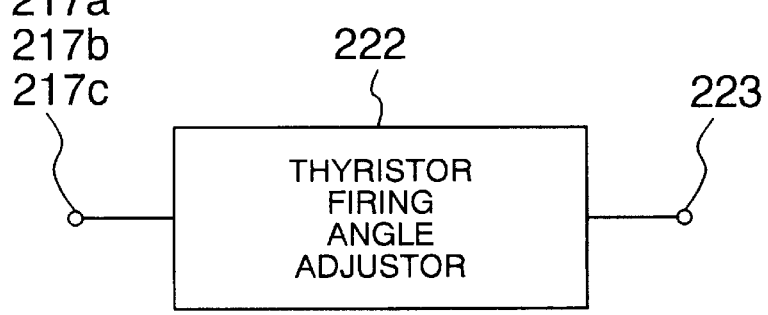
FIG. 40 is a block diagram showing an ignition phase control signal generating circuit for the series compensator, the circuit used for controlling the electric power flow controller of the present invention.

FIG. 40 shows a converter power control circuit used when the phase adjustor of the electric power flow controller of the invention controls the electric power through the effect of the converter shown in FIG. 9. This control circuit receives phase adjusting commands 217a, 217b and 217c as input signals and feeds a signal for firing and controlling the phase of the semiconductor elements such as a thyristor and a GTO composing the converter.

Figure 41:
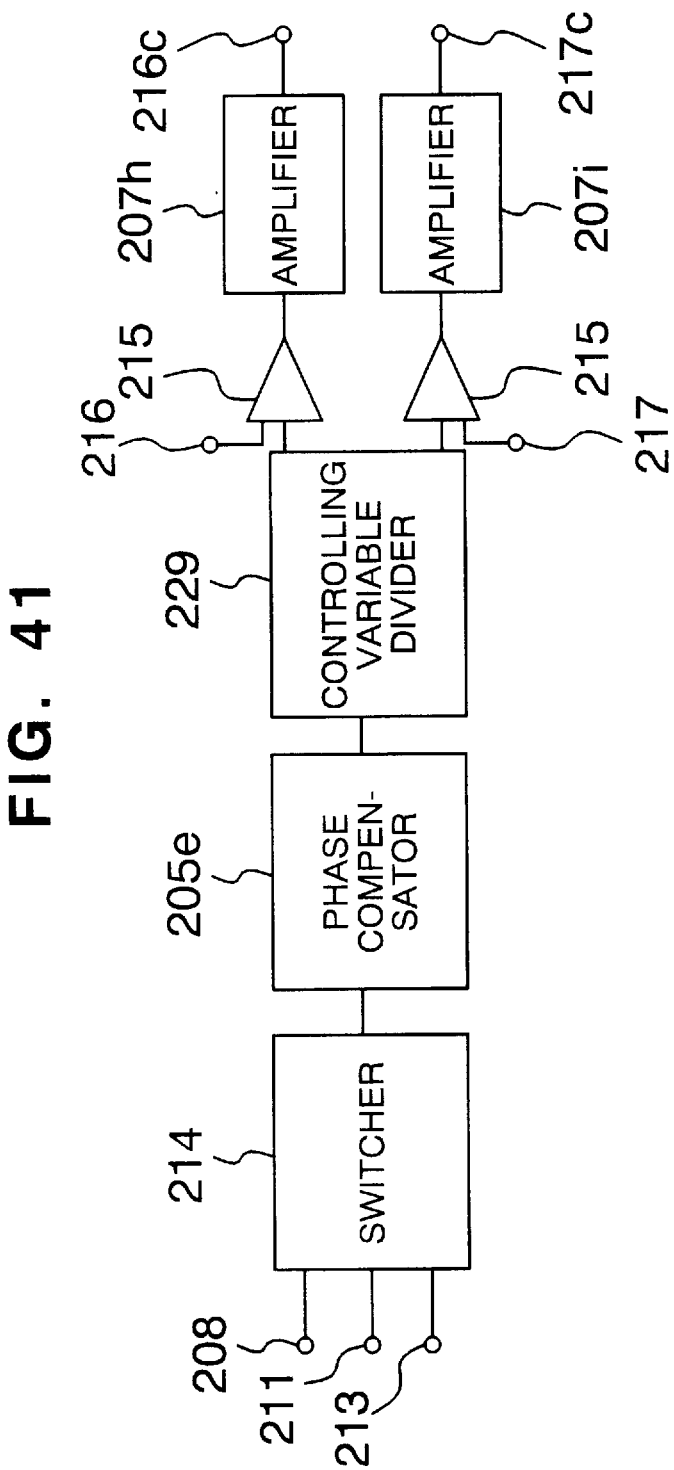
FIG. 41 is a block diagram showing a coordination control circuit for the phase adjustor and the series compensator, the circuit used for controlling the electric power flow controller of the present invention.
Figure 42:
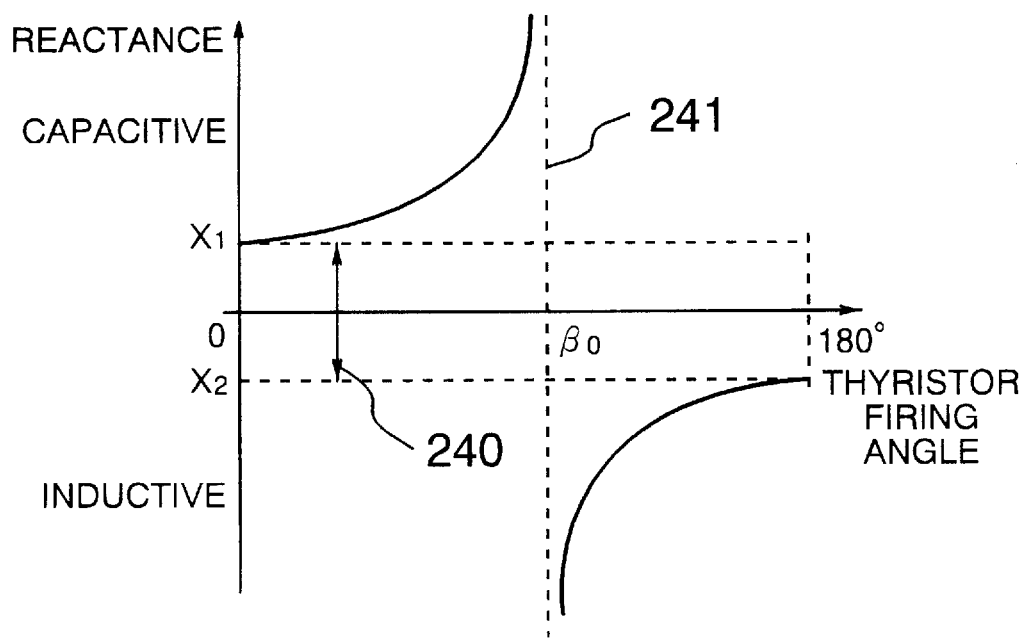
FIG. 42 is a graph showing a control range characteristic of the series compensator, the characteristic used for controlling the electric power flow controller of the present invention.

FIG. 41 shows an arrangement of a coordination control circuit for performing a series compensating control and a phase adjusting control for the electric power flow controller of the invention in concert. This coordination control circuit operates to switchably select one of control inputs according to an object to be controlled. The control inputs include an on-line power flow control controlled variable 208, a system frequency controlled variable 211 and a generator speed controlled variable 213. A proper one of these control signals is selected according to an object to be controlled. As shown, the coordination control circuit includes a switcher 214, a phase compensator 205e, a controlled variable divider 229, two differential operators 215 and two amplifiers 207h and 207i. The proper control input is selected by a switcher 214. The selected control input is sent to a phase compensator 205e in which the phase lag of the input signal is corrected. The corrected signal is sent to a controlled variable divider 229. The divider 229 operates to divide the corrected control signal into a series compensating control and a phase adjusting control. Next, the differential operator 215 synthesizes the series compensating control signal with a series compensating command 216. The synthesized signal is amplified into a certain signal magnitude by the amplifier 207h. Then, the amplifier 207h outputs a series compensating controlled variable 216c. The phase adjusting control is synthesized with a phase adjusting command 217 in the differential operator 215. The synthesized signal is amplified into a proper signal magnitude required for the control by an amplifier 207i. Then, the amplifier 207i outputs a phase adjusting controlled variable 217c. FIG. 42 is a graph showing a characteristic of a control range covered by the series compensator, which is provided in the electric power flow controller according to the present invention. This graph depicts a reactance change of a series compensator if the compensator shown in FIGS. 3, 5, 6, 7, 8, 9, 10 to 18 controls an ignition phase of the semiconductor switch. In this graph, it is assumed that the ignition phase is 0° when the semiconductor switch is constantly off and 180° when it is constantly on. The reactance of the series compensator is capacitive when the switch is off, while with increase of the firing angle, the capacitive reactance is increased. From a point of resonance 241 located at the phase β0, the reactance is changed to an inductive reactance. However, the reactance is not changed in the range indicated by 240 if an ignition phase control is executed in the series reactance compensator. In the series compensator by itself, the reactance is not discontinuously controlled. Hence, the electric power flow control is made discontinuous. To overcome this unfavourable matter, the series compensator and the phase adjustor may be controlled in concert through the effect of the coordination control circuit shown in FIG. 41.

FIGS. 43 to 50 are characteristic graphs indicating each of reactances shared by the series compensator and the phase adjustor of the electric power flow controller. In these graphs, an axis of abscissa denotes reactance controlled by the electric power flow controller, while an axis of ordinance denotes reactances controlled by the series compensator and the phase adjustor respectively. As shown, the electric power flow controller is controlled by combining a control characteristic line 243 for the series compensator indicated by a thick real line with a control characteristic line 244 of the phase adjustor indicated by an alternate long and short broken line against a characteristic line 242 to be controlled.

Figure 43:
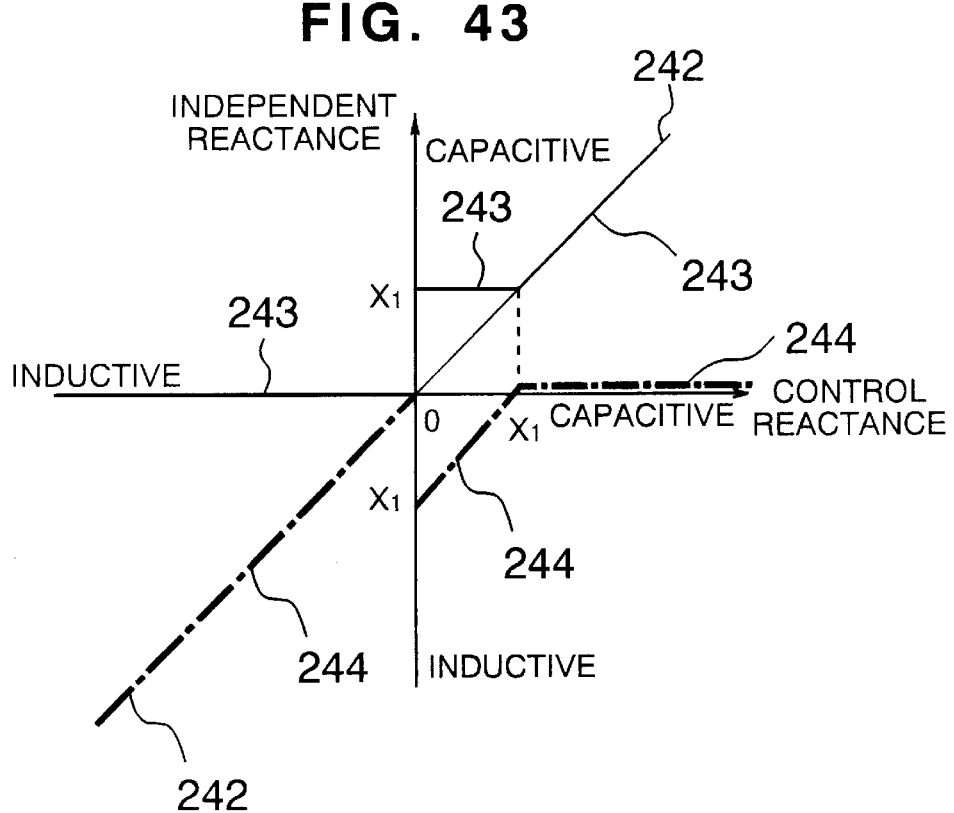
FIG. 43 is a graph showing a control characteristic of the coordination control circuit shown in FIG. 41.
Figure 51:
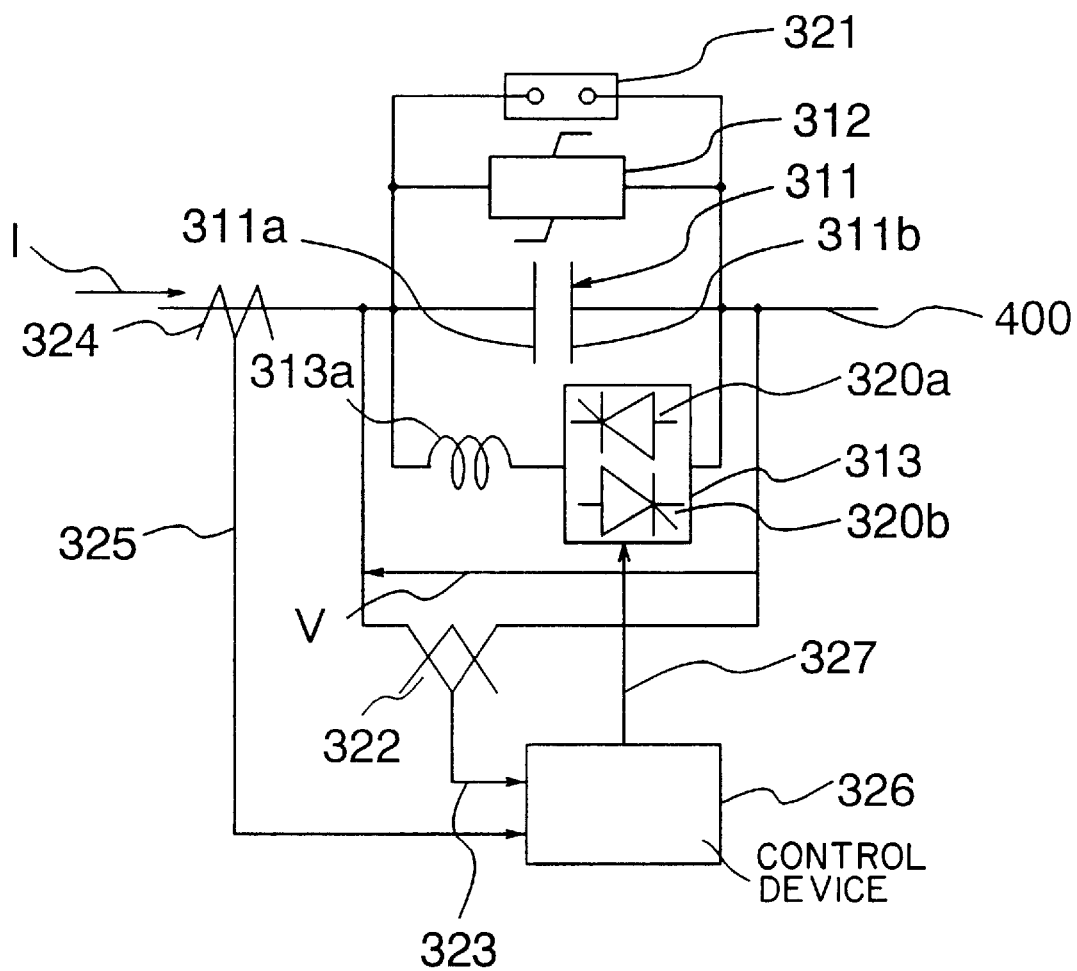
FIG. 51 is a circuit diagram showing the overall arrangement of the series compensator used in the electric power flow controller of the present invention.

FIG. 43 shows an example of control in which a bypass switch 321 for bypassing the capacitor shown in FIG. 51 is turned on so that the phase adjustor as shown in FIG. 8 feeds an inductive output if the control reactance value of the series compensator is inductive. Since the minimum value of capacitive reactance of the series compensator is X1, to keep the capacitive reactance X1 or lower, the phase adjustor may be controlled by the inductive reactance if each device provides such a characteristic.

Figure 44:
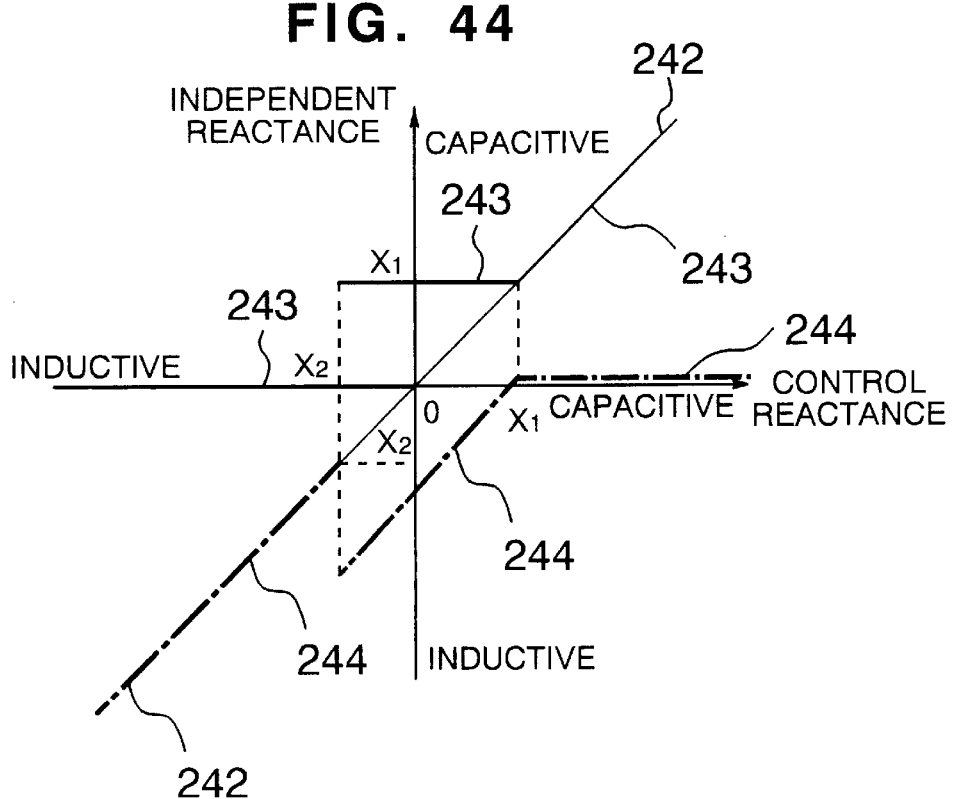
FIG. 44 is a graph showing another control characteristic of the coordination control circuit shown in FIG. 41.

FIG. 44 shows an example of control in which the series compensator is bypassed by a bypass switch 321 when the inductive reactance reaches X2 so that the phase adjustor operates to feed an inductive output, in the control shared by the series compensator and the phase adjustor of the electric power flow controller of the present invention. In this control example, the series compensator keeps a minimum of the capacitive reactance as X1 until the inductive reactance reaches X2. To keep the capacitive reactance X1 or lower, therefore, the phase adjustor may be controlled by the inductive reactance.

Figure 45:
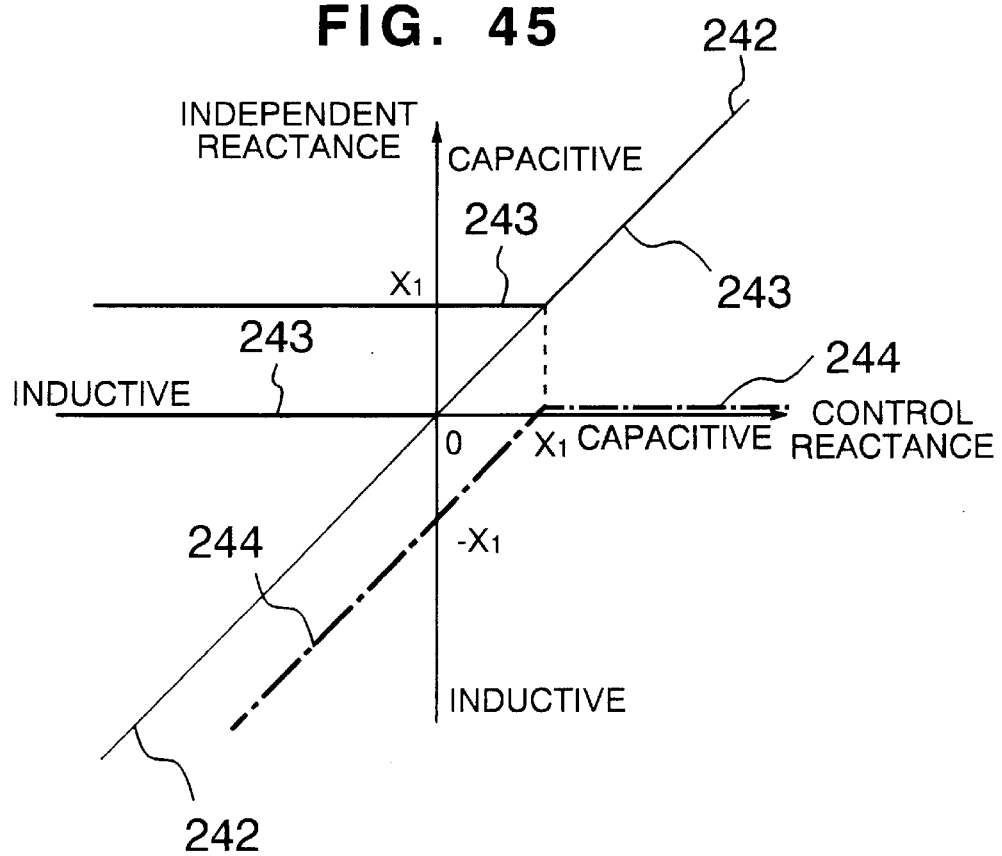
FIG. 45 is a graph showing another control characteristic of the coordination control circuit shown in FIG. 41.

FIG. 45 shows an example of control in which the series capacitor of the series compensator is kept inserted onto the system if the control reactance value reaches X1 or lower of capacitive reactance or is made inductive so that the phase adjustor operates to feed an inductive output, in the control shared by the series compensator and the phase adjustor of the electric power flow controller of the invention. In this case, since when the control reactance reaches X1 of capacitive reactance, the phase adjustor may be controlled by inductive reactance.

Figure 46:
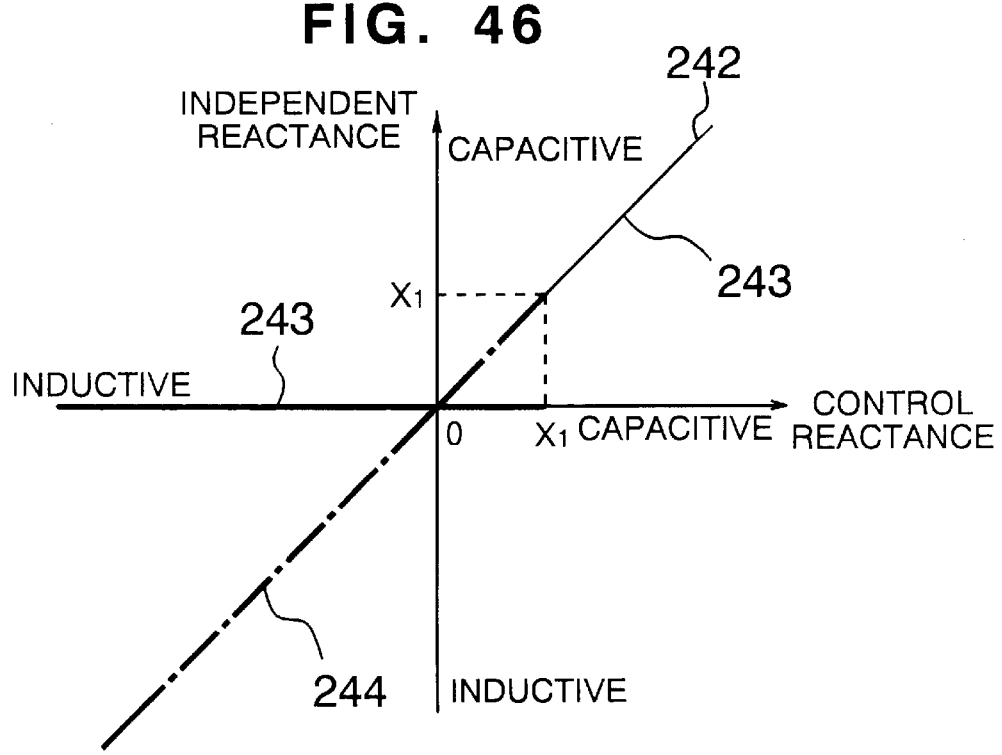
FIG. 46 is a graph showing another control characteristic of the coordination control circuit shown in FIG. 41.

FIG. 46 shows an example of control in which the series compensator is bypassed by the bypass switch 321 just when the control reactance value reaches X1 of capacitive reactance and the phase adjustor provides the capacitive and inductive reactances, in the control shared by the series compensator and the phase adjustor of the electric power flow controller of the invention. In this case, the phase adjustor may be controlled by the inductive reactance after the control reactance reaches the capacitive reactance X1.

Figure 47:
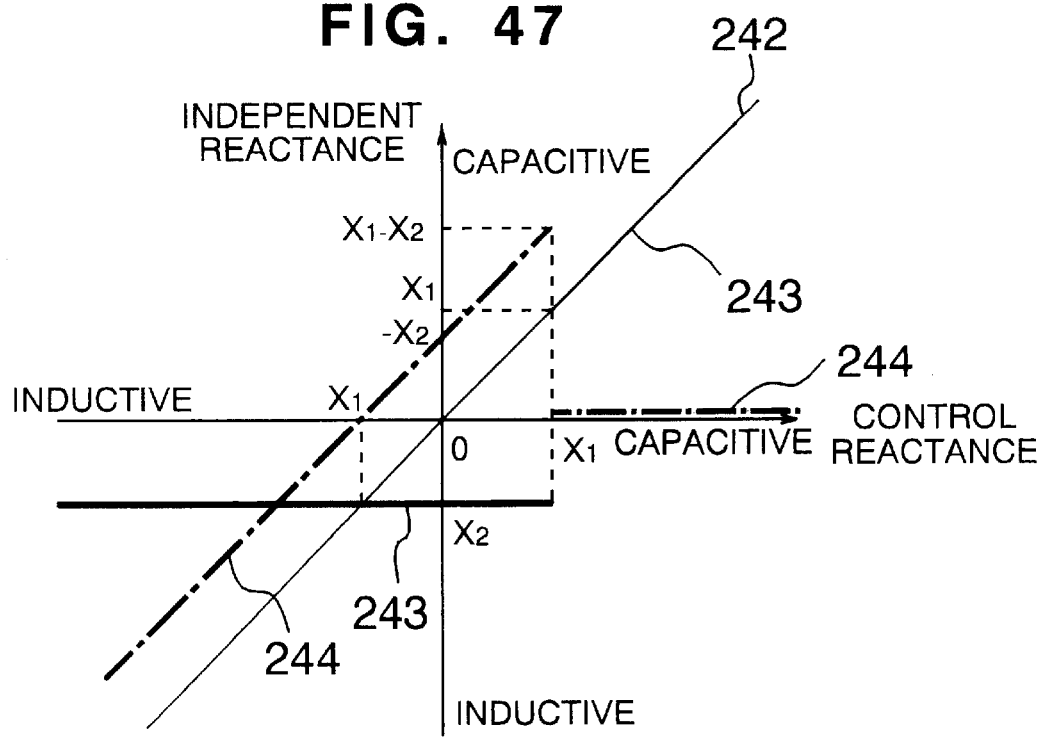
FIG. 47 is a graph showing another control characteristic of the coordination control circuit shown in FIG. 41.

FIG. 47 shows an example of control shared by the series compensator and the phase adjustor of the electric power flow controller of the invention. In this control, when the control reactance values reaches X1 of capacitive, the series compensator bypasses a semiconductor switch 313 connected in parallel to the capacitor as shown in FIG. 51 so that the control reactance of the series compensator reaches X2 of inductive reactance provided in a reactor 313a and the phase adjustor provides both of the capacitive and inductive reactances. In this case, the phase adjustor may be controlled by the inductive reactance since when the control reactance reaches X1–X2 of capacitive reactance.

Figure 48:
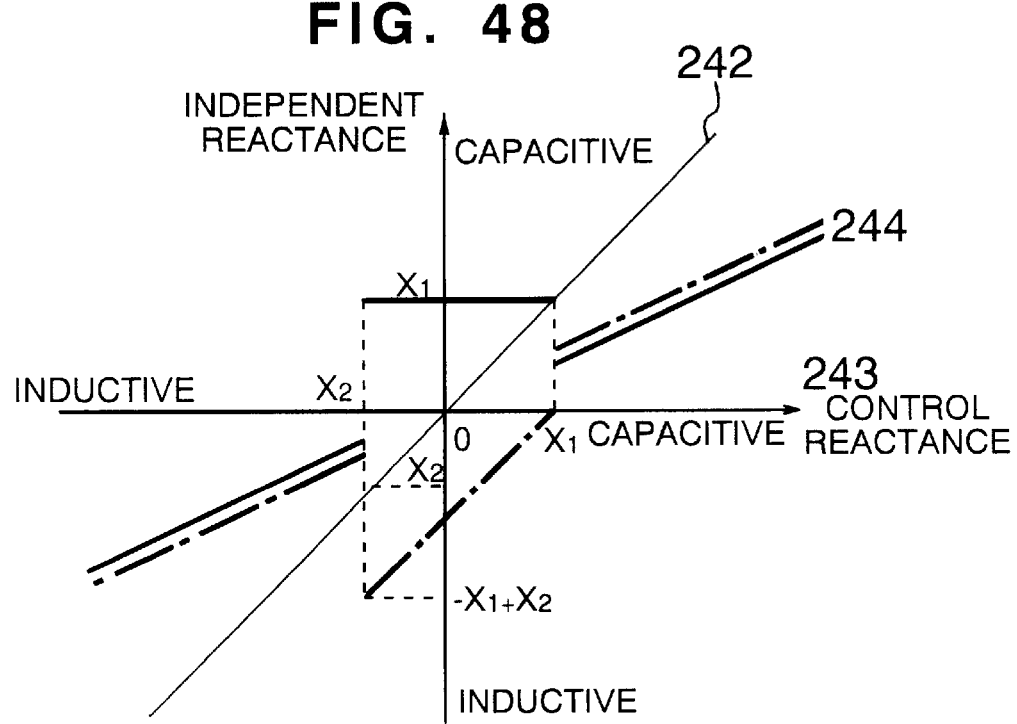
FIG. 48 is a graph showing another control characteristic of the coordination control circuit shown in FIG. 41.

FIG. 48 shows an example of control shared by the series compensator and the phase adjustor of the electric power flow controller of the invention. In this control, the semiconductor switch is turned off when the control reactance value is located between X1 of capacitive reactance and X2 of inductive reactance, so that the control reactance of the series compensator is made to be X1 of capacitive reactance. After the inductive reactance, the series compensator may be controlled by the inductive reactance. The phase adjustor shares the control between the capacitive reactance and the inductive reactance. The phase adjustor is controlled to correct a reactance value of the series compensator between the capacitive reactance X1 and the inductive reactance X2. The other reactance control is shared by the series compensator and the phase adjustor. The controlled reactances are synthesized with each other.

Figure 49:
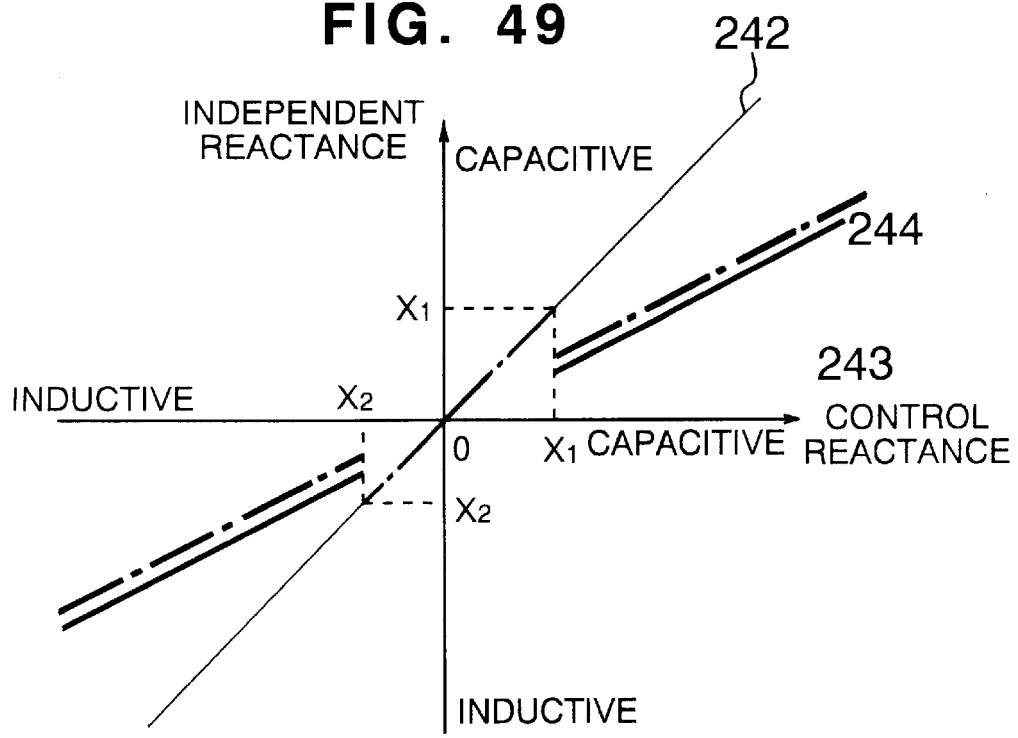
FIG. 49 is a graph showing another control characteristic of the coordination control circuit shown in FIG. 41.

FIG. 49 shows an example of control shared by the series compensator and the phase adjustor of the electric power flow controller of the invention. In this control, when the control reactance value is located between the capacitive reactance X1 and the inductive reactance X2, the series compensator is bypassed by a bypass switch 321 and shares the control between the inductive reactance and the inductive reactance X2, when the phase adjustor shares the control between the capacitive reactance and the inductive reactance. The phase adjustor is controlled to correct the reactance of the series compensator between the capacitive reactance X1 and the inductive reactance X2. The other reactance control is shared by the series compensator and the phase adjustor.

Figure 50:
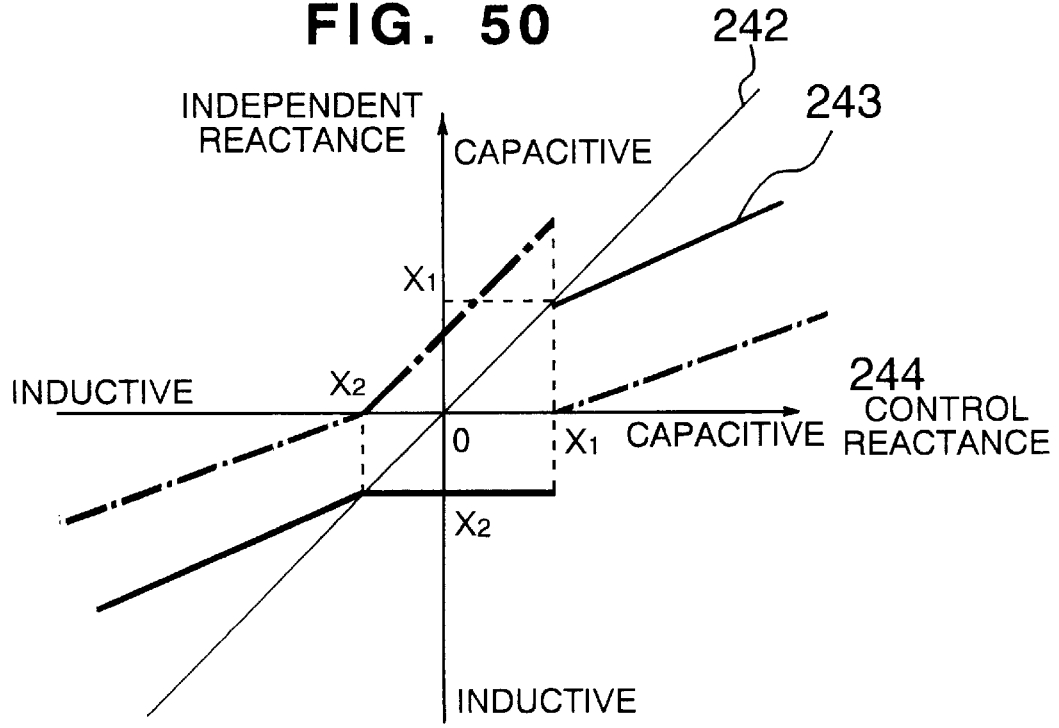
FIG. 50 is a graph showing another control characteristic of the coordination control circuit shown in FIG. 41.

FIG. 50 shows an example of control shared by the series compensator and the phase adjustor of the electric power flow controller of the present invention. In this control, the series compensator is bypassed between the capacitive reactance X1 and the inductive reactance X2 by turning on a semiconductor switch 313 and shares the control between the inductive reactance and the inductive reactance X2, when the phase adjustor shares the control between the capacitive reactance and the inductive reactance. The phase adjustor is controlled to correct a reactance value of the series compensator between the capacitive reactance X1 and the inductive reactance X2. The other reactance control is shared by the series compensator and the phase adjustor, respectively.

FIG. 51 is a control block diagram showing the overall arrangement of the series compensator used in the electric power flow controller of the present invention.

In FIG. 51, the series capacitor 311 is connected in series to the transmission line 400. The bypass switch 321 and the excessive voltage protector 312 are connected between both ends of the series capacitor 311. Likewise, the semiconductor switch 313 is connected through the reactor 313a therethrough. The semiconductor switch 313 is arranged to have one or more semiconductor elements connected in series to each other, for example, thyristors 320a and 320b. The thyristors 320a and 320b are back-to-back connected to each other. These thyristors 320a and 320b compose a charging and discharging circuit for the series capacitor 311 so that those thyristors are made conductive or non-conductive in response to a switching signal from a control device 326. It means that the charging and discharging circuit is controlled on and off in response to the switching signal. The control device 326 receives a current passing through an electric power system 400, that is, a current signal 325 sensed by a current sensor 324 for sensing a current passing through the series capacitor 311 and a voltage signal 323 sensed by a voltage sensor 322 for sensing a voltage applied between both ends of the series capacitor 311. Based on the current signal 325 and the voltage signal 323, the control device 326 operates to generate the switching signal 327.

Figure 52:
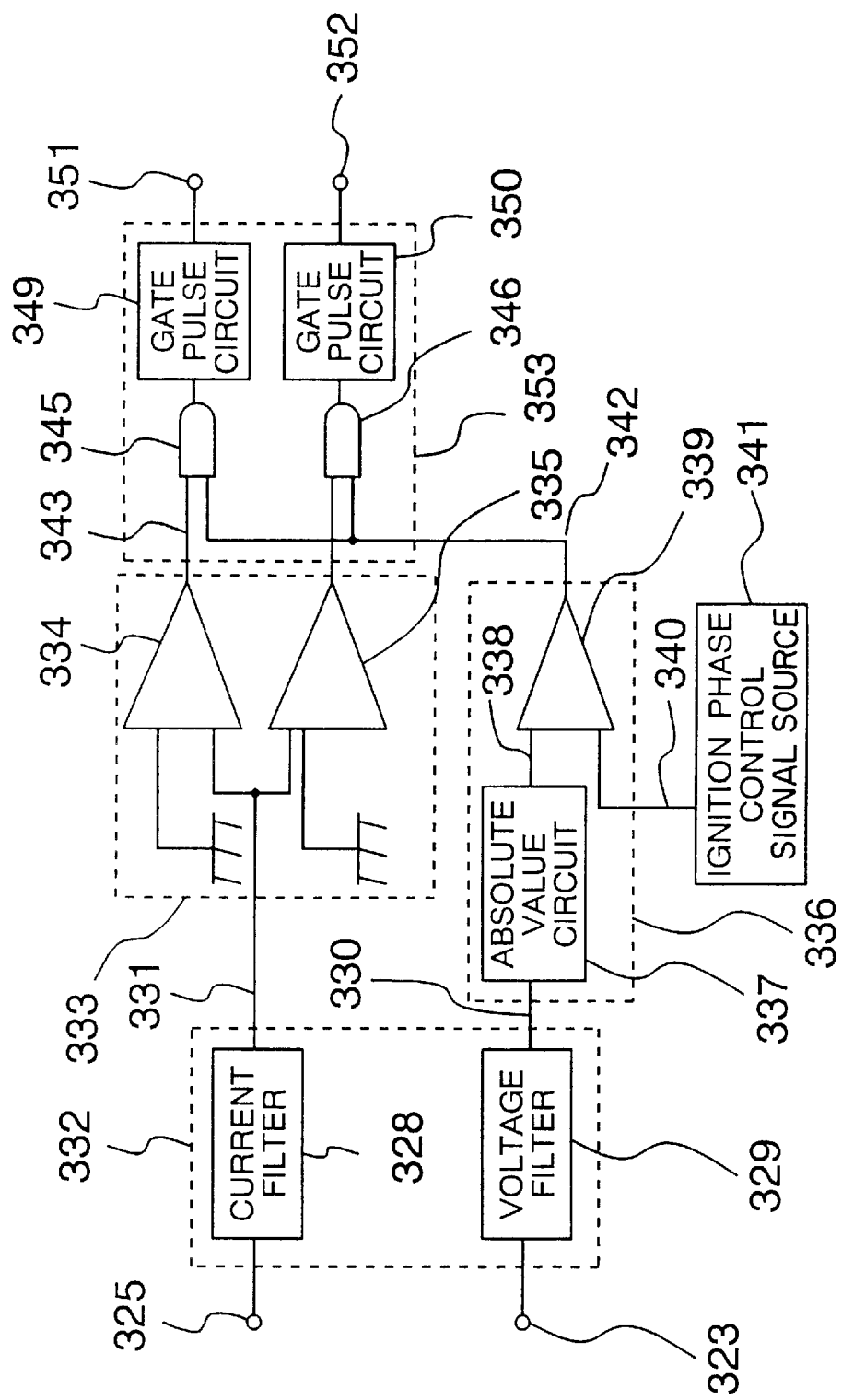
FIG. 52 is a circuit diagram showing an arrangement of the control circuit shown in FIG. 51.
Figure 53:
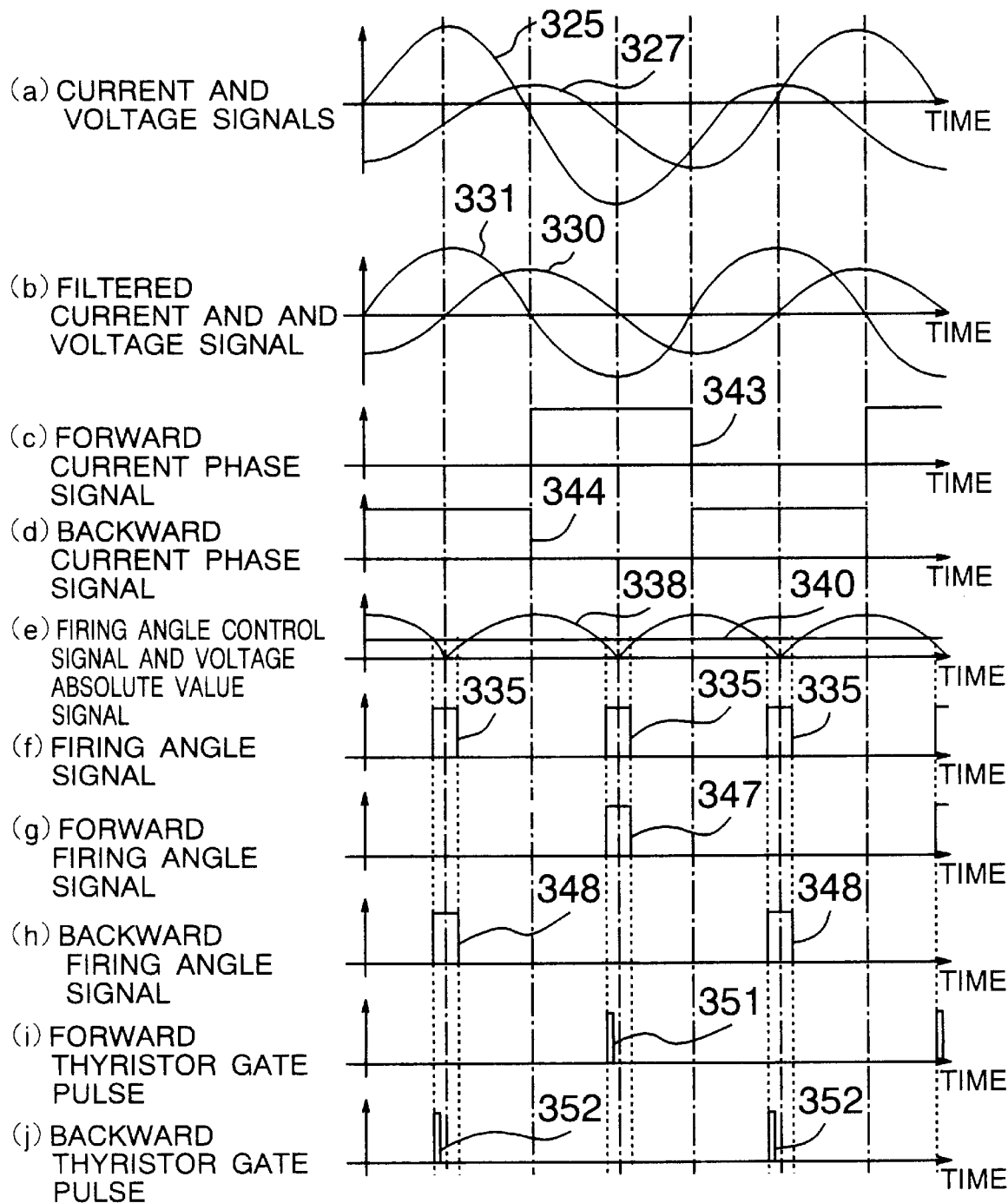
FIG. 53 is a chart showing some signal waveforms for indicating the operations of the circuits shown in FIGS. 51 and 52.

Concretely, the control device 326, as shown in FIG. 52, is arranged to have a filter unit 332, a current direction determining unit 333, a voltage phase determining unit 336 and a pulse generator 353. The filter unit 332 is made up of a current filter 328 and a voltage filter 329. As shown in FIGS. 53(a) and (b), the current filter 328 is served as current filtering means for extracting only a specific frequency component, for example, a commercial frequency component from the current signal 325 and outputting a current signal 331. The voltage filter 329 is serves as voltage filtering means for extracting only a specific frequency component, for example, a commercial frequency component from the voltage signal and outputting the voltage signal 330. That is, the current filter 328 or the voltage filter 329 is a filter indicating a characteristic represented by the following expression, for example a quadratic band-pass filter having a commercial frequency f as a central frequency.

$$G(s) = \frac{\frac{\omega_O}{Q} s}{s^2 + \frac{\omega_O}{Q} s + \omega_O^2} \text{ where, } \omega_O = 2\pi f \quad (11)$$

The current direction determining unit 333 is served as current direction determining means and provides a forward comparator 334 and a backward comparator 335. Each of the comparators 334 and 335, as shown in FIGS. 53(c) and (d), operates to compare the set value (ground potential) with the current signal 331 and output a signal corresponding to this compared result. The comparator 334 outputs a forward current phase signal 343. The comparator 335 outputs a backward current phase signal 344.

Herein, the current flowing from the generator side of the electric power system 400 to the load side through the series capacitor 311 is a forward current I. The current flowing in reverse to the forward current I through the series capacitor 311 is a backward current. If the generator side of the power system 400 keeps a higher voltage based on the load side of the series capacitor 311, the higher voltage is a forward voltage V. The backward voltage to the forward voltage V is a backward voltage. The thyristor 320a is one of the semiconductor elements. The thyristor 320b is the other one of the semiconductor elements. In these definitions, the comparator 334 corresponds to a forward comparing means, and the comparator 335 corresponds to a backward comparing means.

In a case that the directions of the voltage and the current are defined as described above, the forward current phase signal 343 indicates a period when the backward current is to be flown through the thyristor 320b (the other semiconductor element). The backward current phase signal 344 indicates a period when the forward current I is to be flown through the thyristor 320a (one semiconductor element). For example, when the thyristor 320b is made conductive during the period indicated by the forward phase signal 343, the current flows from an electrode 311a of the series capacitor 311 to the side of an electrode 311b through the reactor 313a and the thyristor 320b. At this time, the forward current flows through the thyristor 320b. However, this forward current flows in the reverse direction to the forward current I of the power system. On the other hand, during the period indicated by the backward phase signal 344, the thyristor 320a is made conductive, when the current flows from an electrode 311b of the series capacitor 311 to the side of the electrode 311a through the thyristor 320a and the reactor 313a . The current flows in the forward direction to the thyristor 320a and serves as the forward current I of the power system 10.

The voltage phase determining unit 336 is served as voltage phase determining means and provides an absolute value circuit 337 and a comparator 339. The voltage signal 330 is applied to the absolute value circuit 337. The comparator 39 receives a firing angle control signal composed of a dc voltage whose voltage level is fixed, which signal is sent from an ignition phase control signal source 341. The absolute value circuit 337, as shown in FIG. 53(e), is means for voltage absolute value signal generating means for generating a voltage absolute value signal 338 indicating an absolute value of the voltage signal 330. The comparator 339 is served as ignition phase signal generating means for comparing the voltage absolute value signal 338 with the ignition phase control signal 340 and generating the ignition phase signal 342 as a pulse signal on the timing when both of the signal phases are matched. This ignition phase signal 342 is a signal indicating that the voltage signal 330 is close to zero and is applied to a pulse generator 353.

The pulse generator 353 is served as switching signal generating means and provides AND operators 345 and 346 and gate pulse circuits 349 and 350. As shown in FIGS. 53(c), (f) and (g), the AND operator 345 is served as forward ignition phase signal generating means for generating a forward ignition phase signal 347 according to a logic AND of the forward current phase signal 343 and the ignition phase signal 342. On the other hand, as shown in FIGS. 53(d), (f) and (h), the AND operator 346 is served as backward phase signal generating means for generating a backward ignition phase signal 348 according to a logic AND of the backward current phase signal 344 and the ignition phase signal 342. As shown in FIG. 53(g) and (i), the gate pulse circuit 349 is served as forward gate pulse generating means for generating a forward gate pulse 351 in response to the rise of the forward ignition phase signal 347 and outputting the forward gate pulse 351 as a switching signal to the thyristor 320b. As shown in FIGS. 53(h) and (j), the gate pulse circuit 350 is served as backward gate pulse generating means for generating a backward gate pulse 352 in response to the rise of the backward ignition phase signal 348 and outputting this backward gate pulse 352 as a switching signal to the thyristor 320a.

Figure 54:
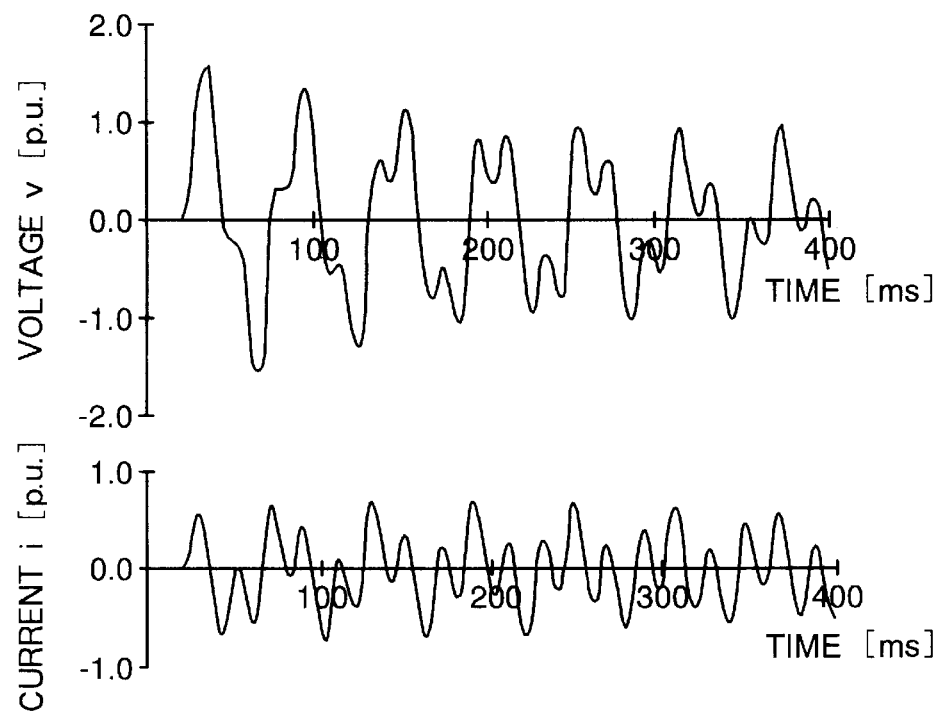
FIG. 54 is a chart showing some waveforms for indicating the state of the electric power system appearing when the firing angle control is not executed for the semiconductor switch of the series compensator used for the electric power flow controller of the present invention.

In the foregoing arrangements, when the power system is driven in the state that the series capacitor 311 is inserted to the power system 400, the resonance current is caused to flow through the power system 400 if the firing angle control is executed for the thyristors 320a and 320b when the fluctuation such as a system failure takes place in the power system. Hence, the flow of the resonance current makes the waveforms of the voltage and the current of the power system 400 those as shown in FIG. 54(a) and (b). The resonance current is brought about by the series reactance between the series capacitor 311 and the power system 400. That is, when the resonance current flows through the power system 400, unless the firing angle control is performed for the thyristors 320a and 320b, the voltage and the current of the power system are so distorted that an overvoltage appears between both ends of the series capacitor 311. The continuation of such a state causes an overvoltage to be generated in the series capacitor 311 and the power system 400 or a transformer core of the power system 400 to be saturated, thereby making the power system 400 unstable. The voltage rise of the series capacitor 311 is caused to operate the overvoltage protecting device 312 for protecting the power system from the overvoltage appearing therein. This puts a heavy load on the overvoltage protecting device 312.

On the other hand, as described above, the reactance compensator according to this embodiment is arranged to sense a current of the series capacitor 311 and a voltage applied between both ends of the capacitor 311, extract only commercial frequency components of the sensed current and voltage, and generate the forward gate pulse 351 and the forward gate pulse based on the extracted current and voltage. In response to the gate pulses 351 and 352, the thyristors 320a and 320b are allowed to be respectively fired on a precise timing. That is, in a case that the failure of the power system 400, for example, causes the waveforms of the current signal 325 and the voltage signal 323 of the power system 400 to be disturbed, the phase of the fundamental frequency component of the power system 400 may be precisely grasped because the current signal 331 and the voltage signal 330 are extracted through the filters 320 and 328. Based on the current signal 331 and the voltage signal 330, the backward voltage (that is directed forward with respect to the thyristor 320b) is applied to the thyristor 320.

Then, when the voltage reaches a point close to zero, the thyristor 320a is made conductive. On the other hand, when the forward voltage V is applied to the thyristor 320b, the thyristor 320b is made conductive when the forward voltage reaches a point close to zero. Hence, the thyristors 320a and 320b are allowed to be fired on a precise timing.

Figure 55:
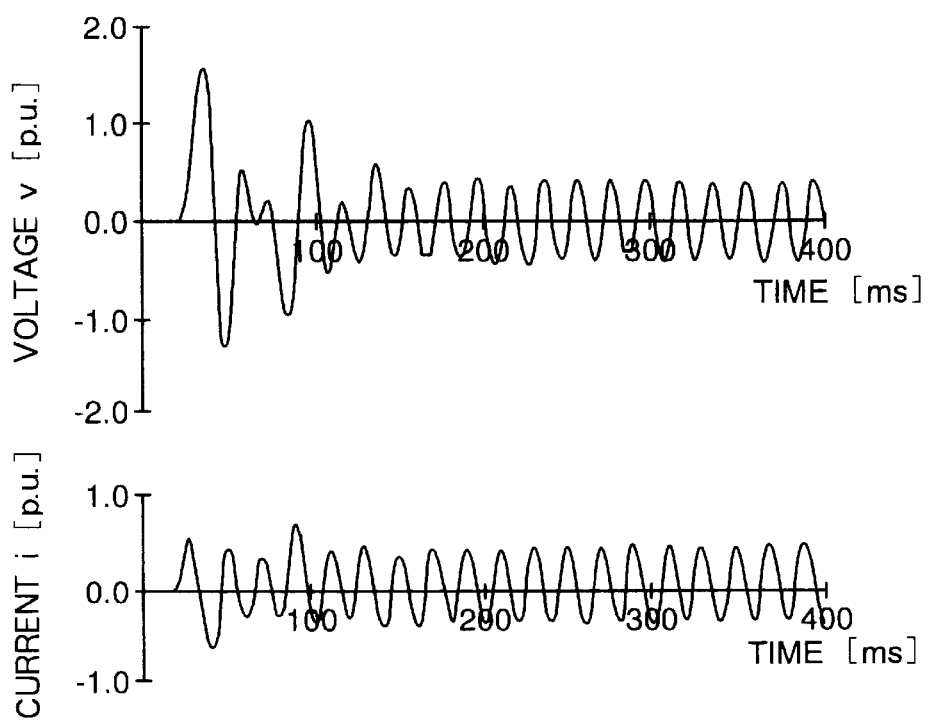
FIG. 55 is a chart showing some waveforms for indicating the state of the electric power system appearing when the firing angle control is executed for the semiconductor switch of the series compensator used for the electric power flow controller of the present invention.

In these control operations, as shown in FIGS. 55(a) and (b), when the current and voltage waveforms are disturbed with the fluctuation of the power system 400, the current waveform is slightly disturbed or the voltage applied between both ends of the series capacitor 311 is jumped at the initial period when current flows through the thyristor 320a or 320b. However, 150 ms later, the current distortion disappears and the excessive voltage also disappears in the series capacitor 311.

As set forth above, the series compensator according to this embodiment is arranged to extract only a reference frequency component of the electric signals (current signal and voltage signal) of the power system and switchably makes the semiconductor switch 313 conductive or non-conductive based on the extracted frequency component. Hence, if the addition of the series capacitor 311 to the power system 400 causes the power system 400 to be fluctuated, this series compensator operates to suppress a series resonance phenomenon generated in the power system 400, thereby making the power system stable. Further, the series compensator of this embodiment provides no integral element in the control system. Hence, the series reactance phenomenon is allowed to be quickly suppressed.

In this embodiment, the thyristors are used for the semiconductor elements. In place, the other elements such as gate-turn off thyristors may be used.

Figure 56:
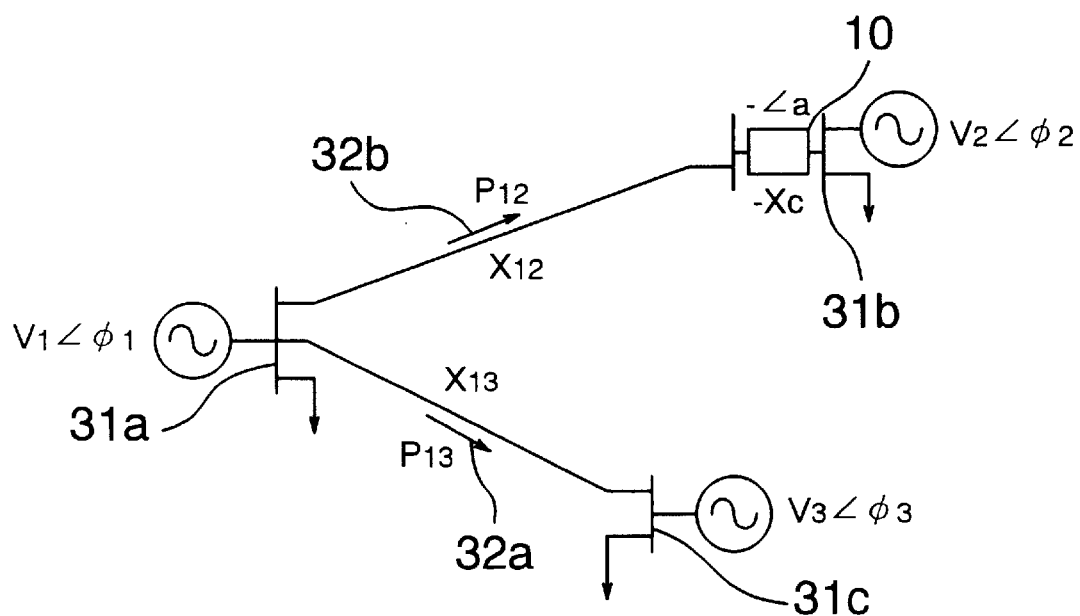
FIG. 56 is a view showing an application of the electric power flow controller of the present invention into the electric power system.
Figure 57:
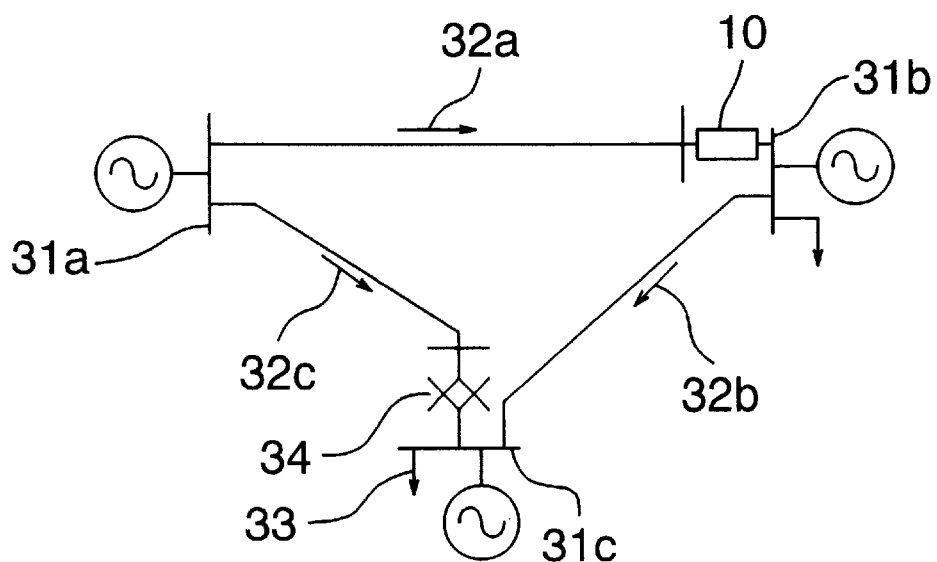
FIG. 57 is a view showing another application of the electric power flow controller of the present invention into the electric power system.

FIGS. 56 and 57 show the electric power flow controller of the present invention applied onto the power system. When an electric power is fed from a bus line 31a to another bus line 31c shown in FIG. 56, the power P13 to be transmitted is represented by:

$$P_{13} = \frac{V_1 V_3}{X_{13}} \sin(\phi_1 - \phi_3) \qquad (12)$$

wherein V1 denotes a magnitude of the electric power of the bus line 31a, $\phi_1$ denotes a phase of the electric power, $V_3$ denotes a magnitude of a voltage applied onto the bus line 31c, $\phi_3$ denotes a phase of the electric power, and $X_{13}$ denotes a series reactance of the transmission line.

Herein, the phase difference angle is $\phi_1 - \phi_3$. The expression (12) indicates that the power P13 to be transmitted is defined by the voltage of the bus line, the phase difference angle and the series reactance between the bus lines.

On the other hand, if the power flow 20 controller 10 of the invention is applied onto the system, an electric power P12 to be transmitted from the bus line 31a to the other bus line 31b is represented by the expression (13)

$$P_{12} = \frac{V_1 V_2}{X_{12} - Xc} \sin(\phi_1 - \phi_2 - \alpha) \qquad (13)$$

wherein $V_2$ denotes a magnitude of a voltage applied onto the bus line 31b, $\phi_2$ denotes a phase of the voltage, and $X_{12}$ denotes a series reactance of the transmission line and the like. Further, XC denotes a capacitive reactance given by the series compensation. α denotes a phase angle given by the phase adjustment. The control of the reactance XC and the phase angle α of the electric power flow controller makes it possible to control the transmission power $P_{12}$. Concretely, the increase of the capacitive reactance XC leads to increasing the transmission power $P_{12}$, while the increase of the phase angle α leads to reducing a phase difference angle of the power system, thereby making the power system more stable. Moreover, the control of the magnitude of the electric power flow $P_{12}$ is achieved by controlling the capacitive reactance XC and the phase angle α of the electric power flow controller without having to change the magnitude and the phase of the voltage on the bus line. That is, the control provides a capability of transmitting an electric power as required.

FIG. 57 shows the interconnected power systems having respective rated voltages to each other to which the electric power flow controller of the present invention is applied. 31b and 31c denote bus lines having the same rated voltage, while 31a denotes a bus line having a different rated voltage. The bus lines 31a and 31c are connected through a transformer 34. The bus lines 31a and 31c are connected through an electric power flow controller 10. The electric power flow controller 10 provides a main transformer, the voltage transformation of which makes it possible to connect the power systems having different rated voltages with each other. The electric power flow control hold true to the control shown in FIG. 56. Concretely, consider the control of the electric power flow 32a from the bus line 31a. To increase the electric power flow 32a, the phase difference angle of the power system may be reduced by controlling the phase angle α of the electric power flow controller or enhancing a series compensation level. Conversely, to increase the electric power flow 32c, the phase difference angle of the power system may be increased by controlling the phase angle α or lowering a series compensation level. This kind of control enables to achieve such an electric power flow distribution as minimizing a transmission loss or feeding an electric power required by the loads dotted in several parts with no adverse effect given by the impedance of the transmission line.

Figure 58:
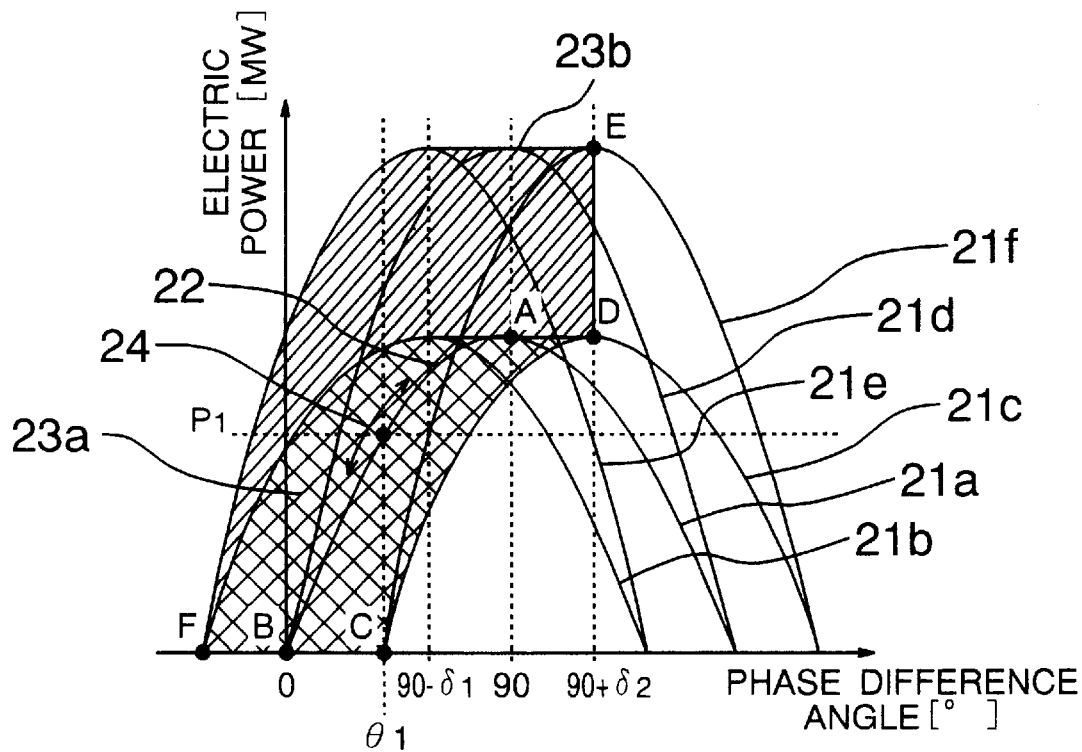
FIG. 58 is a graph showing a controllable range of the electric power flow controller of the present invention.

FIG. 58 shows the control range of an electric power flow in the electric power flow controller of the invention. If the phase adjustor is not provided in the controller, when feeding an electric power P1, an operating point 24 on the power system is equal to a point of a power phase difference angle curve of the power system, that is, a point θ1 on the power phase difference angle curve. The operating point 24 moves on the power phase difference angle curve 21a with the increase or decrease of the power flow. The operating point 24 is stable in an operating range 22 between a point A and a point B, the range of which has a phase difference angle of 90° or lower. In the case of using the phase adjustor having an adjusting range of a phase angle between −δ1 (power phase difference angle curve 21b) and +δ2 (power phase difference angle curve 21c), the control range corresponds to a range 23a enclosed by points A, F, B, C and D, that is, the stable operating area on the power phase difference angle curves 21b and 21c. On the other hand, the use of the power electric flow controller of the invention makes it possible to expand the control area into the area containing a stable operating area 23a and an area enclosed by points E, F, A and D in addition to the phase adjusting area of −δ1 and +δ2, because the increase of the transmission capacitance executed by the series compensating function changes the power phase difference angle curves 21a, 21b and 21c into the curves 21d, 21e and 21f. In particular, if the series compensator 11 provides a variable compensation of the system reactance, the electric power flow is allowed to be controlled at any point inside of the control ranges 23a and 23b. The electric power flow controller of the invention provides a wider control range of the electric power flow.

Figure 59:
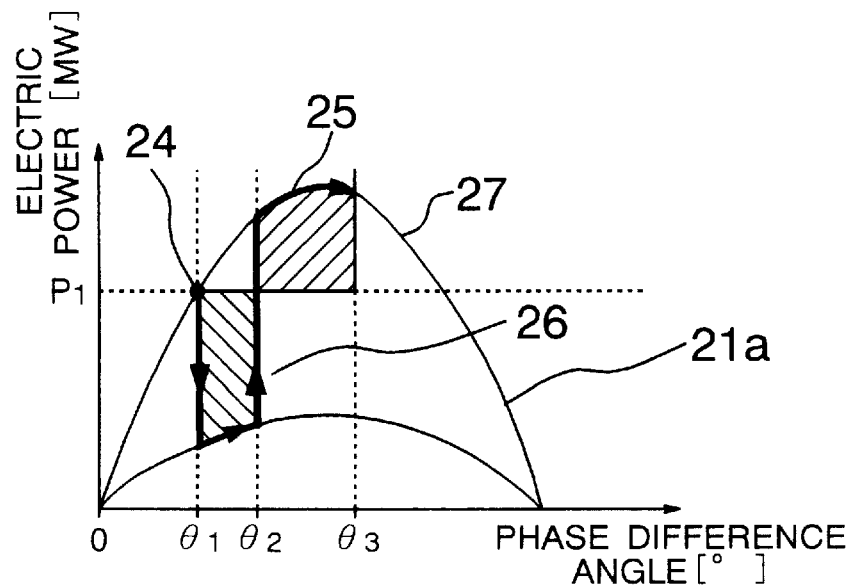
FIG. 59 is a graph showing change of a transient driving point of the electric power system appearing when failure takes place in the power system if no electric power flow controller of the present invention is provided.
Figure 60:
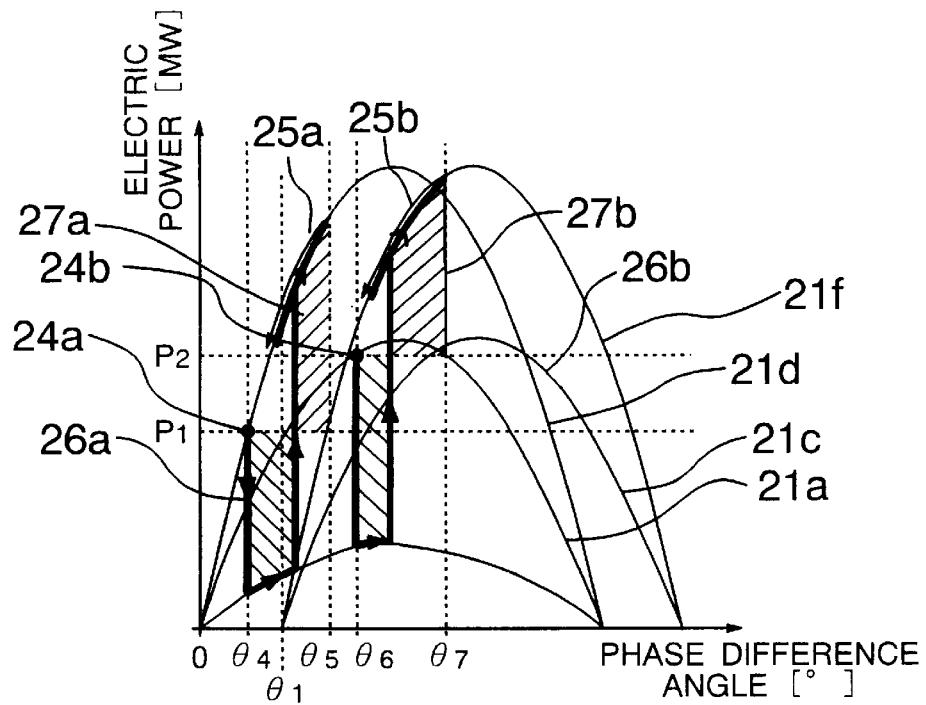
FIG. 60 is a graph showing change of a transient driving point of the electric power system appearing when failure takes place in the power system if the electric power flow controller of the present invention is provided.
Figure 61:
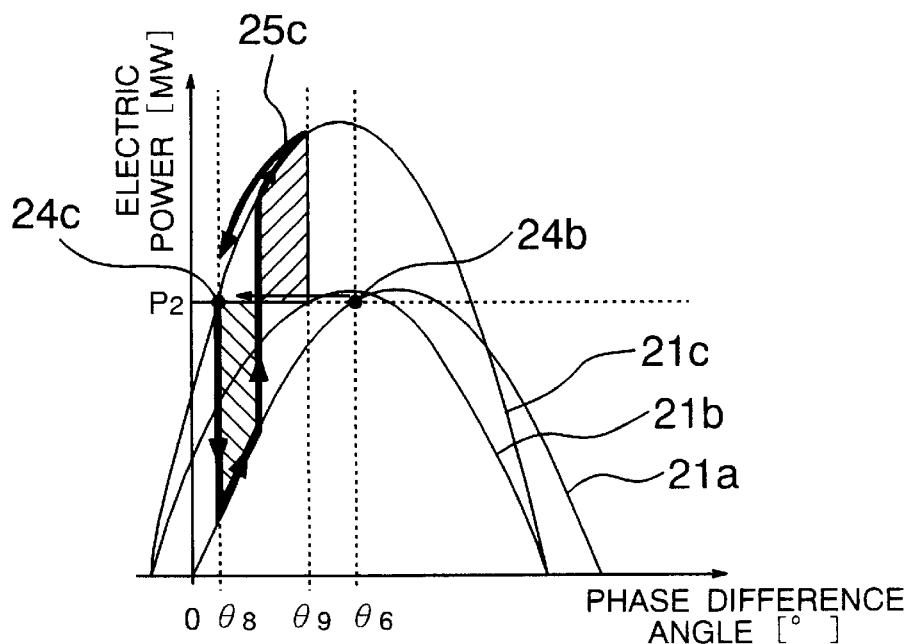
FIG. 61 is a graph showing change of a transient driving point of the electric power system appearing when failure takes place in the power system if the electric power flow controller of the present invention is provided.

FIGS. 59 to 61 shows a transient change of a driving point when any failure takes place in the power system. FIG. 59 shows the conventional power system that provides no electric power flow compensator included in the present invention. The operating point 24 of the power system having an electric power P1 (=generator output) and a phase difference angle θ1 changes along an operating trance 25 when failure takes place. At first, the system failure reduces the output of the generator, thereby starting to accelerate the generator and opening the phase difference angle. If the system failure is recovered at a phase difference angle θ2, the generator output is returned to a normal state. In actual, the generator is still inertially accelerating, so that the phase difference angle is opened to θ3. Herein, the area 26 corresponds to accelerating energy of the generator. The area 27 corresponds to decelerating energy of the generator. When the accelerating energy 26 exceeds the decelerating energy 27, the phase difference angle surpasses an angle of 90°. It means that the generator is out of step.

On the other hand, the use of the electric power flow controller of the invention is operated as indicated in FIG. 60. When the power system is driven at the electric power P1 like the case of FIG. 59, the power system is driven at an operating point 24a of the power system that keeps a phase difference angle θ4 (<θ1) through the effect of the series compensation of the electric power flow controller. When the failure is recovered, the power phase difference angle curve 21d is made larger than the power phase difference angle curve 21a. Hence, the decelerating energy 27a of the generator is far larger than the accelerating energy 26a. This makes great contribution to preventing the step-out of the generator. Further, the operating trace 25a moves so that the phase difference angle is increased to θ5 and is returned to θ4. The phase difference angle θ5 is a far smaller angle than 90°, which allows a larger margin of angle for the generator to reach an out-of-step state, thereby keeping the power system stable. Further, in a case that the power system is operated at the operating point having an electric power P2 (>P1) and a phase difference angle θ6, the operating point 24b is operated on the operating trance 25b through the effect of the series compensator and the phase control function of the electric power flow controller. Hence, the far larger decelerating energy 27a for preventing the out-of-step of the generator as compared to the accelerating energy 26b can be obtained at the phase difference angle θ7 in the phase control area. This serves to prevent the out-of-step of the generator.

In place, as shown in FIG. 61, for the transmission power P2, through the effect of the phase adjustment of the electric power flow controller according to the invention, the operating point 24b (phase difference angle θ6) on the power phase difference angle curve 21a given in the case of providing no controller is allowed to be a operating point 24c (phase difference angle θ8 <θ6) of the power system on the power phase difference angle curve 21e. This enables to reduce the phase difference angle, thereby strengthening the synchronizing power of the generator with the power system. Further, when failure takes place in the system, the operating point 24c of the power system is changed along the operating trace 25c. When the failure is recovered, however, the phase difference angle stays at an angle of θ9 (<θ6), which allows a large phase difference angle for the generator to reach the out-of-step state, thereby making the power system stable.

As set forth above, the electric power flow controller of the present invention is arranged to cope with the transient power fluctuation for stabilizing the power system. To do so, the control of the series compensation and the phase angle for the stabilization may be made faster by the semiconductor switches composed of the semiconductor device such as thyristors.

The electric power controller according to the present invention provides the electric power flow control of the power system in a wider range than the conventional phase adjustor. That is, the conventional controller is arranged so that the power flow distribution is defined by the impedance of the power system and the phase difference angle of each power supply. Hence, the controller may often disable to feed an electric power to a place where there exists such a load as needing the electric power. On the other hand, the electric power flow controller of the present invention enables to control the power flow distribution to be such a proper distribution as feeding an electric power as needed by a load. Further, the control of the phase difference angle and the compensation makes it possible to suppress the transient or long-term fluctuation of the power system, thereby stabilizing the power system.

The electric power flow controller according to the present invention allows the components of the series compensator such as the series capacitor 311 and the semiconductor switch 311 to be located in a lower place than the conventional controller. This location results in easily solving a problem about earthquake resistance especially in the area where earthquakes often take place and reducing the worker's opportunity of working in a high place for building, checking and maintaining the series compensator. Further, the semiconductor switch may be easily separated from the power system as keeping the series compensation, the series compensator may be safely checked and maintained. Moreover, a part or all of the series compensator is allowed to be held in a structure or a closed vessel. Hence, the application of the controller to a gas insulated switching device results in reducing a probability of failure occurrence caused by a igniting strike or something hit to the series compensator, thereby improving the reliability and the workability of the controller.

Moreover, according to the present invention, for controlling the series compensator, the electric power flow controller of the present invention is arranged to extract only the fundamental frequency components of the voltage and the current of the power system and make the semiconductor switch conductive or non-conductive based on the extracted voltage and current components. Hence, if the power system fluctuates, the controller enables to quickly suppress a series resonance phenomenon caused by addition of the series capacitor and thereby stabilize the electric power system.

What is claimed is:

1. An electric power flow controller for controlling a transmission of an electric power system, comprising:
    a first winding having at least one Y-connection;
    a second winding to be mated with said first winding; and
    electric power flow compensating means for compensating an electric power flow state of said electric power system, said compensating means connected in series to the Y-connection of said first winding.

2. An electric power flow controller as claimed in claim 1, wherein said electric power flow compensating means uses a capacitor and control means composed of a semiconductor element is provided in parallel to said capacitor.

3. An electric power flow controller as claimed in claim 2, wherein a voltage applied onto said capacitor is equal to or lower than a system voltage of said electric power system.

4. An electric power flow controller as claimed in claim 1 further comprising a transformer for raising or lowering a system voltage between said first winding and said second winding.

5. An electric power flow controller as claimed in claim 1, wherein said second winding has a delta-connection.

6. An electric power flow controller as claimed in claim 1 further comprising a different third winding from said first and second windings, said third winding having a delta-connection.

7. An electric power flow controller as claimed in claim 1, wherein said first winding or second winding provides winding adjusting means for changing a state of winding.

8. An electric power flow controller as claimed in claim 7, wherein said winding adjusting means serves to change the winding state of said first or second winding for changing a phase difference between a primary side voltage applied onto said first winding and a second side voltage applied onto said second winding.

9. An electric power flow controller as claimed in claim 7, wherein said winding adjusting means uses a switch having plural switchable taps pulled out of said first or second winding.

10. An electric power flow controller as claimed in claim 9, wherein said switch is composed of mechanical contacts.

11. An electric power flow controller as claimed in claim 9, wherein said switch is composed of a semiconductor switch.

12. An electric power flow controller as claimed in claim 11, wherein a voltage generated in said second winding is controlled by a converter.

13. An electric power flow controller as claimed in claim 11, wherein said electric power flow compensating means is connected to a point between a low-voltage side terminal of a Y-connection of said first transformer and a neutral point of said first transformer, said neutral point connected to a ground point or a ground impedance point.

14. An electric power flow controller as claimed in claim 1, wherein a frequency converter for generating an ac voltage is used for said electric power flow compensating means, said frequency converter connected to said first winding.

15. An electric power flow controller as claimed in claim 1, wherein said first or second winding is a winding of a transformer for adjusting a phase.

16. An electric power flow controller as claimed in claim 15, wherein a phase adjusting ac voltage generated in said transformer is used for means for controlling the phase of said phase adjusting transformer.

17. An electric power flow controller as claimed in claim 16, wherein said converter is composed of a transformer connected to said phase adjusting transformer and a switching device for doing connection or disconnection between said phase adjusting transformer and said power system.

18. An electric power flow controller having a compensating capacitor inserted onto an electric line, comprising:
    a semiconductor switch for controlling a compensation of said compensating capacitor so that a voltage applied to said semiconductor switch is made equal to or lower than a voltage to ground of said electric power line.

19. An electric power flow controller as claimed in claim 18 further comprising:
    a transformer located between said electric power line and the ground,
    wherein said semiconductor switch is connected to a winding of said transformer so that a voltage applied onto said semiconductor switch is made equal to or lower than a voltage to ground of said electric power line.

20. An electric power flow controller as claimed in claim 18, wherein a value of current flowing through said semiconductor switch is equal to or larger than a value of current flowing through said electric power line.

21. An electric power flow controller as claimed in claim 19, wherein one end of a first winding of said transformer is connected to said electric power line, the other end of said first winding is grounded, and one end of a second winding of said transformer is connected to said semiconductor switch.

22. An electric power flow controller as claimed in claim 19, wherein said transformer is an autotransformer, one end of said transformer winding being connected to said electric power line, the other end of said winding is connected to the ground, and said semiconductor switch is connected to a voltage-divided terminal of said autotransformer.

23. An electric power controller as claimed in claim 18, wherein said compensating capacitor is inserted in series to said electric power line.

24. An electric power flow controller as claimed in claim 18, wherein said semiconductor switch is connected in parallel to said compensating capacitor.

25. An electric power flow controller for an electric power system, said controller having a series capacitor inserted onto a power transmission line and a protector for bypassing both ends of said capacitor, comprising: a semiconductor switch; and two transformers, the first windings of which are grounded at one end and respectively connected to both ends of said series capacitor at the other end and the second windings of which are connected in parallel through said semiconductor switch which is positioned under the potential of said power transmission line against the ground.

26. An electric power flow controller as claimed in claim 25, wherein the other ends of said two transformers are connected to both ends of said series capacitor through a switching device.

27. An electric power flow controller as claimed in claim 25, wherein at least one end of each of the second winding of said two transformers is grounded.

28. An electric power flow controller for an electric power system, said controller having a series capacitor inserted onto a transmission line and a protector for bypassing both ends of said capacitor, comprising:
a semiconductor switch; and two autotransformers, each winding of which are grounded at one end and respectively connected to both ends of said series capacitor at the other end, the windings of which are connected with each other at their middle points through said semiconductor switch.

29. An electric power flow controller as claimed in claim 28, wherein the other end of each of said two transformers is connected to the corresponding end of said series capacitor through a switching device.

30. An electric power flow controller as claimed in claim 25, wherein a winding ratio and a polarity of said two transformers or said autotransformer are adjusted so that the voltage to ground of said semiconductor switch is equal to or lower than the voltage to ground of said transmission line.

31. An electric power flow controller for an electric power flow, said controller having a series capacitor inserted onto a power transmission line and a protector for bypassing both ends of said capacitor, comprising:
a semiconductor switch; and two transformers, each primary winding and secondary winding of which are grounded at one end, the other ends of said primary windings being connected to said power transmission line, the other ends of said second windings being connected to each other through said series capacitor connected in parallel to said semiconductor switch which is positioned under the potential of said power transmission line against the ground.

32. An electric power flow controller as claimed in claim 31, wherein a switching device is provided for separating said two transformers from said power transmission line.

33. An electric power flow controller as claimed in claim 31, wherein another switching device is connected between said two transformers and said switching device for separating said two transformers from said power transmission line.

34. An electric power flow controller as claimed in claim 31, wherein a winding ratio and a polarity of said two transformers are adjusted so that the voltage to ground of said semiconductor switch is equal to or lower than the voltage to ground of said transmission line.

35. An electric power flow controller having a compensating capacitor inserted onto an electric power line, comprising:
a transformer located between said electric power line and the ground;
a semiconductor switch for controlling a compensation of said compensating capacitor, said switch connected to a winding of said transformer and connected in parallel to said compensating capacitor; and
a protector located between said semiconductor switch and said transformer so that a voltage is made equal to or lower than the voltage to ground of said electric power line.

36. An electric power flow controller as claimed in claim 35, wherein said protector is an overvoltage protecting device.

37. An electric power flow controller as claimed in claim 35, wherein said protector is a breaker.

38. An electric power flow controller as claimed in claim 35, wherein said compensating capacitor is connected to a winding of said transformer and said protector is provided between said compensating capacitor and said transformer.

39. An electric power flow controller as claimed in claim 35, wherein one end of a first winding of said transformer is connected to said electric power line, the other end of said first winding is grounded, and one end of a second winding of said transformer is connected to said semiconductor switch.

40. An electric power flow controller as claimed in claim 35, wherein said compensating capacitor is connected between said semiconductor switch and said transformer.

41. An electric power flow controller as claimed in claim 35, wherein said semiconductor switch is grounded.

42. An electric power flow controller as claimed in claim 35, wherein said compensating capacitor is grounded.

43. An electric power flow controller having a compensating capacitor inserted onto an electric power line, comprising:
a semiconductor switch for controlling a compensation of said compensating capacitor;
said compensating capacitor located at the voltage to ground of said electric power line; and
a transformer for lowering a voltage applied onto said semiconductor switch to the voltage to ground of said electric power line, said transformer located between said compensating capacitor and said semiconductor switch.

44. An electric power flow controller as claimed in claim 43, wherein said transformer is grounded and located between said compensating capacitor and said semiconductor switch.

45. An electric power flow controller as claimed in claim 43, wherein said compensating capacitor is inserted in series to said electric power line and said transformers are located in parallel to said compensating capacitor, each of said transformers corresponding to both ends of said compensating capacitor.

46. An electric power flow controller as claimed in claim 43, wherein said transformers are located symmetrically on the central axis of both ends of said compensating capacitor.

47. An electric power flow controller as claimed in claim 43, wherein said semiconductor switch is located on a central axis of both ends of said compensating capacitor.

48. An electric power flow controller as claimed in claim 43, wherein said semiconductor switch is located between said transformers.

49. An electric power flow controller as claimed in claim 43, wherein said compensating capacitor is inserted in series to each phase line of said electric power lines for three phases.

50. An electric power flow controller as claimed in claim 43, wherein at least two of said compensating capacitors for said three electric power lines each for phases are located in opposition.

51. An electric power flow controller as claimed in claim 43, wherein said transformers are located in parallel to said compensating capacitors and in a manner to correspond to both ends of at least two of said compensating capacitors for said three electric power lines each for phases, and said transformers for each phase are located in opposition.

52. An electric power flow controller having a compensating capacitor inserted onto an electric power line comprising:
an insulated switching device located on said electric power line;
a semiconductor switch for controlling a compensation of said compensating capacitor; and
another electric power line being led to said semiconductor switch vertically with respect to the locating direction of said insulated switching device.

53. An electric power flow controller as claimed in claim 52, wherein said insulated switching device is located for each phase on said electric power line having three phases, and an electric power line is led to said semiconductor switch vertically with respect to the locating direction of said insulated switching device for each phase.

54. An electric power flow controller as claimed in claim 52, wherein said compensating capacitor is located on said electric power line led from said insulated switching device to said semiconductor switch.

55. An electric power flow controller as claimed in claim 52, wherein a protector is located on said electric power line led from said insulated switching device to said semiconductor switch.

56. An electric power flow controller as claimed in claim 52, wherein said protector is located between said compensating capacitor and said insulated switching device.

57. An electric power flow controller as claimed in claim 52, wherein said semiconductor switch is located for each phase in parallel to said insulated switching device for each phase.

58. An electric power flow controller as claimed in claim 52, wherein said compensating capacitor is located on said electric power line led from said insulated switching device to said semiconductor switch, and said compensating capacitor is located for each phase in parallel to said insulated switching device for each phase.

59. An electric power flow controller having a compensating capacitor connected to an electric power line, comprising:

a semiconductor switch for controlling a charging or discharging state of said compensating capacitor;
means for sensing a current passing through said compensating capacitor;
means for sensing a voltage to be applied to said compensating capacitor;
current filtering means for extracting only a specific frequency component from the current sensed by said current sensing means;
voltage filtering means for extracting only a specific frequency component from the voltage sensed by said current sensing means;
current direction determining means for determining a direction of current to be flown through said semiconductor switch based on the output of said current filtering means;
voltage direction determining means for determining a phase of a voltage applied to said semiconductor switch based on the output of said voltage filtering means; and
switching signal generating means for outputting a switching signal for controlling said semiconductor switch, based on the determined results of said current direction determining means and said voltage phase determining means.

60. An electric power flow controller as claimed in claim 59, wherein said voltage phase determining means operates to determine that the phase of the voltage applied to said semiconductor switch is closer to zero based on the output of said voltage filtering means.

61. An electric power flow controller as claimed in claim 59, wherein assuming that a current flowing from a generator side of said electric power system to a load side through said compensating capacitor is a forward current, a current flowing in an opposite direction to the forward current through said compensating capacitor is a backward current, a higher voltage appearing on the generator side than the voltage on the load side of said compensating capacitor is a forward voltage, and a voltage applied in an opposite direction to the forward voltage is a backward voltage, said semiconductor switch is composed of a pair of semiconductor elements connected in parallel and in opposition to each other, said current direction determining means operates to a period when the forward current is to be flown through one side of semiconductor elements and a period when the backward current is to be flown through the other side of semiconductor elements based on the output of said current, and said voltage phase determining means operates to determine the phases of the backward voltage applied onto one side of semiconductor element and the forward voltage applied onto the other side of semiconductor element, based on the output of said voltage filtering means.

62. An electric power flow controller as claimed in claim 59, wherein assuming that a current flowing from a generator side to a load side of said electric power system through said compensating capacitor is a forward current, a current flowing in an opposite direction to the forward current through said compensating capacitor is a backward current, a higher voltage appearing on the generator side than a voltage appearing on the load side of said compensating capacitor is a forward voltage, and a voltage applied in an opposite direction to the forward voltage is a backward voltage, said semiconductor switch is composed of a pair of several semiconductors connected in parallel and in opposition to each other so that one side of said semiconductor elements is made conductive by said switching signal only if the backward voltage is applied thereon and the other side of semiconductor elements is made conductive by said switching signal only if the forward voltage is applied thereon, said current direction determining means operates to determine a period when the forward current is to be flown to one side of semiconductor elements and a period when a backward current is to be flown to the other side of semiconductor elements, based on the output of said current filtering means, and said voltage phase determining means operates to determine the phases of the backward voltage applied onto one side of semiconductor elements and the forward voltage applied onto the other side of semiconductor elements, based on the output of said voltage filtering means.

63. An electric power flow controller as claimed in claim 59, wherein said current filtering means is composed of a current filter for extracting a commercial frequency component from the current sensed by said current sensing means, and said voltage filtering means is a voltage filter for extracting a commercial frequency component from the voltage sensed by said voltage sensing means.

64. An electric power flow controller as claimed in claim 63, wherein said current filter or said voltage filter is a band-pass filter for passing only a commercial frequency component of said electric power system.

65. An electric power flow controller as claimed in claim 59, wherein said voltage phase determining means is made up of voltage absolute value signal generating means for generating a voltage absolute value signal indicating an absolute value of an output signal of said voltage filtering means and firing angle signal generating means for comparing said voltage absolute value signal with an firing angle control signal indicating a predetermined voltage level and outputting an firing angle signal when both signal phases are matched to each other.

66. An electric power flow controller as claimed in claim 59, wherein assuming that a current flowing from a generator side to a load side of said electric power system through a series capacitor is a forward current and a current flowing in an opposite direction to the forward current is a backward current, said current direction determining means is made up of a backward comparing means for comparing an output of said current filtering means and a preset value and generating a backward current phase signal indicating a period when the forward current is to be flown to one semiconductor elements and a forward comparing means for comparing the output of said filtering means with a preset value and generating a forward direction current phase signal indicating a period when a backward current is to be flown through the other semiconductor element.

67. An electric power flow controller as claimed in claim 59, wherein said switching signal generating means comprises a forward firing angle signal generating means for generating a forward firing angle signal according to the logics of the outputs of said current direction determining means and said voltage phase determining means, backward direction firing angle signal means for generating a backward firing angle signal according to the logics of the outputs of said current direction determining means and said voltage phase determining means, forward gate pulse generating means for generating a forward gate pulse as a switching signal for conducting the other side of semiconductor elements in response to said forward firing angle signal, and backward gate pulse generating means for generating a backward gate pulse as a switching signal for conducting one side of semiconductor elements in response to said backward firing angle signal.

68. An electric power flow controller as claimed in claim 59, wherein said switching signal generating means comprises forward firing angle signal generating means for generating a forward firing angle signal according to an AND logic of outputs of said current direction determining means and said voltage phase determining means, backward firing angle signal generating means for generating a backward firing angle signal according to an AND logic of outputs of said current direction determining means and said voltage phase determining means, forward gate pulse generating means for generating a forward gate pulse as a switching signal for conducting the other side of semiconductor elements in response to said forward firing angle signal, and backward gate pulse generating means for generating a backward gate pulse as a switching signal for conducting one side of semiconductor elements in response to said backward firing angle signal.

69. An electric power flow controller as claimed in claim 59, wherein said semiconductor switch is composed of plural semiconductor elements connected in series or in parallel.

\* \* \* \* \*